US009205435B1

(12) United States Patent
Clark et al.

(10) Patent No.: US 9,205,435 B1
(45) Date of Patent: *Dec. 8, 2015

(54) MATCHED PRECIPITATION RATE ROTOR-TYPE SPRINKLER WITH SELECTABLE NOZZLE PORTS

(71) Applicant: Hunter Industries, Inc., San Marcos, CA (US)

(72) Inventors: Michael L. Clark, San Marcos, CA (US); Donald M. Sheetz, III, Oceanside, CA (US); LaMonte D. Porter, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 14/165,237

(22) Filed: Jan. 27, 2014

Related U.S. Application Data

(63) Continuation-in-part of application No. 12/612,599, filed on Nov. 4, 2009, now Pat. No. 8,636,229, and a continuation-in-part of application No. 13/193,374, filed on Jul. 28, 2011, now Pat. No. 8,636,230.

(60) Provisional application No. 61/371,099, filed on Aug. 5, 2010.

(51) Int. Cl.
*B05B 15/10* (2006.01)
*B05B 3/04* (2006.01)

(52) U.S. Cl.
CPC .................................. *B05B 3/0427* (2013.01)

(58) Field of Classification Search
CPC .......... B05B 1/169; B05B 1/26; B05B 15/10; A01G 25/00; A01G 25/16

USPC .............. 239/203–206, 240, 242, 569, 581.1, 239/201

See application file for complete search history.

(56) References Cited

U.S. PATENT DOCUMENTS

| | | | | |
|---|---|---|---|---|
| 2,722,457 | A * | 11/1955 | Livingston | 239/447 |
| 4,003,519 | A * | 1/1977 | Kruse et al. | 239/745 |
| 4,836,449 | A | 6/1989 | Hunter | |
| 4,836,450 | A | 6/1989 | Hunter | |
| 4,867,378 | A | 9/1989 | Kah | |
| 5,042,719 | A | 8/1991 | Magris et al. | |
| 5,098,021 | A | 3/1992 | Kah | |
| 5,104,045 | A * | 4/1992 | Kah, Jr. | 239/246 |

(Continued)

FOREIGN PATENT DOCUMENTS

| | | |
|---|---|---|
| AU | 2003262148 | 10/2003 |
| AU | 2002254410 | 6/2006 |

(Continued)

*Primary Examiner* — Davis Hwu
(74) *Attorney, Agent, or Firm* — Knobbe, Martens, Olson & Bear, LLP

(57) ABSTRACT

An irrigation sprinkler can include a riser and a nozzle mounted at an upper end of the riser for rotation. The sprinkler can include a high flow rate port and a low flow rate port that can each emit a stream of water. The sprinkler can include a diverter valve that can intermittently block or permit the flow of water to the high flow rate port and/or to the low flow rate port as the nozzle rotates. The sprinkler can include a gear train reduction mounted in the riser and coupled to rotate the nozzle. A turbine can be coupled to an input shaft of the gear train reduction and can be rotatable by water flowing through the riser.

21 Claims, 63 Drawing Sheets

(56) References Cited

U.S. PATENT DOCUMENTS

| | | |
|---|---|---|
| 5,375,768 A | 12/1994 | Clark |
| 5,423,486 A | 6/1995 | Hunter |
| 5,456,411 A | 10/1995 | Scott et al. |
| 5,556,036 A | 9/1996 | Chase |
| 5,699,962 A | 12/1997 | Scott et al. |
| 5,711,486 A | 1/1998 | Clark et al. |
| 5,720,435 A | 2/1998 | Hunter |
| 5,762,270 A | 6/1998 | Kearby et al. |
| 5,826,797 A | 10/1998 | Kah |
| 5,918,812 A | 7/1999 | Beutler |
| 5,927,607 A | 7/1999 | Scott |
| 5,979,863 A | 11/1999 | Lousberg |
| 5,988,523 A | 11/1999 | Scott |
| 6,042,021 A | 3/2000 | Clark |
| 6,050,502 A | 4/2000 | Clark |
| 6,082,632 A | 7/2000 | Clark et al. |
| 6,085,995 A | 7/2000 | Kah |
| 6,138,924 A | 10/2000 | Hunter et al. |
| 6,227,455 B1 | 5/2001 | Scott et al. |
| 6,241,158 B1 | 6/2001 | Clark et al. |
| 6,299,075 B1 | 10/2001 | Koller |
| 6,431,475 B1 * | 8/2002 | Williams ............... 239/750 |
| 6,457,656 B1 | 10/2002 | Scott |
| 6,491,235 B1 | 12/2002 | Scott et al. |
| 6,651,905 B2 | 11/2003 | Sesser et al. |
| 6,688,539 B2 | 2/2004 | Vander Griend |
| 6,695,223 B2 | 2/2004 | Beutler et al. |
| 6,736,332 B2 | 5/2004 | Sesser et al. |
| 6,817,543 B2 | 11/2004 | Clark |
| 6,854,664 B2 | 2/2005 | Smith |
| 6,871,795 B2 | 3/2005 | Anuskiewicz |
| 6,957,782 B2 | 10/2005 | Clark et al. |
| 7,032,836 B2 | 4/2006 | Sesser et al. |
| 7,040,553 B2 | 5/2006 | Clark |
| 7,159,795 B2 | 1/2007 | Sesser et al. |
| 7,240,860 B2 | 7/2007 | Griend |
| 7,287,711 B2 | 10/2007 | Crooks |
| 7,303,147 B1 | 12/2007 | Danner et al. |
| 7,322,533 B2 | 1/2008 | Grizzle |
| RE40,440 E | 7/2008 | Sesser |
| D593,182 S | 5/2009 | Anuskiewicz |
| 7,530,504 B1 | 5/2009 | Danner et al. |
| 7,611,077 B2 | 11/2009 | Sesser et al. |
| 7,621,467 B1 | 11/2009 | Garcia |
| 7,677,469 B1 | 3/2010 | Clark |
| 7,748,646 B2 | 7/2010 | Clark |
| 7,828,230 B1 | 11/2010 | Anuskiewicz |
| 7,861,948 B1 | 1/2011 | Crooks |
| 8,220,723 B2 | 7/2012 | Clark |
| 8,272,578 B1 | 9/2012 | Clark et al. |
| 8,282,022 B2 | 10/2012 | Porter |
| 8,297,533 B2 | 10/2012 | Dunn et al. |
| 8,313,043 B1 | 11/2012 | Crooks et al. |
| 8,413,681 B2 | 4/2013 | Schmuckle |
| 8,430,376 B1 | 4/2013 | Danner et al. |
| 8,469,288 B1 | 6/2013 | Clark et al. |
| 8,474,733 B1 | 7/2013 | Clark et al. |
| 8,556,193 B2 | 10/2013 | Anuskiewicz |
| 8,602,325 B2 | 12/2013 | Clark et al. |
| 8,622,317 B1 | 1/2014 | Anuskiewicz |
| 8,622,318 B1 | 1/2014 | Clark et al. |
| 8,636,230 B1 * | 1/2014 | Clark et al. ............ 239/242 |
| 2005/0133619 A1 | 6/2005 | Clark |
| 2009/0173804 A1 | 7/2009 | Kah, Jr. et al. |
| 2010/0176217 A1 * | 7/2010 | Richmond et al. ........... 239/205 |
| 2012/0024982 A1 | 2/2012 | Dunn et al. |
| 2012/0043398 A1 | 2/2012 | Clark |
| 2012/0132727 A1 | 5/2012 | Dunn et al. |
| 2012/0234940 A1 | 9/2012 | Clark |
| 2012/0273593 A1 | 11/2012 | Clark |
| 2013/0074400 A1 | 3/2013 | Roess et al. |
| 2013/0075490 A1 | 3/2013 | Roess et al. |
| 2013/0270361 A1 | 10/2013 | Clark |

FOREIGN PATENT DOCUMENTS

| | | |
|---|---|---|
| AU | 2004202791 | 12/2009 |
| AU | 2007200492 | 11/2011 |
| EP | 1818104 | 12/2007 |
| EP | 1492626 | 12/2011 |
| EP | 1289673 | 5/2012 |
| IL | 149450 | 5/2011 |

* cited by examiner

| Matched Precipitation high flow / low flow settings - High flow port 5 GPM, Low flow port 0.7 GPM ||||||
|---|---|---|---|---|---|
| Arc Setting | Percent of time that high flow port is open | Number of degrees the high flow port operates | Number of degrees the low flow port operates | Total gallons of water distributed from high flow nozzle port per minute | Total gallons of water distributed from low flow nozzle port per minute | Average gallons applied to each 1 degree of arc per minute at the specified arc setting |
| 90 | 11.5% | 10 | 80 | 0.58 | 0.62 | 0.040 |
| 180 | 40.0% | 72 | 108 | 2.00 | 0.42 | 0.040 |
| 270 | 68.0% | 184 | 86 | 3.40 | 0.22 | 0.040 |
| 360 | 94.0% | 338 | 22 | 4.70 | 0.04 | 0.040 |

FIG. 47

| Matched Precipitation high flow / low flow settings - High flow port 6 GPM, Low flow port 0.7 GPM | | | | | |
|---|---|---|---|---|---|
| Arc Setting | Percent of time that high flow port is open | Number of degrees the high flow port operates | Number of degrees the low flow port operates | Total gallons of water distributed from high flow nozzle port per minute | Total gallons of water distributed from low flow nozzle port per minute | Average gallons applied to each 1 degree of arc per minute at the specified arc setting |
| 90 | 13.0% | 12 | 83 | 0.78 | 0.65 | 0.048 |
| 180 | 37.0% | 67 | 162 | 2.22 | 0.63 | 0.048 |
| 270 | 62.0% | 167 | 233 | 3.72 | 0.60 | 0.048 |
| 360 | 86.0% | 310 | 310 | 5.16 | 0.60 | 0.048 |

FIG. 48

MATCHED PRECIPITATION RATE ROTOR-TYPE SPRINKLER WITH SELECTABLE NOZZLE PORTS

CROSS-REFERENCE TO RELATED APPLICATION

The present application is a continuation-in-part of U.S. application Ser. No. 13/193,374, filed Jul. 28, 2011, now U.S. Pat. No. 8,636,230, which claims the benefit under 35 U.S.C. 119(e) to U.S. Provisional Appl. No. 61/371,099, filed Aug. 5, 2010. The present application is also a continuation-in-part of U.S. application Ser. No. 12/612,599, filed Nov. 4, 2009, now U.S. Pat. No. 8,636,229. The entire contents of the above applications are hereby incorporated by reference and made a part of this specification. Any and all priority claims identified in the Application Data Sheet, or any correction thereto, are hereby incorporated by reference under 37 CFR 1.57.

FIELD OF THE INVENTION

The present disclosure relates to sprinklers used in residential and commercial irrigation for watering turf and landscaping.

BACKGROUND OF THE INVENTION

Many parts of the world lack sufficient rainfall at different times of the year to maintain the health of turf and landscaping. Irrigation systems are therefore used to deliver water to such vegetation from municipal water supplies and wells according to a watering schedule. A typical irrigation system comprises a programmable controller that turns valves ON and OFF to deliver water through a plurality of sprinklers connected to the valves via subterranean pipes. These sprinklers are usually rotor-type, impact, spray, or rotary stream sprinklers. A rotor-type sprinkler includes a riser that houses a turbine and a gear train reduction that rotates a nozzle that typically ejects a relatively large stream of water. The riser can be installed above the ground or the riser can be installed within an outer housing that allows it to pop-up when water pressure is applied.

Unfortunately rotor-type sprinklers do not typically irrigate a given area with matched precipitation rates. A plurality of rotor-type sprinklers installed on the same irrigation site may all have the same size nozzles installed in the same, each emitting the same volume of water per unit of time and distributing that water at a uniform radius. One of these rotor-type sprinklers may be set for one hundred and eighty degrees of coverage, and another of these rotor-type sprinklers may be set for three hundred and sixty degrees of coverage. The landscape watered by the rotor-type sprinkler that is set for one hundred and eighty degrees will receive twice as much water per square foot as the landscape watered by the other rotor-type sprinkler. If another one of the rotor-type sprinklers is set for ninety degrees, the area watered by that rotor-type sprinkler will receive four times as much water per square foot as the area watered by the rotor-type sprinkler set for three hundred and sixty degrees. Thus, the rotor-type sprinklers that are set for a smaller arc may over-water the areas watered by those sprinklers, resulting in a substantial waste of water. To compensate for this, installers may install all of the rotor-type sprinklers set for small arcs on one zone, all of the rotor-type sprinklers set for mid-sized arcs on another zone, and finally all of the rotor-type sprinklers set for full circle rotation on a yet another zone. The installer can then program the zones for different run times to compensate for the different amounts of water applied to the irrigated areas by the rotor-type sprinklers installed in the different zones. This configuration of an irrigation system requires more underground pipes and complex programming of the irrigation controller.

Matched precipitation rate rotary stream sprinklers have been installed in residential and commercial applications. See, for example, U.S. Pat. No. RE40,440 E granted Jul. 22, 2008 to George L. Sesser, and entitled "Micro-Stream Rotator with Adjustment of Throw Radius and Flow Rate", also assigned to Hunter Industries, Inc. Rotary stream sprinklers of this type have been successfully commercialized by Hunter Industries, Inc. under the MP ROTATOR® trademark. However, rotary stream sprinklers have a limited range or radius and are not suitable for use when large areas of landscape must be watered such as golf courses and playing fields. Another marginal solution to the problem of achieving matched precipitation in a residential or commercial irrigation system that utilizes rotor-type sprinklers is to mix and match nozzles on the irrigation site using lower flow nozzles for the rotor-type sprinklers with smaller arc settings. This requires that the installer possess a high level of skill and adds undue complexity to the irrigation system. Moreover, it is not practical to supply a large selection of nozzles having different flow rates to match, for example, the precipitation from a rotor-type sprinkler set to water over an arc of one hundred and twenty degrees to a rotor-type sprinkler set to water an arc of two hundred and seventy degrees.

SUMMARY OF THE INVENTION

An irrigation sprinkler can include a riser and a nozzle mounted at an upper end of the riser for rotation. The sprinkler can include a high flow rate port and a low flow rate port that can each emit a stream of water. The sprinkler can include a diverter valve that can intermittently block or permit the flow of water to the high flow rate port and/or to the low flow rate port as the nozzle rotates. The sprinkler can include a gear train reduction mounted in the riser and coupled to rotate the nozzle. A turbine can be coupled to an input shaft of the gear train reduction and can be rotatable by water flowing through the riser.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

FIG. 20 C is a view similar to FIG. 20B with the cam still further rotated.

FIG. 47 is a chart that sets forth the different amounts of time that the high flow rate and low flow rate ports of the sprinklers of FIGS. 1 and 21 are open in relation to different arc settings.

FIG. 48 is a chart that sets forth the different amounts of time that the high flow rate and low flow rate ports of the sprinklers of FIGS. 1 and 21 are open in relation to different arc settings when the flow to both ports is overlapped so that both eject water at the same time for a predetermined duration during the rotation of the nozzle.

DETAILED DESCRIPTION

Figure 1:
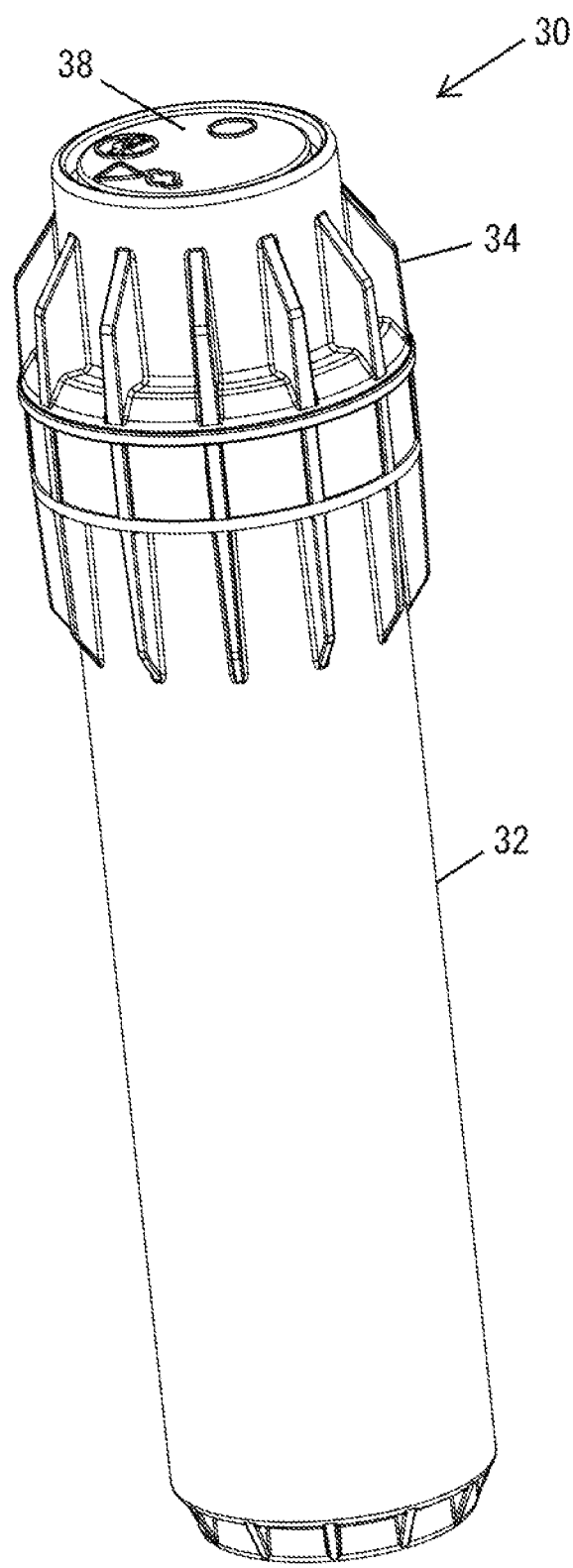
FIG. 1 is an isometric view of a rotor-type sprinkler incorporating an embodiment of the present disclosure.
Figure 2:
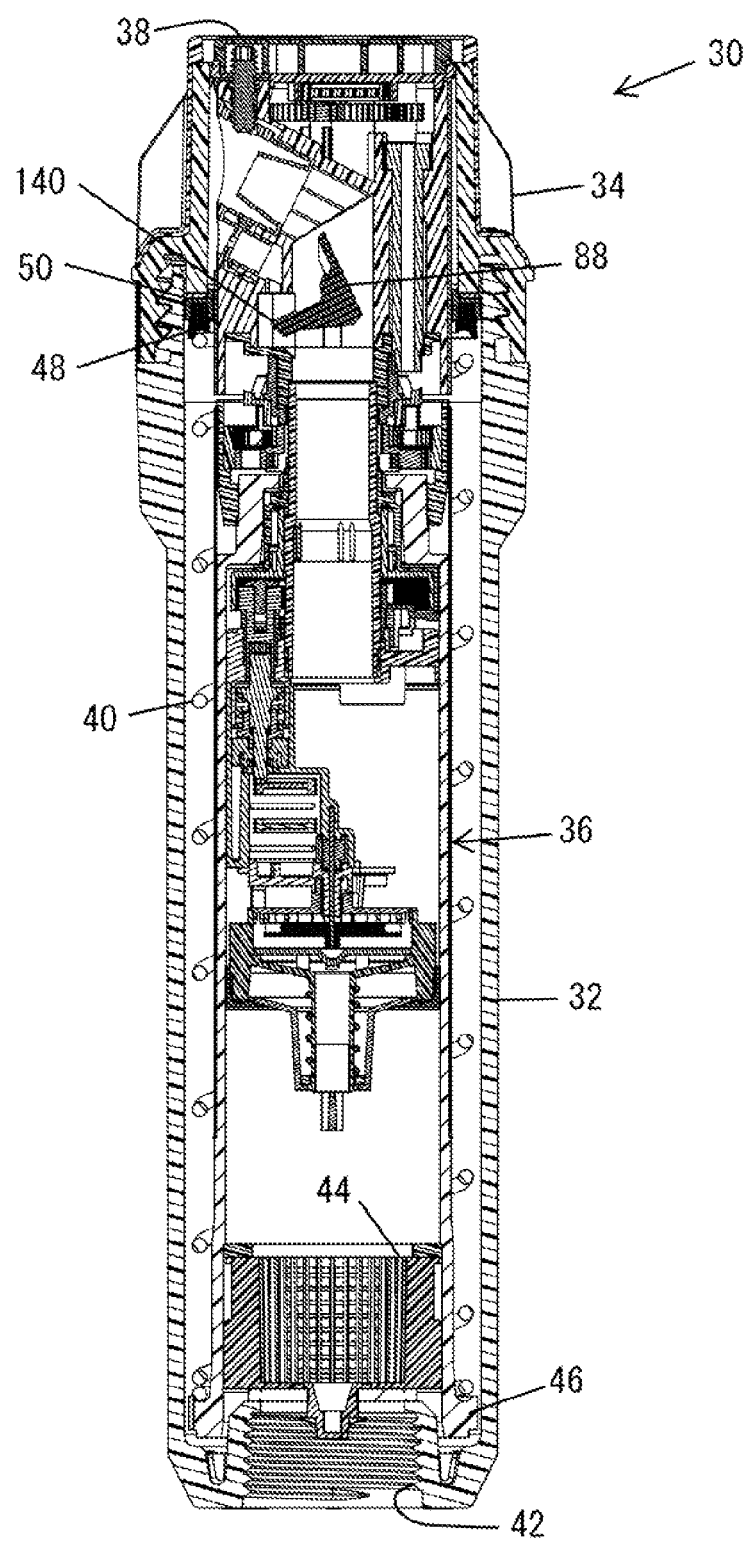
FIG. 2 is a vertical cross-sectional view of the sprinkler of FIG. 1.

FIG. 1 illustrates a matched precipitation rate pop-up rotor-type irrigation sprinkler 30 that incorporates an embodiment of the present disclosure. The sprinkler 30 is designed to conserve water in the irrigation of turf and landscaping while maintaining the health of the vegetation by providing an equal or substantially matched precipitation rate to a given area at any arc setting. It is fabricated out of injection molded plastic parts, metal shafts, steel springs and seals made of a suitable elastomeric material. The sprinkler 30 includes a cylindrical outer case 32 and an end cap 34 which is screwed onto the cylindrical outer case to contain a telescoping tubular riser 36 (FIG. 2). An elastomeric cover 38 is mounted to the top of the tubular riser 36.

Referring to FIG. 2, the tubular riser 36 is telescopically extensible from the outer case 32 by water pressure and normally held in a lowered retracted position by a surrounding coil spring 40. The riser 36 is mounted co-axially within the case 32 and the riser 36 reciprocates vertically along its central longitudinal axis. The case 32 has a female threaded inlet 42 at is lower end for screwing over a male threaded fitting (not illustrated) connected to a subterranean pipe (also not illustrated) which is in turn connected to a source of pressurized water such as a solenoid-actuated valve (not illustrated). See, for example, U.S. Pat. No. 5,979,863 granted Nov. 9, 1999 to Bradley M. Lousberg entitled "Irrigation Control Valve and Screen", and also assigned to Hunter Industries, Inc. A screen 44 filters out debris from the water source that could otherwise render the sprinkler 30 inoperative.

The end cap 34 (FIG. 2) has a ring-shaped female threaded configuration so that it can be screwed over a male threaded upper end of the case 32. The lower end of the coil spring 40 seats in an upwardly opening annular groove formed in a lower shoulder 46 of the riser 36. The upper end of the coil spring 40 seats in a downwardly opening annular groove in a rigid retainer ring 48 held in place by the end cap 34. The riser 36 can telescope upwardly and downwardly through the end cap 34 to an extended position (not illustrated) when water pressure is applied at the inlet 42. This compresses the coil spring 40. When the water pressure is turned OFF the force of the compressed coil spring 40 pushes the riser 36 back to its retracted position illustrated in FIG. 2. An elastomeric wiper seal 50 is positioned between the riser 36, the retainer ring 48 and the case 32.

Figure 3:
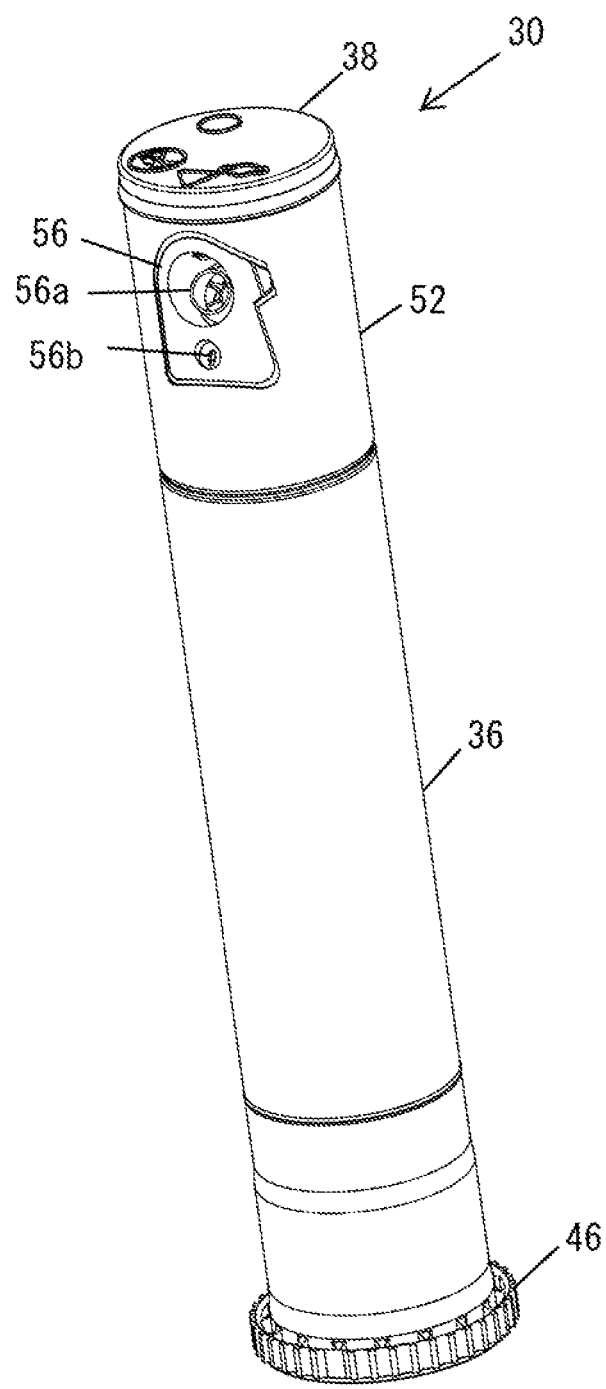
FIG. 3 is an isometric view of the telescoping riser of the sprinkler of FIG. 1.
Figure 4:
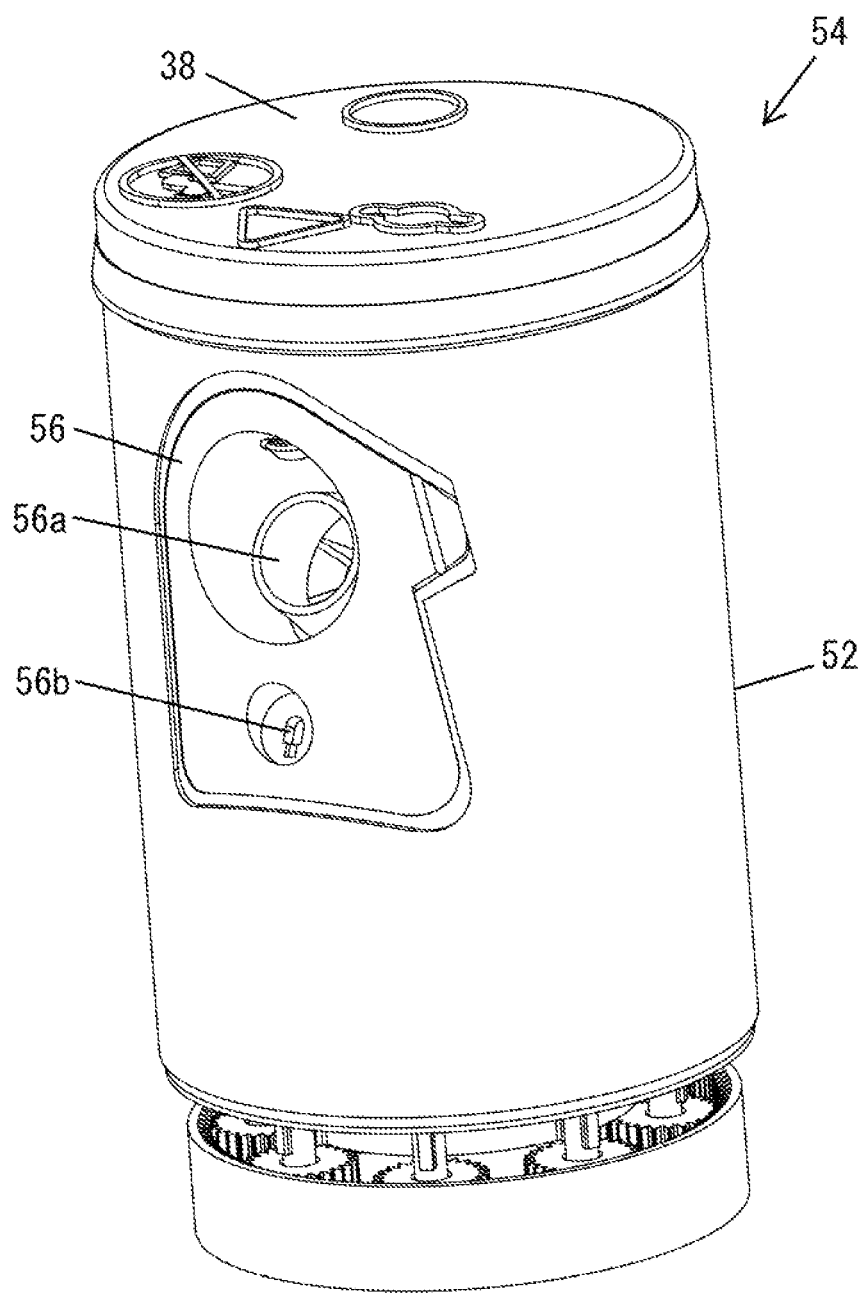
FIG. 4 is an enlarged isometric view of the nozzle turret assembly of the sprinkler of FIG. 1.

A cylindrical stainless steel turret cover 52 (FIG. 3) forms a part of a nozzle turret 54 (FIG. 4) that is rotatably mounted at an upper end of the riser 36. A nozzle 56 is removably mounted through an aperture in the vertical side wall of the cylindrical cover 52 into the nozzle turret 54. The nozzle 56 includes a first port and a second port. In this embodiment, the first port is a high flow rate port 56a and the second port is a low flow rate port 56b positioned in vertical alignment with, and below, the high flow rate port 56a. The high flow rate port 56a is a larger size port that will emit a higher volume of water per unit of time, e.g. gallons per minute (GPM) than the low flow rate port 56b which is a smaller size port. The terms "high" and "low" as used in reference to the ports 56a and 56b merely mean that they eject water at different rates under similar water pressure. The high flow rate port 56a may be designed to be above, below, or to the side of the low flow rate port 56b. The nozzle 56 is preferably removable and may be of the type disclosed in U.S. Pat. No. 6,871,795 granted Mar. 29, 2005 and entitled "Irrigation Sprinkler with Easy Removal Nozzle", also assigned to Hunter Industries, Inc., the entire disclosure of which is hereby incorporated by reference.

Figure 5:
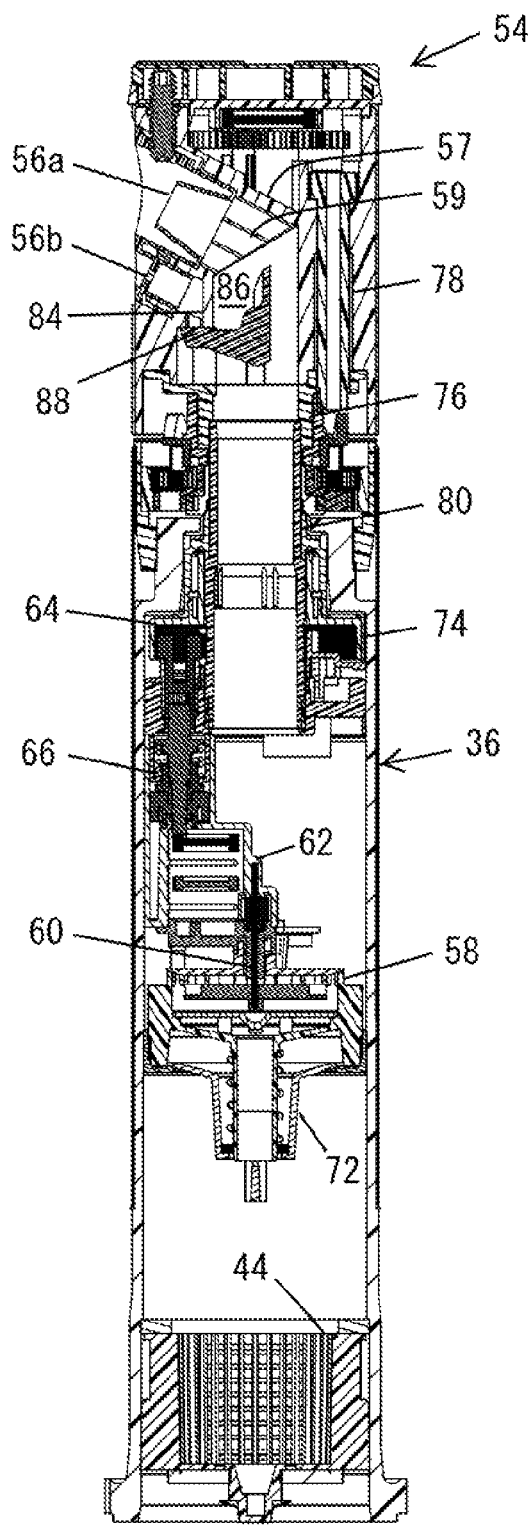
FIG. 5 is a vertical cross-sectional view of the riser of FIG. 3 illustrating its internal components including its arc adjusting mechanism.

An impeller in the form of a turbine 58 (FIG. 5) is mounted in the riser 36 for rotation about a vertical axis by water entering the lower end of the riser 36. The turbine 58 is coupled to the input shaft 60 of a staggered gear train reduction 62 mounted in the riser 36. An arc-adjustable reversing mechanism 64 is mounted in the riser 36 and couples to a slip clutch 66 which transmits the drive force from the output of the gear train reduction 62 to drive the nozzle turret 54. A suitable slip clutch is disclosed in U.S. Pat. No. 7,530,504 granted May 12, 2009 to Fred M. Danner et al. and entitled "Clutch for Rotor-Type Sprinkler", also assigned to Hunter Industries, Inc., the entire disclosure of which is also hereby incorporated by reference. The clutch 66 is preferably of the type disclosed in U.S. Pat. No. 7,828,230 granted to Ronald H. Anuskiewicz on Nov. 9, 2010 and entitled "Axially Displacing Slip-Clutch for Rotor-Type Sprinkler", also assigned to Hunter Industries, Inc. The entire disclosure of said U.S. Pat. No. 7,828,230 is also hereby incorporated by reference.

The illustrated reversing mechanism 64 (FIG. 5) is one form of a gear driven coupling mechanism that optionally allows the arc adjusting gear 70 (FIG. 7) to adjust the mode of operation of the sprinkler 30 from the top-side thereof so that it will rotate the nozzle turret 54 and the nozzle 56 contained therein back and forth between selected arc limits to provide an oscillating sprinkler or rotate the nozzle turret 54 in a continuous uni-directional manner. Other forms of gear driven couplings can be used to rotate the nozzle turret 54 and nozzle 56 solely in an oscillating manner. Other forms of the gear driven coupling can be used to rotate the nozzle turret 54 and nozzle 56 solely in a continuous uni-directional manner. A spring-biased stator 72 (FIG. 5) is mounted in the lower end of the riser 36 beneath the turbine 58 for controlling the RPM of the turbine 58.

Figure 6:
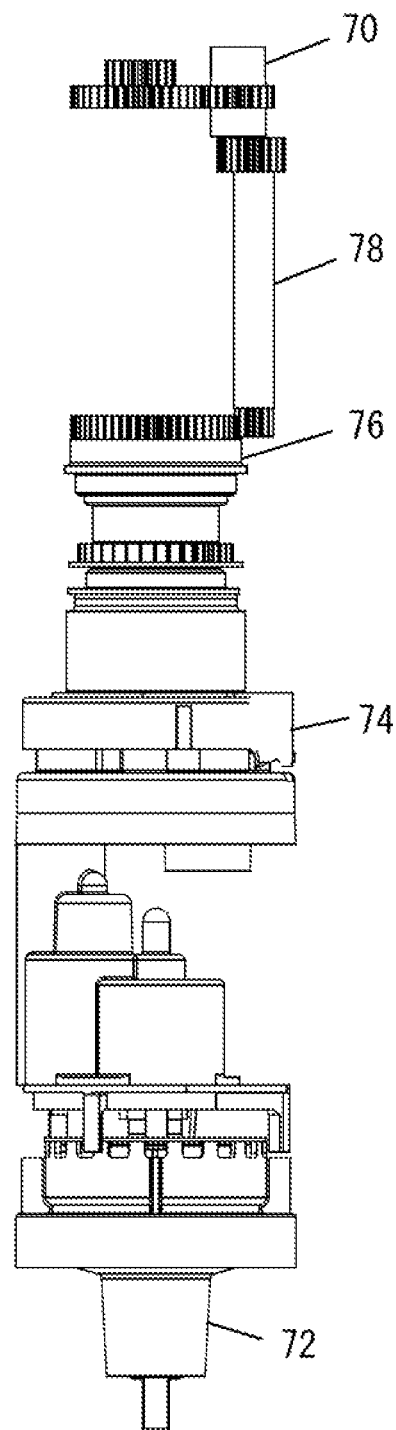
FIG. 6 is an enlarged side elevation view of the arc adjusting mechanism and gear drive of the sprinkler of FIG. 1.

The reversing mechanism 64 is preferably of the type disclosed in U.S. Pat. No. 7,287,711 granted Oct. 30, 2007 to John D. Crooks and entitled "Adjustable Arc Rotor-Type Sprinkler with Selectable Uni-directional Full Circle Nozzle Rotation", also assigned to Hunter Industries, Inc., the entire disclosure of which is hereby incorporated. See also U.S. Pat. Nos. 4,836,450, 4,836,449; and 5,423,486, all granted to Edwin J. Hunter, the entire disclosures of which are also hereby incorporated by reference. As explained in U.S. Pat. No. 7,287,711, an arc adjusting sleeve 74 (FIGS. 5 and 6) carrying saw-tooth shaped trip tabs (not illustrated) trips a shift dog (not illustrated) to reverse the direction of rotation of the nozzle turret 54 and the nozzle 56 contained therein. When the sprinkler 30 is adjusted to increase the arc of rotation to three hundred and sixty degrees, the shift dog is cammed away to prevent the nozzle turret 54 from shifting rotational direction, and allowing the nozzle turret 54 to rotate continuously in one direction, i.e. uni-directional rotation. At an arc setting less than three hundred and sixty degrees, the shift dog shifts the reversing mechanism to create an oscillating action of the nozzle turret 54. The arc adjusting sleeve 74 is rotationally coupled for adjustment to arc adjusting gear extension 76 which is rotated by an arc adjusting idler gear 78. The arc adjusting idler gear 78 is rotated when an operator inserts an appropriate tool in the top of the arc adjusting gear 70 to make a radial arc adjustment or setting to the motion of the of the nozzle turret 54.

Figure 12:
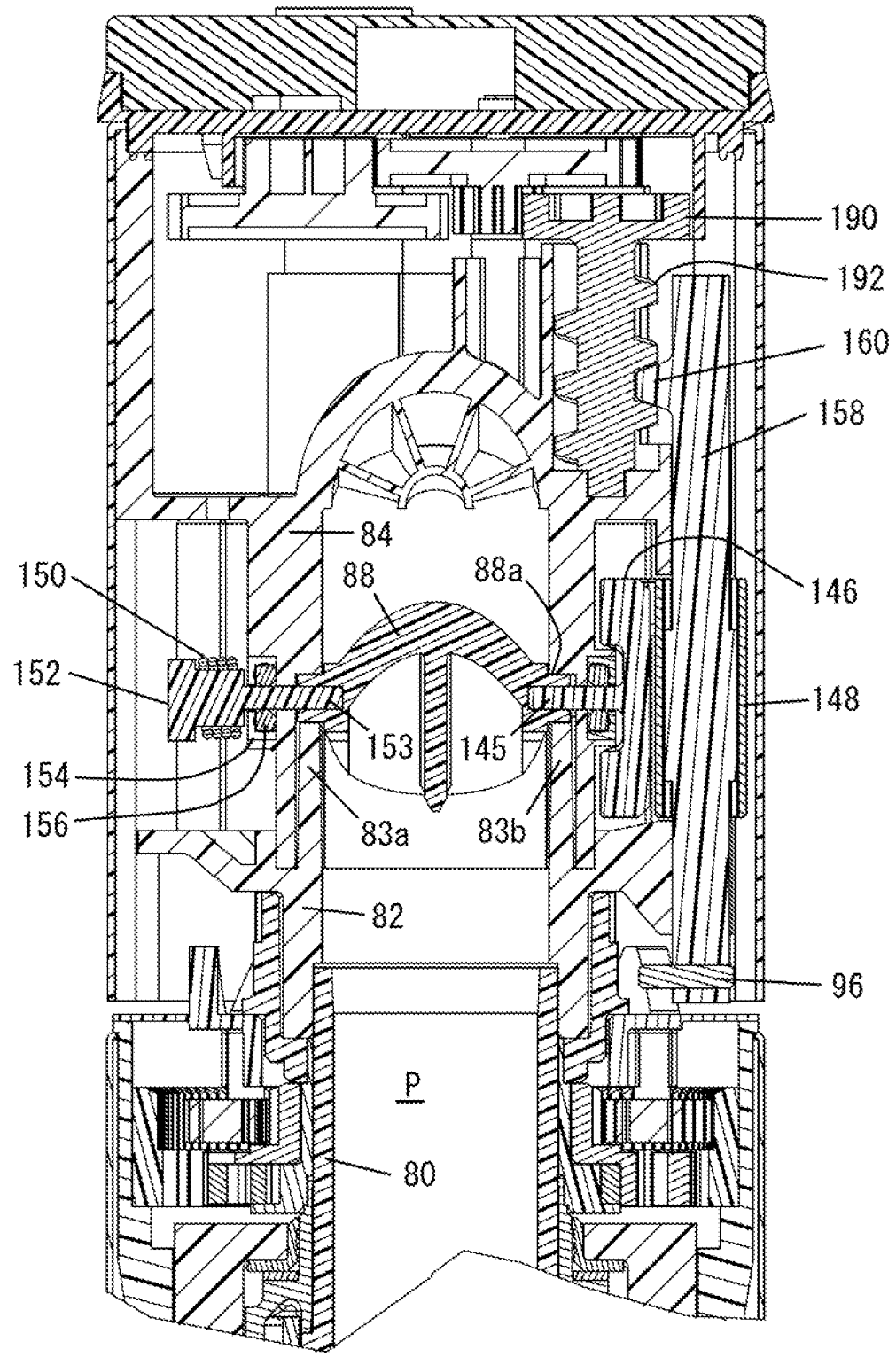
FIG. 12 is an enlarged fragmentary vertical cross-sectional view of the turret assembly of FIG. 4 illustrating its internal components including its diverter valve components.
Figure 13A:
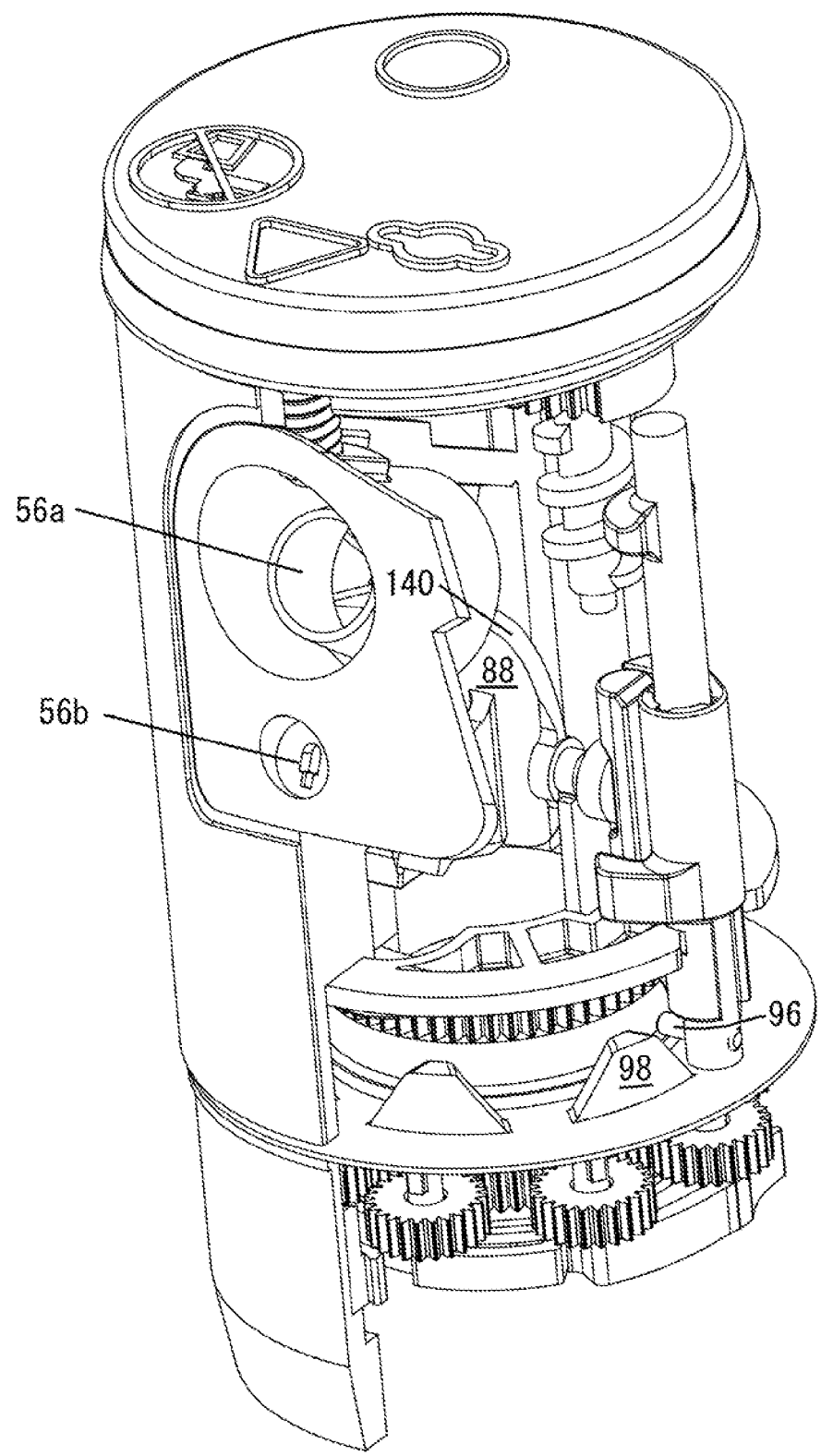
FIG. 13A is an enlarged isometric cutaway view of the nozzle turret assembly and the diverter valve of the sprinkler of FIG. 1 in a state that directs water through a high flow rate port of a nozzle.
Figure 13B:
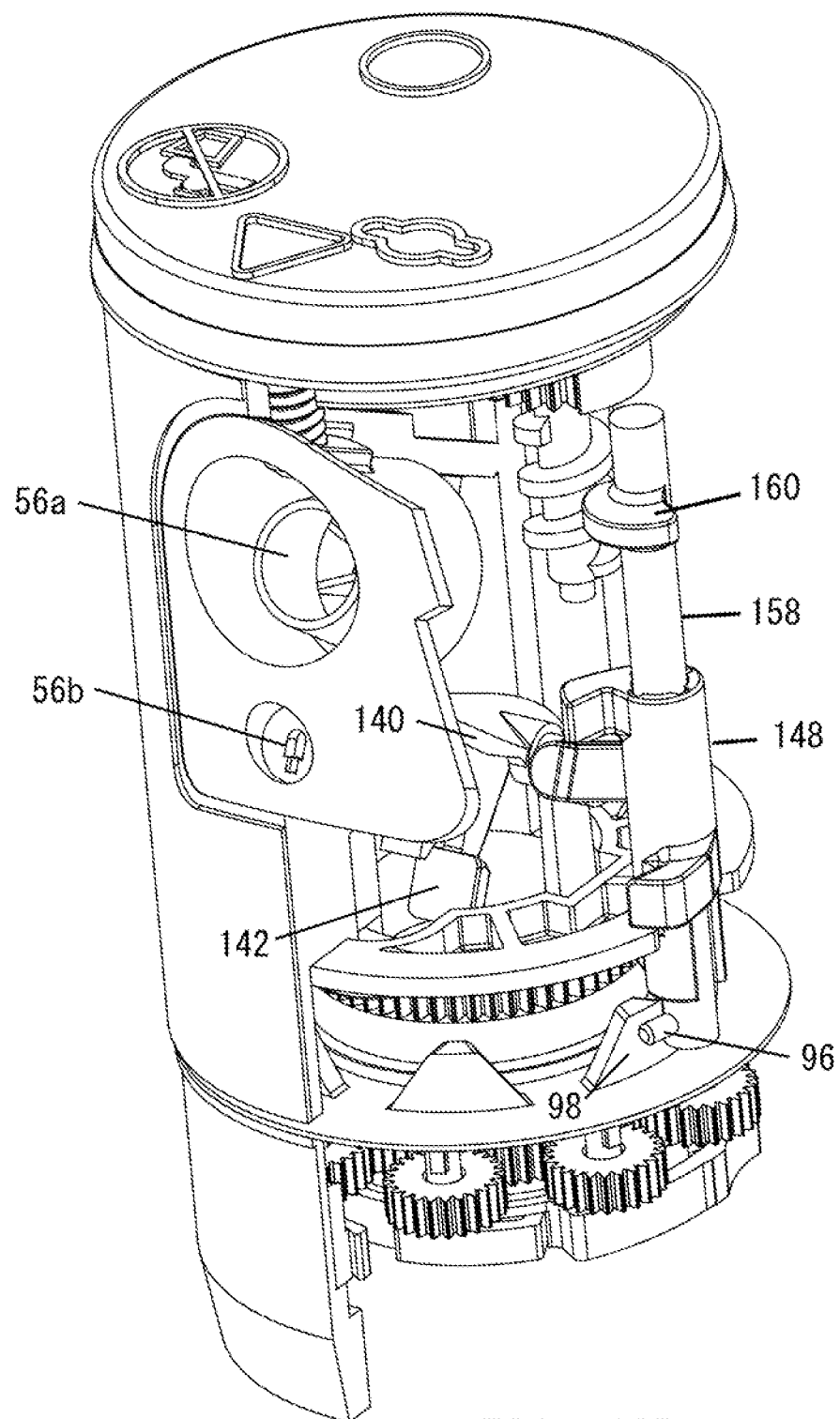
FIG. 13B is similar to FIG. 13A with the diverter valve in a state that directs water from a low flow rate port of the nozzle.

A vertically extending cylindrical bull gear stem 80 (FIG. 12) is rotationally coupled in a concentric fashion with the reversing mechanism 64 and provides a hollow tubular drive shaft that couples the nozzle turret 54 via a bull gear coupling 82. The upper end of the bull gear stem 80 is securely bonded to the bull gear coupling 82 which in turn is securely bonded in a cylindrical sleeve 84 of the nozzle turret 54. The nozzle turret 54 and the nozzle 56 inserted therein are thus supported for rotation relative to the riser 36 and the case 32 by the bull gear stem 80. The upper end of the bull gear stem 80 terminates closely adjacent to the lower segment of a dog-legged tubular structure 86 (FIG. 5) formed in the nozzle turret 54. The lower segment of the tubular structure 86 is cylindrical and centered axially in the nozzle turret 54. The nozzle 56 is inserted into the upper inclined, radially extending segment 57 of the tubular structure 86 downstream from a plurality of parallel stream straighteners 59. The interior of the bull gear stem 80 provides a relatively large central flow passage P that conveys water to the nozzle 56. A diverter valve member 88 is pivotally mounted in the lower segment of the tubular structure 86 within the passage P to selectively direct the flow of water from the high flow nozzle port 56a to the low flow nozzle port 56b.

Figure 7:
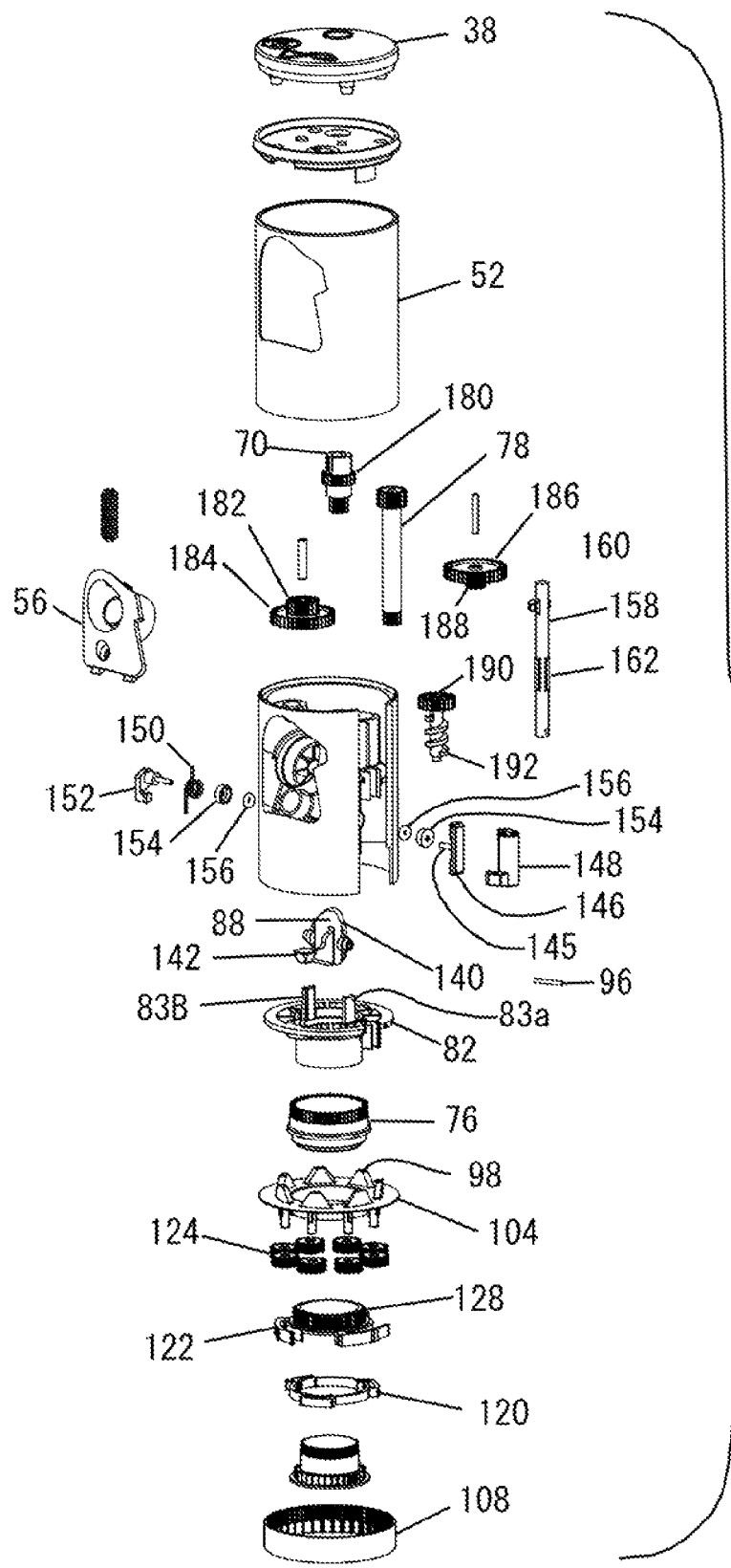
FIG. 7 is an exploded view of the nozzle turret assembly of FIG. 4 illustrating its reversing sun gear assembly.
Figure 8:
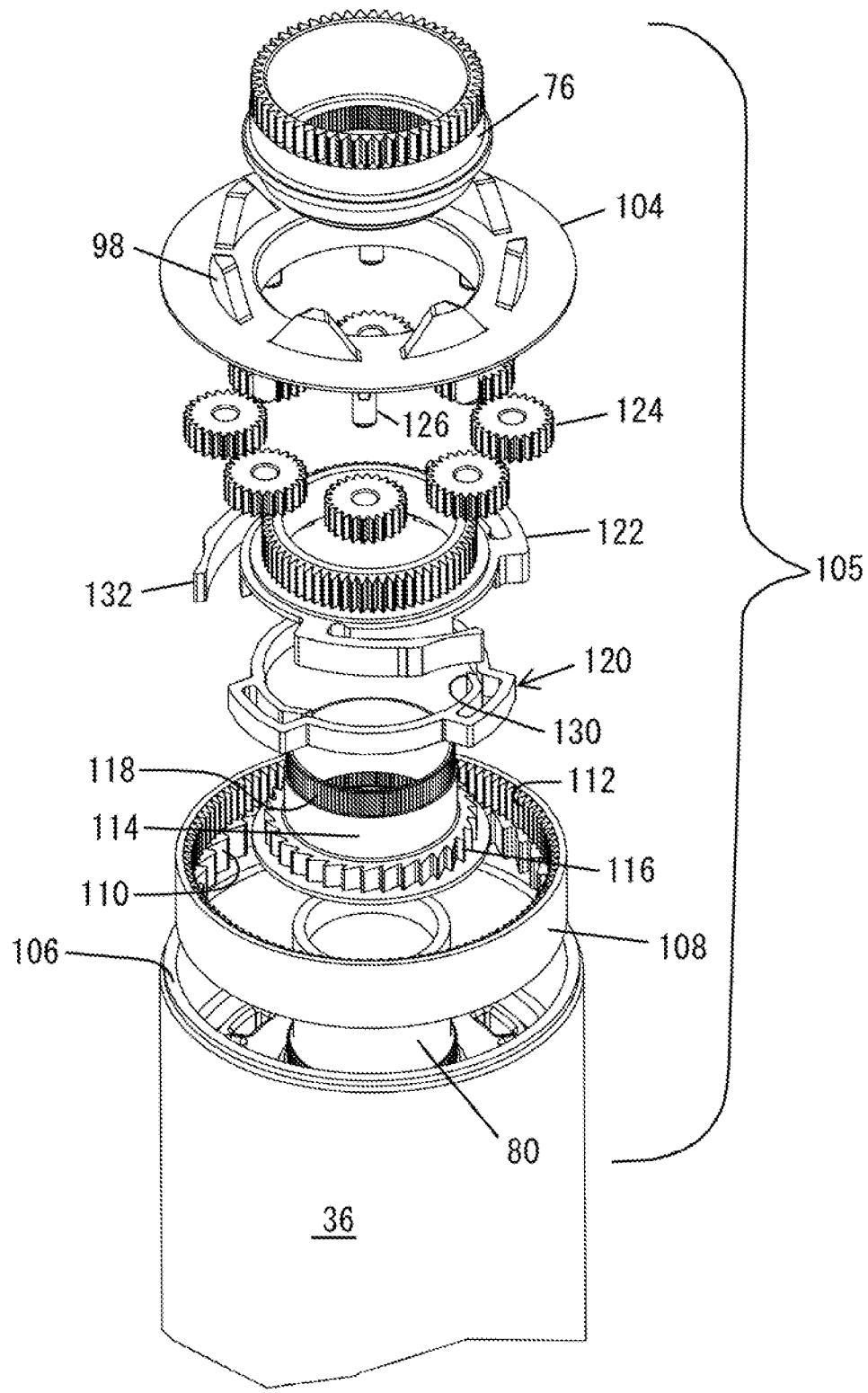
FIG. 8 is an enlarged fragmentary exploded view of the ratcheting sun gear assembly that controls the diverter valve in the sprinkler of FIG. 1.

FIGS. 12, 13A, 13B, 14A, 14B, 15A, 15B, 15C and 16-18 illustrate details of a diverter valve that intermittently moves a generally L-shaped diverter valve member 88 in the nozzle turret 54 to direct water from port P to either the high flow rate port 56a or the low flow rate port 56b of nozzle 56. The diverter valve member 88 has laterally projecting trunions 88a (FIG. 12) that are pivotally mounted in slots formed in the cylindrical sleeve 84 and retained in position by a pair of valve support arms 83a and 83b (FIG. 7) which extend upward from the bull gear coupling 82. The diverter valve member 88 includes an integrally formed low flow rate port shut-off member 140 and a high flow rate port shut-off surface 142. The high flow rate port shut-off surface 142 is a peripheral surface of an elliptical portion of the diverter valve member 88 that can engage the surfaces of the lower segment of the dog-legged tubular structure 86 to seal off flow to the high flow rate port 56a. A valve return torsion arm 152 includes a shaft 153 which is attached in a fixed manner to the diverter valve member 88. An O-ring 156 is mounted in an O-ring cap 154 and surrounds the shaft 153 to prevent pressurized water leakage around the shaft 153. A valve return torsion spring 150 urges the diverter valve member 88 to a normal position in which it causes water to flow through the high flow rate port 56a and keep a valve input arm 146 (FIG. 14B) in constant contact with an upper cam arm 147 or a lower cam arm 149 of a cam arm coupling 148. The valve input arm 146 includes a shaft 145 (FIG. 7) which is attached in a fixed manner to the diverter valve member 88. The O-ring 156 is mounted in the O-ring cap 154 and surrounds the shaft 145 to prevent pressurized water leakage around the shaft 145. A cam follower 96 (FIG. 14B) protrudes from a cam drive arm 158 (FIG. 7). The cam drive arm 158 passes through a splined bore of the cam arm coupling 148 such that the cam drive arm 158 can move axially in relationship to the cam arm coupling 148, but it is rotationally coupled with splines 162 such that any rotational movement of the cam drive arm 158 causes the cam drive arm coupling 148 to rotate in an equal amount. As the nozzle turret 54 rotates relative to a ring shaped cam plate 104 having a plurality of upwardly extending cams 98. The cams 98 (FIG. 9) are circumferentially spaced around the cam plate 104 and each have a triangular shape. The sloped surfaces of the cams 98 contact the cam follower 96 as the cam plate 104 rotates. The cams 98 cause the cam follower 96, cam drive arm 158, and cam arm coupling 148 to rotate. This rotational movement causes either the upper cam arm 147 or lower cam arm 149 to rotate the valve input arm 146 and rotate the diverter valve member 88 to shut off flow to the high flow rate port 56a and open a passage 144 (FIG. 16B) to a chamber 164 and cause water to flow through the low flow rate port 56b. When the cams 98 are in a position where there is no contact between the cam 98 and the cam follower 96, the valve return spring 150 causes the diverter valve member 88 to return to its home position. This causes water to once again flow into a high flow chamber 166, past the stream straighteners 59 and through the high flow port 56a. In this position, the low flow shut-off member 140 of diverter valve member 88 prevents flow of water to the low flow rate port 56b by blocking the passage 144 as illustrated in FIG. 16A.

Figure 9:
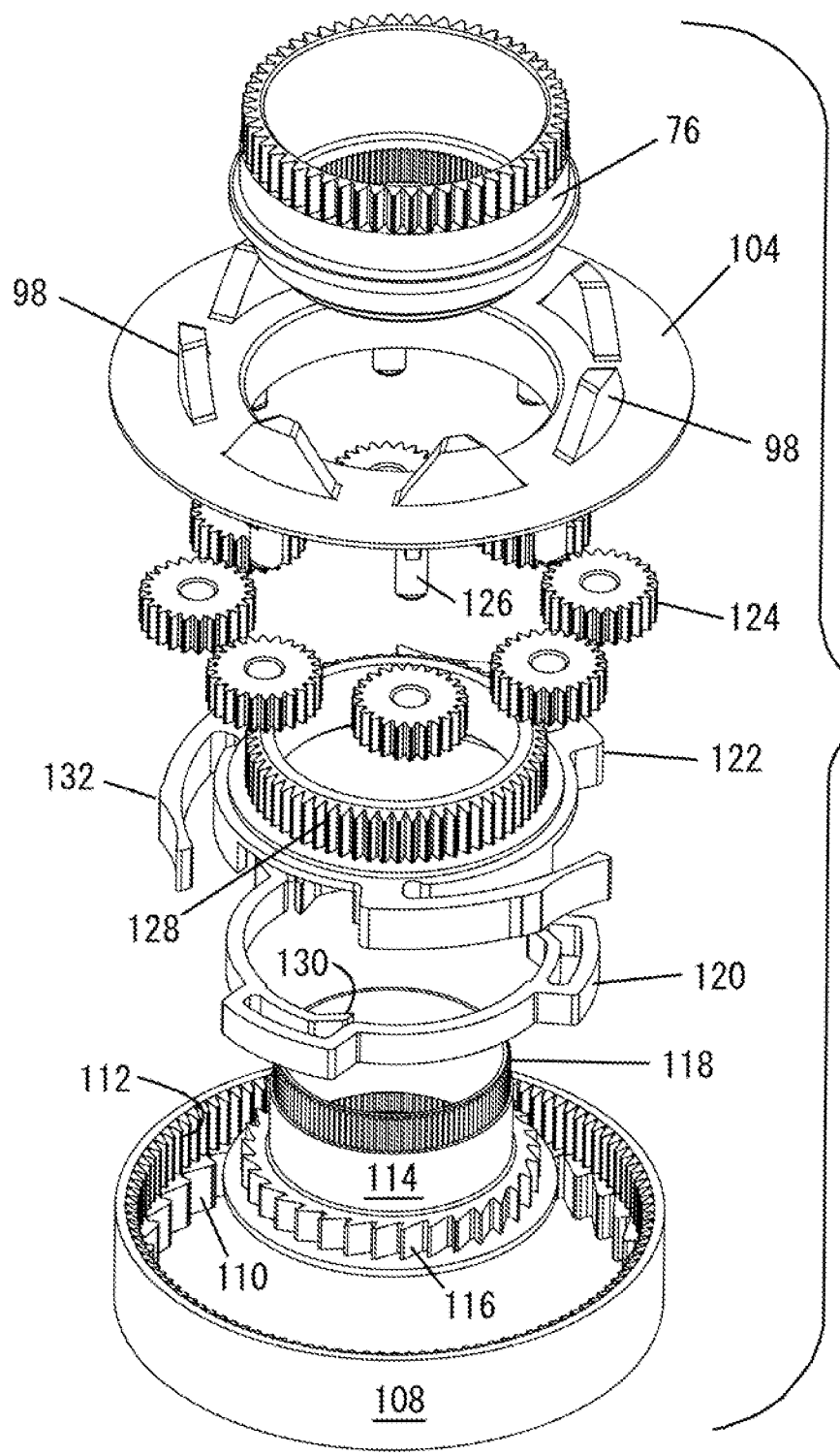
FIG. 9 is a further enlarged exploded view of the ratcheting sun gear assembly that is mounted in the top of the riser of the sprinkler of FIG. 1.
Figure 10:
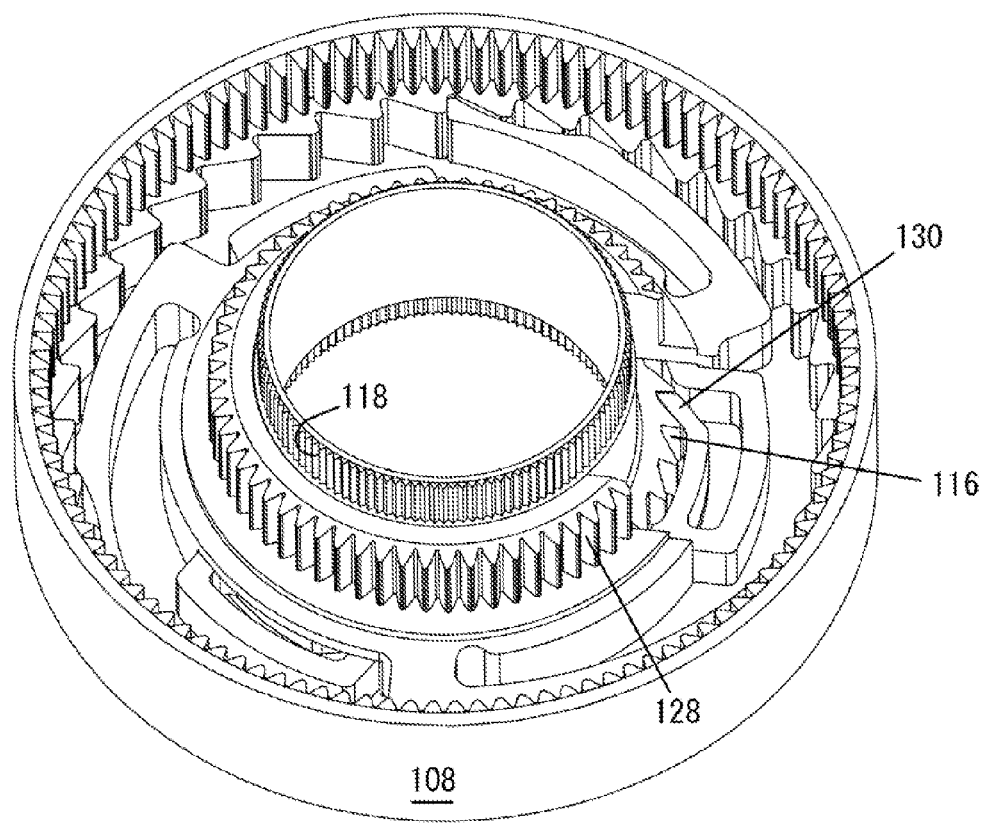
FIG. 10 is a greatly enlarged isometric view of the assembled ratcheting sun gear assembly components of the sprinkler of FIG. 1.
Figure 11:
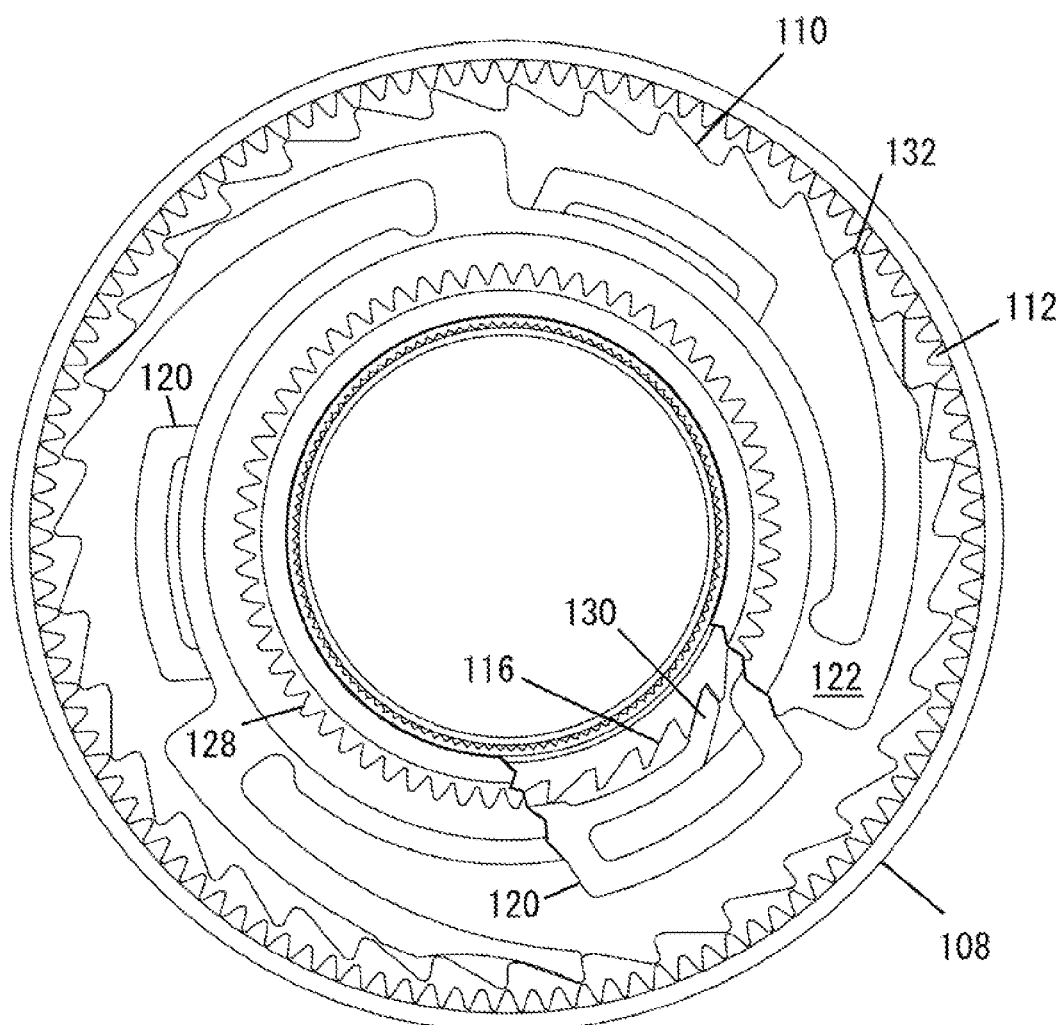
FIG. 11 is a greatly enlarged top plan view of the ratcheting sun gear assembly of FIG. 10 with a portion of the sun gear cut away for clarity.

FIGS. 8-12 illustrate the construction of a rotating cam assembly that reciprocates the diverter valve member 88. In this embodiment, the rotating cam assembly takes the form of a ratcheting sun gear assembly 105. The ratcheting sun gear assembly 105 is preferably of the type disclosed in co-pending U.S. patent application Ser. No. 12/612,599 filed Nov. 4, 2009 by Michael L Clark, et. al. and entitled "Low Precipitation Rate Rotor Type Sprinkler with Intermittent Stream Diffusers", also assigned to Hunter Industries, Inc., the entire disclosure of which is hereby incorporated by reference. The stainless steel sleeve that forms the outer casing of the non-rotating riser 36 is held securely in place by a sleeve retainer ring 106 (FIG. 8) which is rigidly secured to the inner plastic body of the riser 36. An outer drive ring 108 is securely mounted to the stationary sleeve retainer ring 106 and includes a plurality of inwardly projecting saw-tooth counter-clockwise ratchet stops 110. The ratchet stops 110 are formed on the lower portion of the inside diameter of the drive ring 108. A ring gear 112 is formed on an upper portion of the inside diameter of the drive ring 108. A clockwise drive sleeve 114 includes a plurality of clockwise ratchet teeth 116 and a plurality of coupling teeth 118. The drive sleeve 114 is rotationally coupled to the outside of the bull gear stem 80. An inner ratchet drive member 120 is joined in a non-rotatable fashion to an outer ratchet drive member 122 (FIGS. 9-10).

The assembled inner and outer drive members 120 and 122 (FIG. 9) fit over the outside diameter of the drive sleeve 114 and can move freely in a radial direction. A plurality of planetary gears 124 are rotatably mounted over corresponding circumferentially spaced vertical posts 126 which extend from the bottom side of the cam plate 104 beneath the cams 98. The planetary gears 124 mesh with the ring gear 112 and a sun gear 128 which is formed on an upper outside portion of the outer ratchet drive member 122.

During clockwise rotation, an inner ratchet dog 130 (FIG. 8) is engaged with the ratchet teeth 116 to drive the sun gear 128 rotationally in relationship to the outer drive ring 108. This causes the planetary gears 124 to turn between sun gear 128 and the ring gear 112 to rotate the cam plate 104 and the cams 98 in a clockwise direction. Three outer ratchet arms 132 (FIG. 9) flex past the ramps on the back sides of counter-clockwise ratchet stops 110 to allow the sun gear 128 to rotate in a clockwise direction. This is the normal direction of rotation when the sprinkler 30 is set for the nozzle turret 54 to turn in a full circle, three hundred and sixty degree rotation mode.

When the arc adjusting sleeve 74 (FIG. 5) is turned to cause the sprinkler 30 to cover an arc of less than three hundred and sixty degrees, the nozzle 56 oscillates back and forth between clockwise rotation and counter-clockwise rotation. When the bull gear stem 80 and nozzle turret 54 rotate counter-clockwise, the outer ratchet arms 132 stop on one of the radially extending faces of ratchet stop 110 and the inner ratchet dog 130 flexes past the rotating inner ratchet teeth 116 to prevent the sun gear 128 from rotating in the counter-clockwise direction.

Figure 14A:
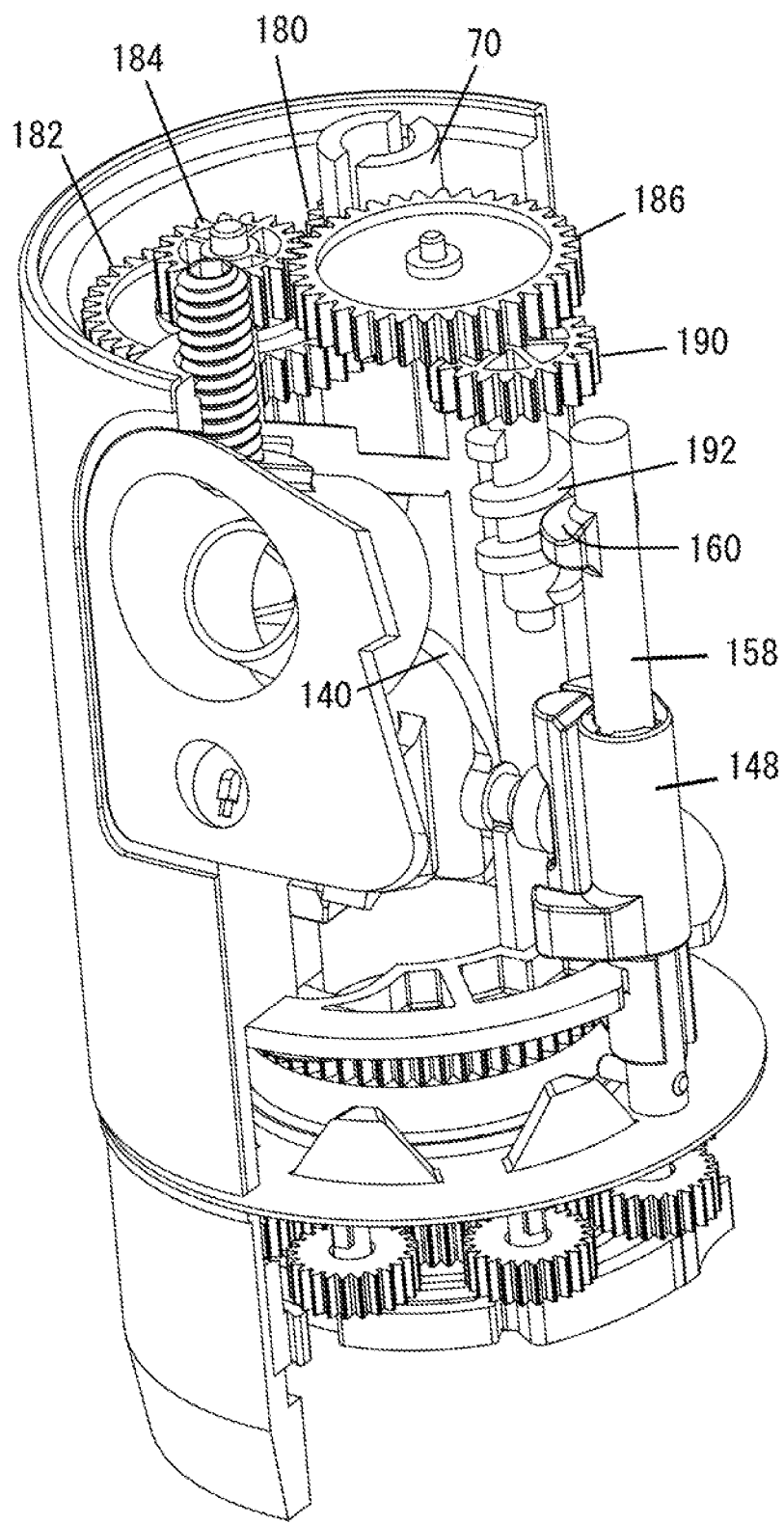
FIG. 14A is a view similar to FIG. 13A but slightly rotated about the vertical axis of the sprinkler with the upper cover of the sprinkler removed to reveal the gear linkage of the arc adjusting mechanism and the vertical lift control.
Figure 14B:
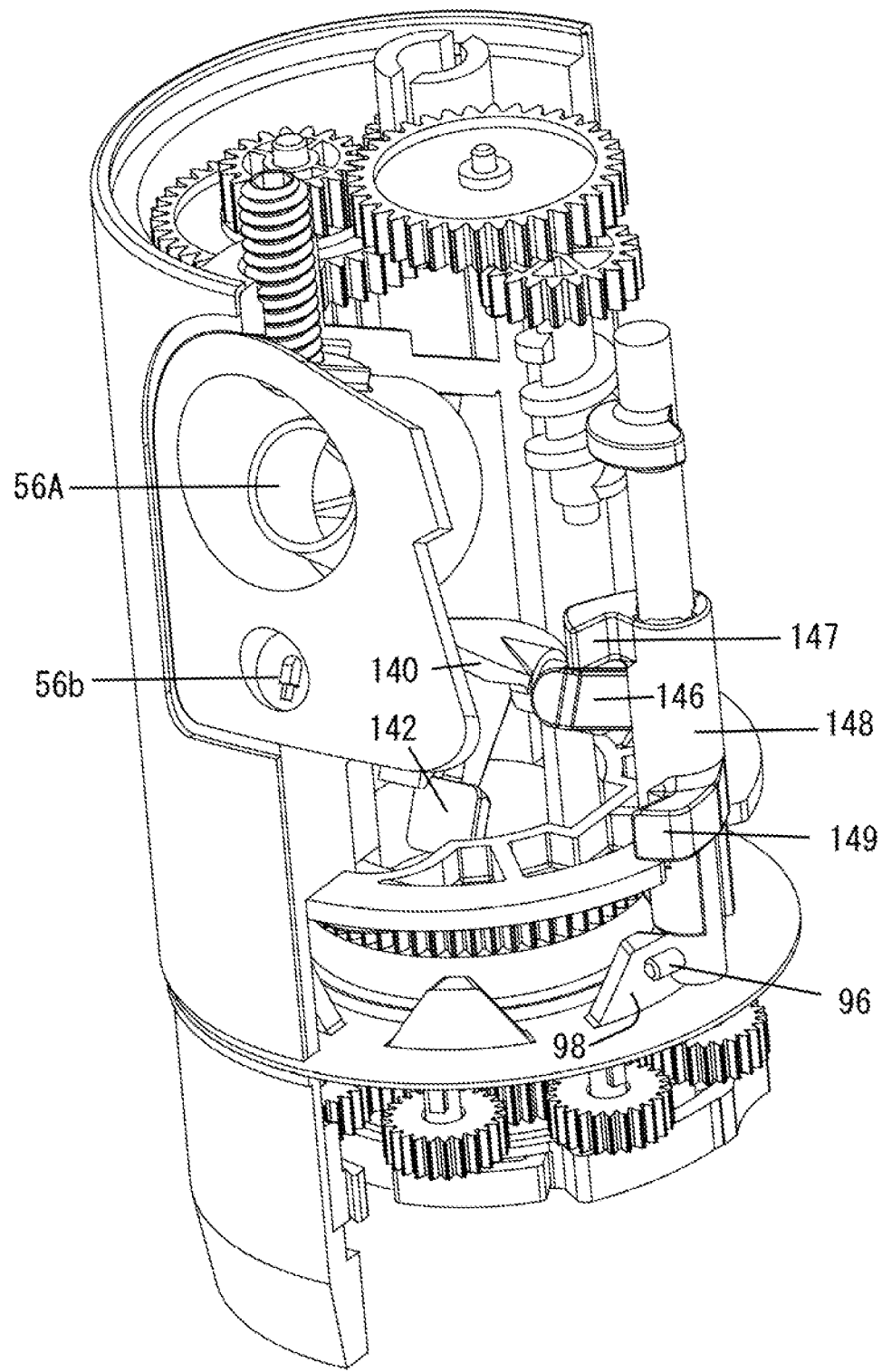
FIG. 14B is similar to FIG. 14A with the diverter valve in a state that directs water from the low flow rate port of the nozzle.
Figure 15A:
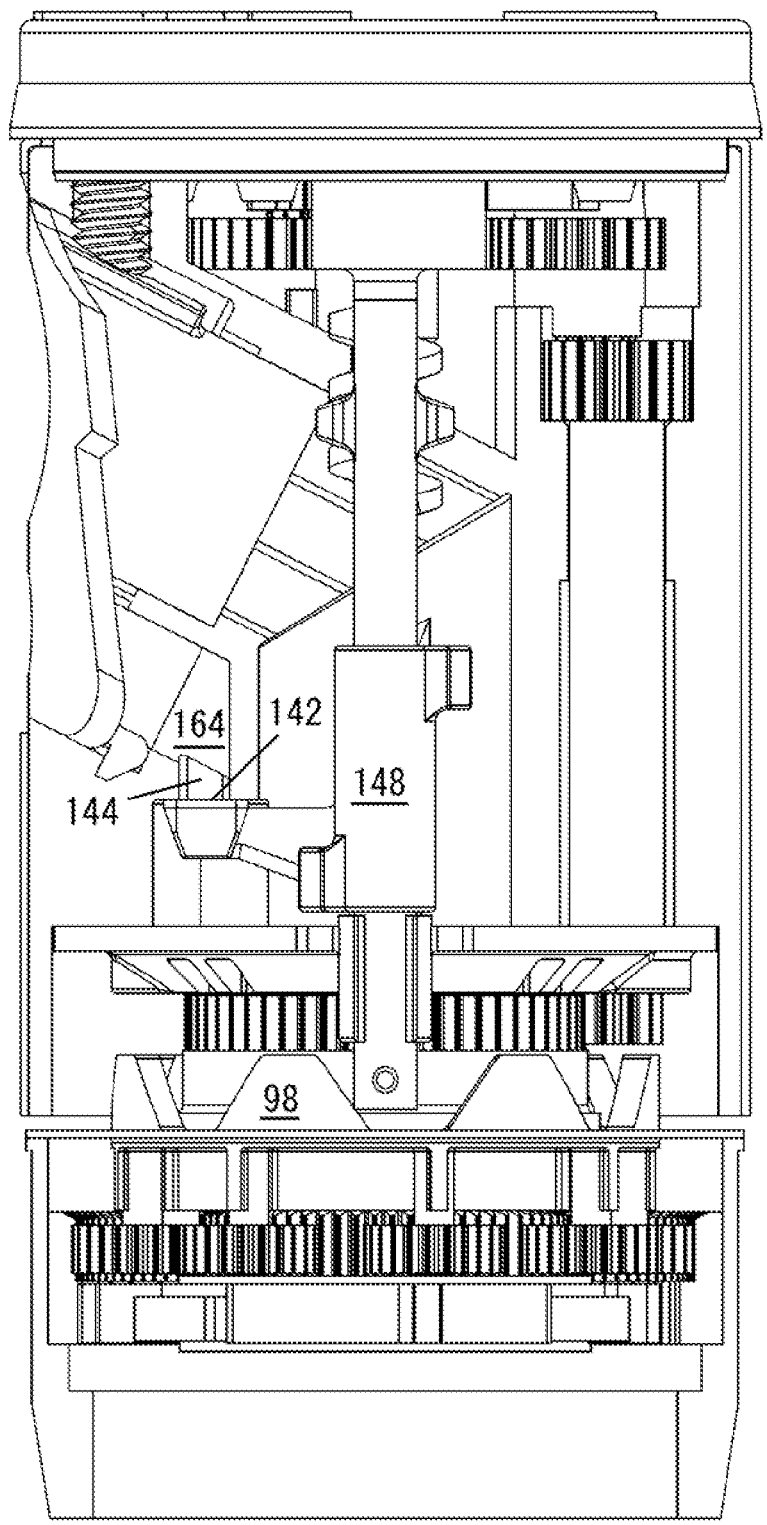
FIG. 15A is a vertical sectional view of the cut away nozzle turret assembly illustrating the nozzle diverter valve in a state that directs the flow of water to the high flow nozzle port of the nozzle.
Figure 15B:
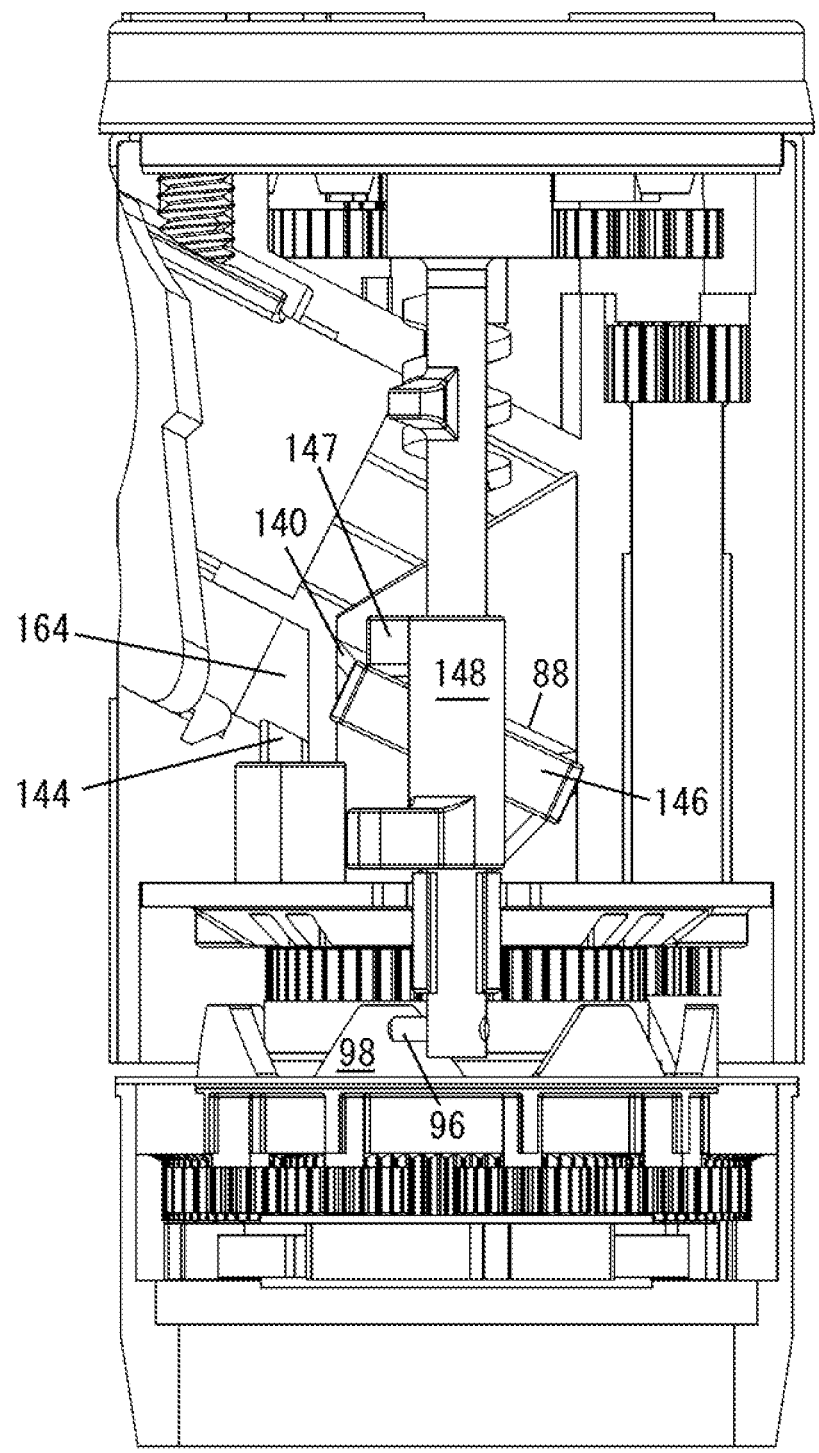
FIG. 15B is a view similar to FIG. 15A illustrating the diverter valve after it has changed states to direct water to the low flow rate port of the nozzle when the nozzle turret is turning in a clockwise direction.
Figure 15C:
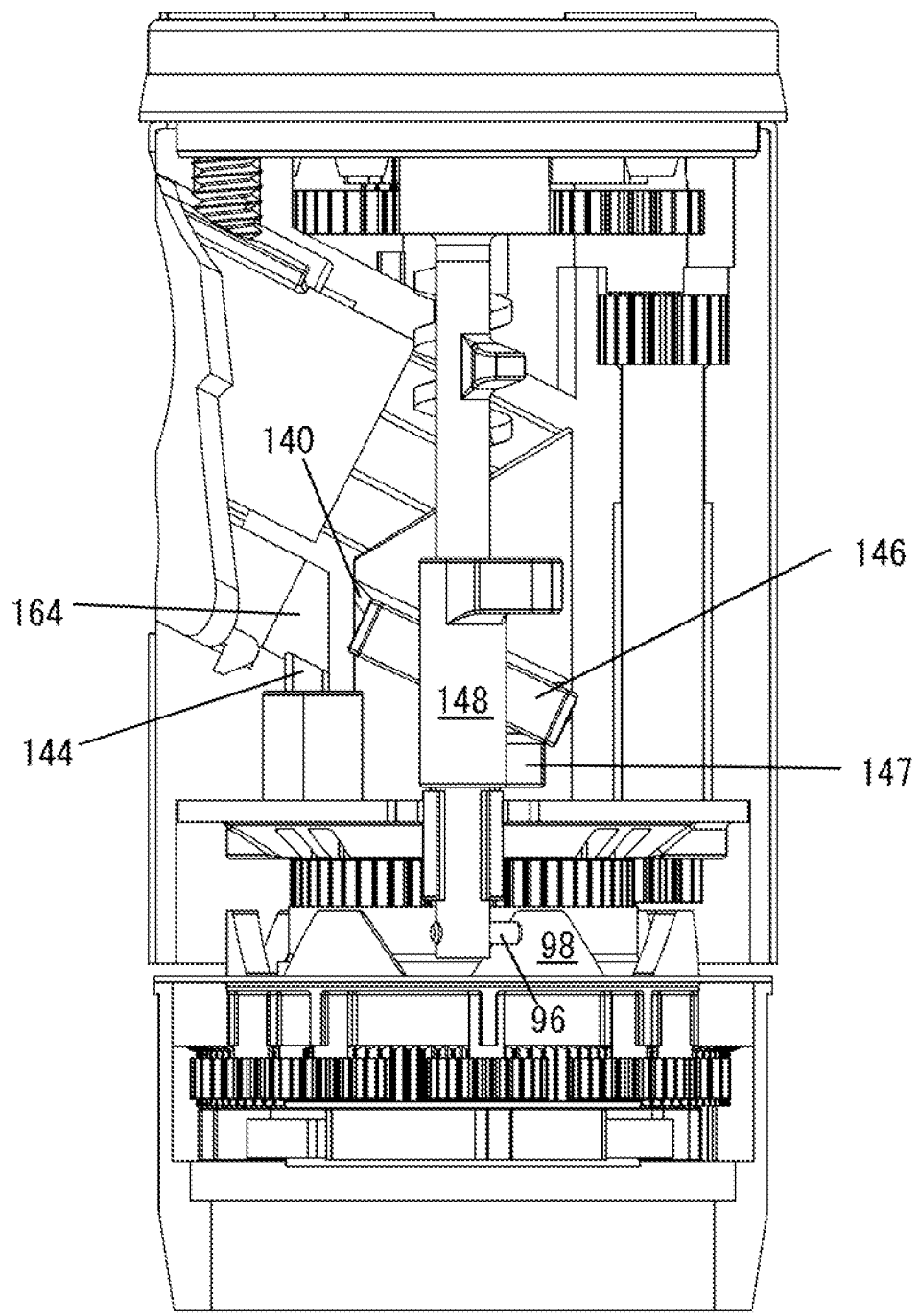
FIG. 15C is similar to FIG. 15B illustrating the diverter valve after it has changed to a state that directs water to the low flow rate port of the nozzle when the nozzle turret is turning in a counter-clockwise direction.
Figure 16A:
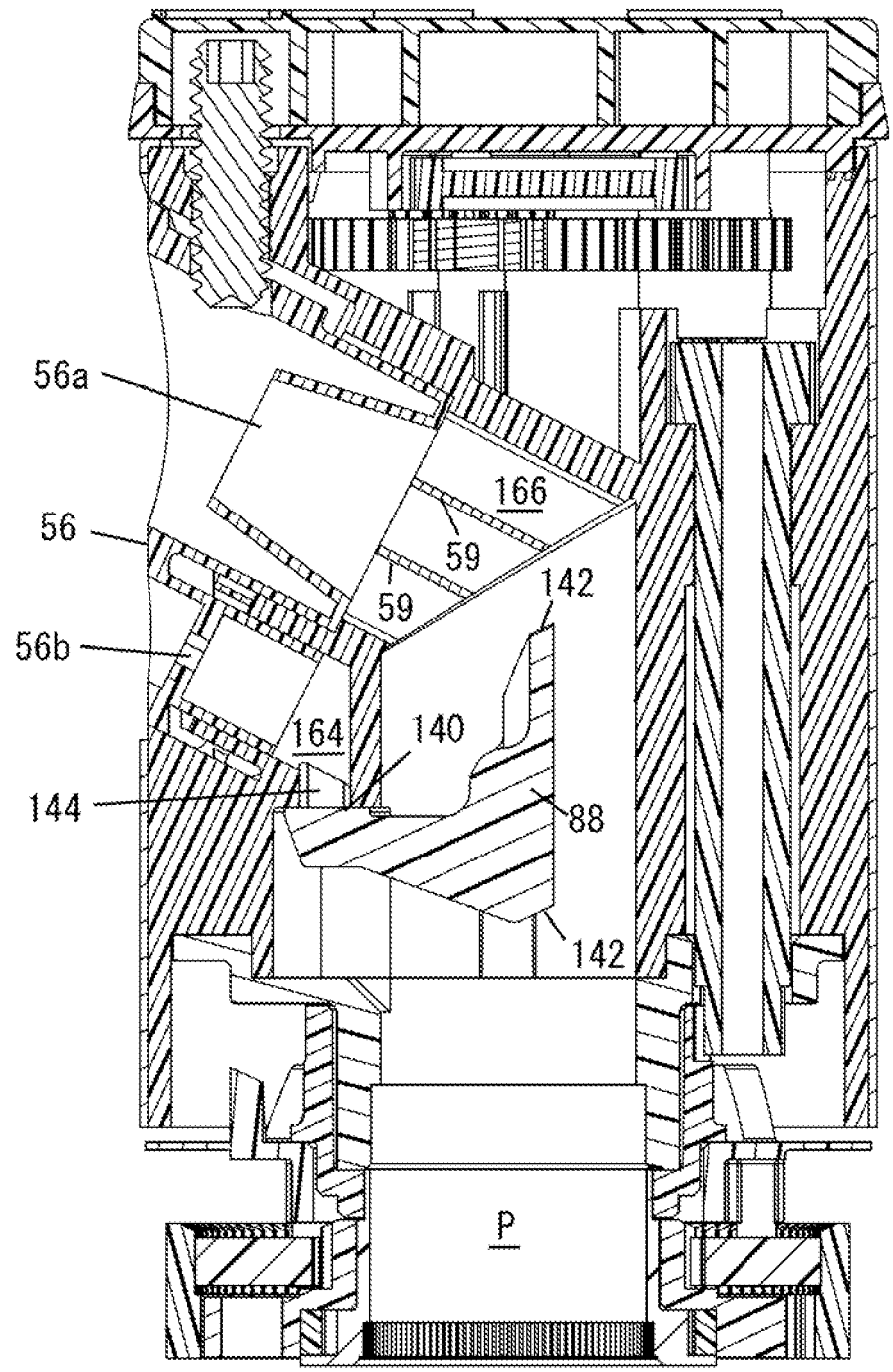
FIG. 16A is a vertical sectional view of the nozzle turret assembly of FIG. 4 illustrating the diverter valve in a state that directs water to the high flow rate port of the nozzle.
Figure 16B:
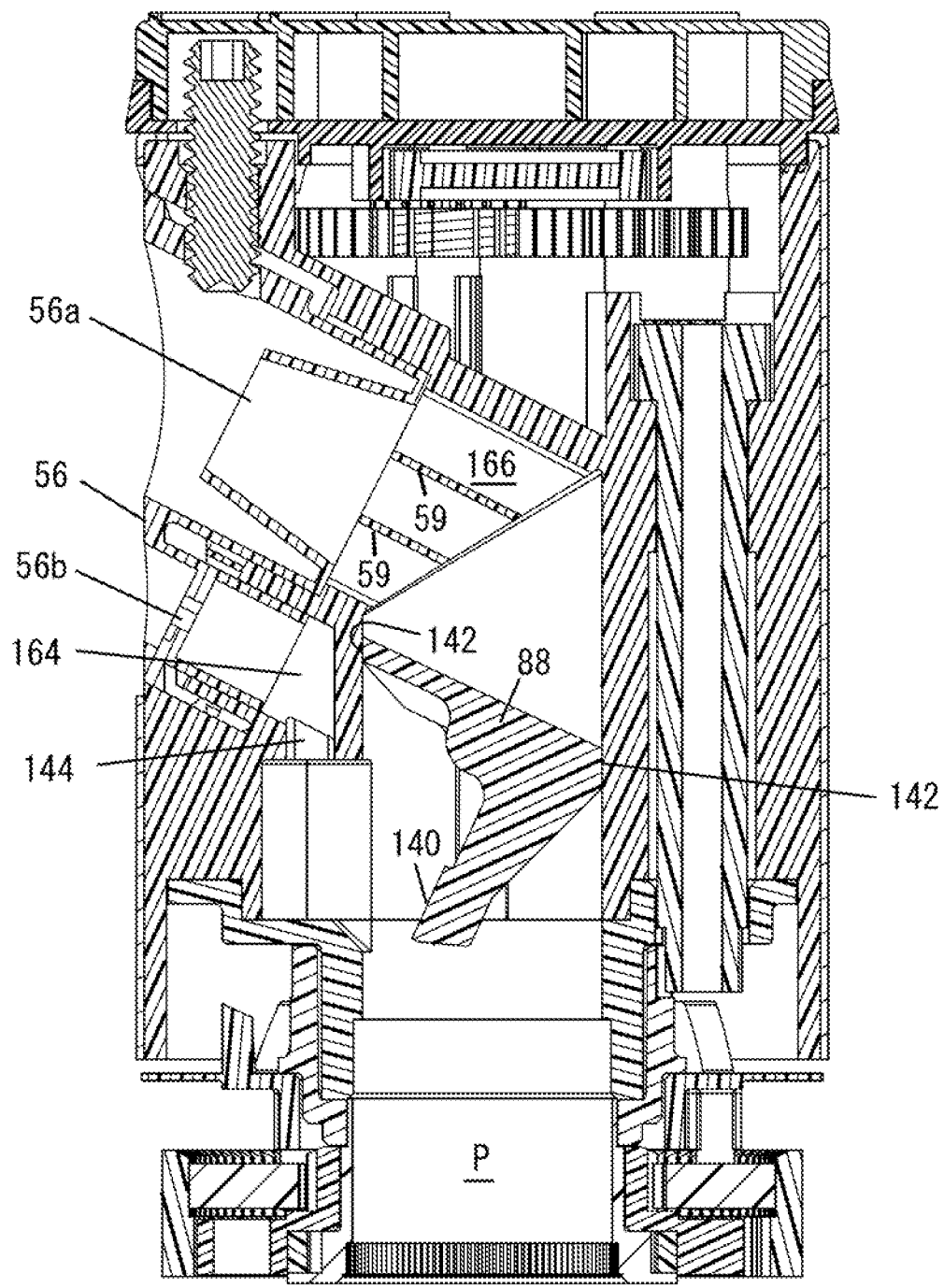
FIG. 16B is a vertical sectional view of the nozzle turret assembly of FIG. 4 illustrating the diverter valve in a state that directs water to the low flow rate port of the nozzle.
Figure 17:
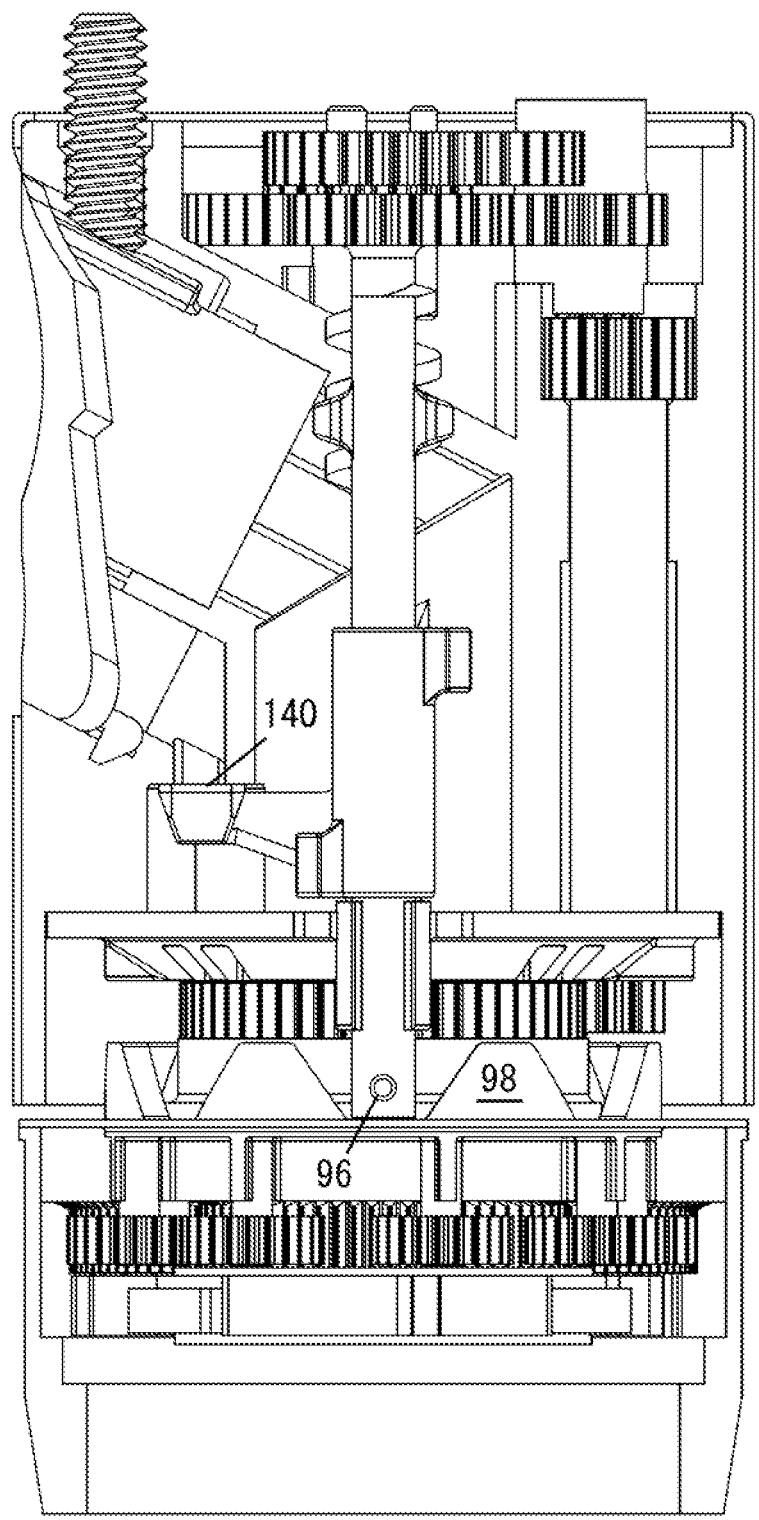
FIG. 17 illustrates the diverter valve control shaft in its lower position when the sprinkler is set to oscillate through an approximately a ninety degree arc.

FIG. 14A illustrates a geared coupling from the arc adjusting gear 70 to a vertical positioning helix 192. The arc adjusting gear 70 includes a drive gear 180 that rotates a larger gear 182 of a two-stage reduction gear that includes a smaller diameter gear 184. This drives an additional two-stage reduction gear that includes a larger diameter gear 186. A smaller diameter gear 188 (FIG. 7) extends from the lower surface of the gear 186 and drives a final reduction gear 190. The final reduction gear 190 is molded to the top of the vertical positioning helix 192. When the arc adjusting gear 70 is rotated by an operator to change the arc setting of the sprinkler 30, the vertical positioning helix 192 also rotates, but at a much lower speed. A cam arm lift tab 160 molded to the upper end of the cam arm 158 is positioned to fit between, and be moved up and down by, the turns of the helix 192 as the helix 192 rotates. When the sprinkler 30 is adjusted to water a ninety degree arc, the vertical position of the cam arm 158 (FIG. 7) and the cam follower 96 are in the lowered position illustrated in FIG. 17. In this position, the sprinkler 30 is configured so that the cam follower 96 is in a lower position relative to the cams 98 and the low flow rate port 56b will be open for longer periods of time than the high flow rate port 56a.

Figure 18:
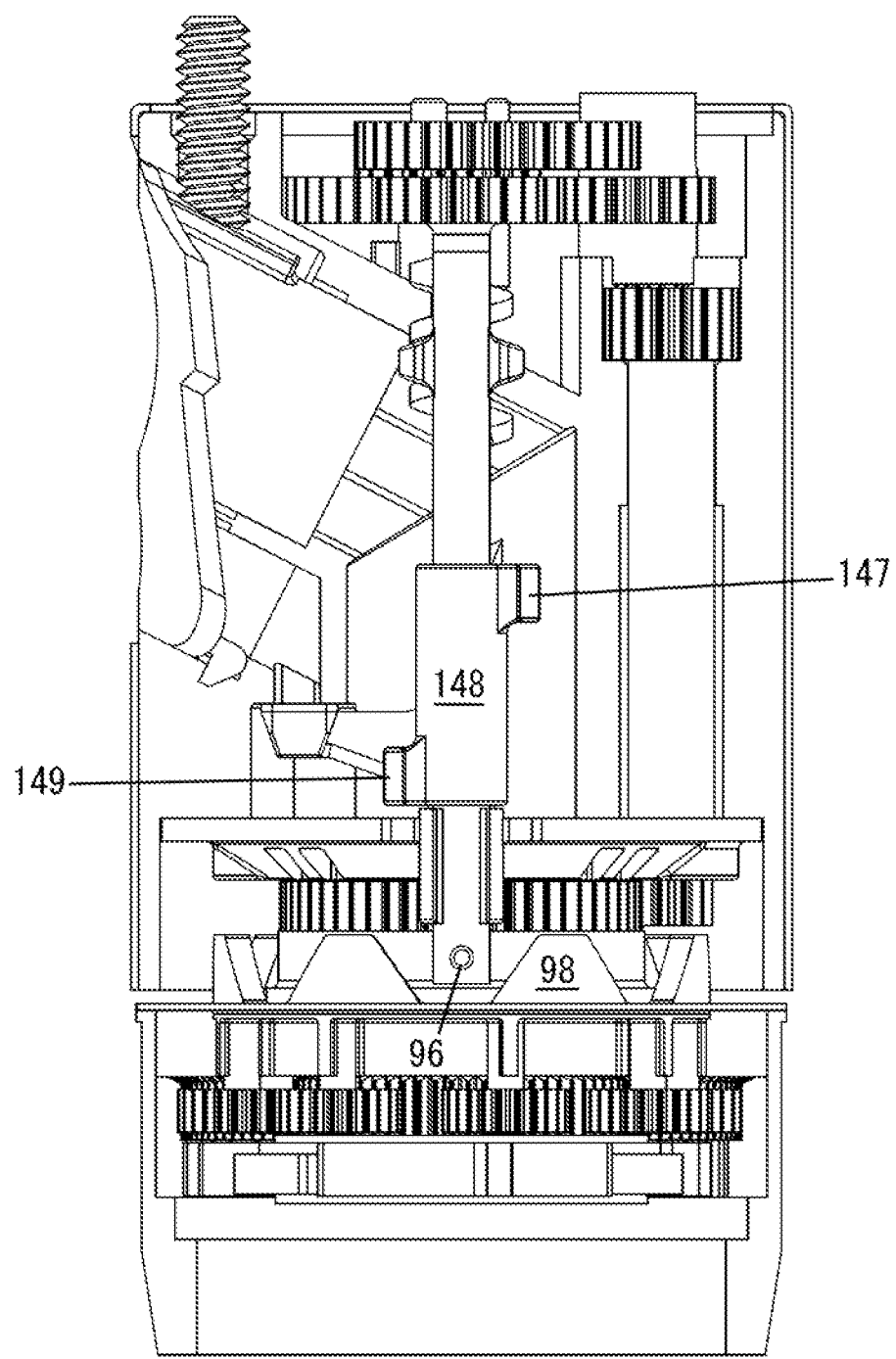
FIG. 18 illustrates the diverter valve control shaft in its raised position when the sprinkler is set to rotate through approximately a three hundred and sixty degree arc.

When the sprinkler 30 is set to irrigate an area of approximately three hundred and twenty degrees, the vertical position of the cam arm 158 and the cam follower 96 are raised to the positions illustrated in FIG. 18. The sprinkler 30 is then configured so the cam follower 96 is in a higher position relative to the sloped cams 98 and the high flow rate port 56a will be open for longer periods of time that the low flow rate port 56b. Arc positions that are higher or lower than those illustrated will move the position of the cam follower 96 relative to the sloped cams 98 to vary the differences of the open timing of the low flow rate port 56b and the higher flow rate port 56a.

The matched precipitation setting chart of FIG. 47 illustrates the relative changes in open time between the high flow rate port 56a and the low flow rate port 56b to achieve matched precipitation at various degrees of arc settings of the sprinkler 30. When the sprinkler 30 is set to cover three hundred and sixty degrees of coverage, it will distribute four times as much water as when the sprinkler 30 is set to cover only ninety degree arc of coverage. The vertical position of the cam follower 96 relative to the sloped surfaces of the cam 98 coordinate together to accomplish this result. It is possible that at a lowest arc setting of the sprinkler 30, e.g. approximately fifty degrees, the high flow rate port 56a may never open, and at a full three hundred and sixty degrees of coverage, the high flow rate port 56a may be open ninety-four percent of the time, or more, and the low flow part 56b may only be open momentarily, or not at all.

Figure 19:
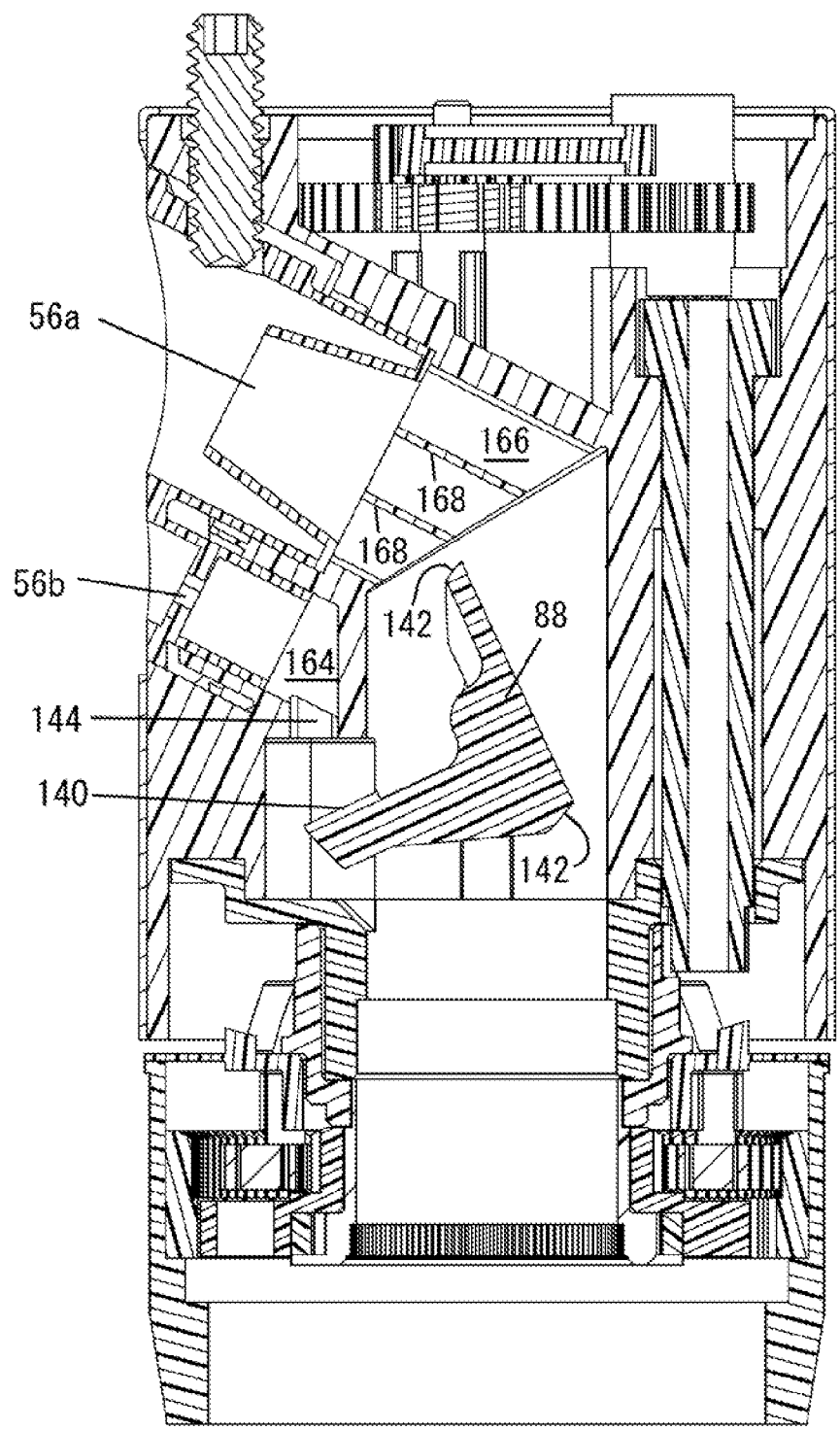
FIG. 19 is a vertical sectional view of a first alternate embodiment of the nozzle turret assembly illustrating the diverter valve in a state that directs water to both the low flow rate port and the high flow rate port of the nozzle.
Figure 20A:
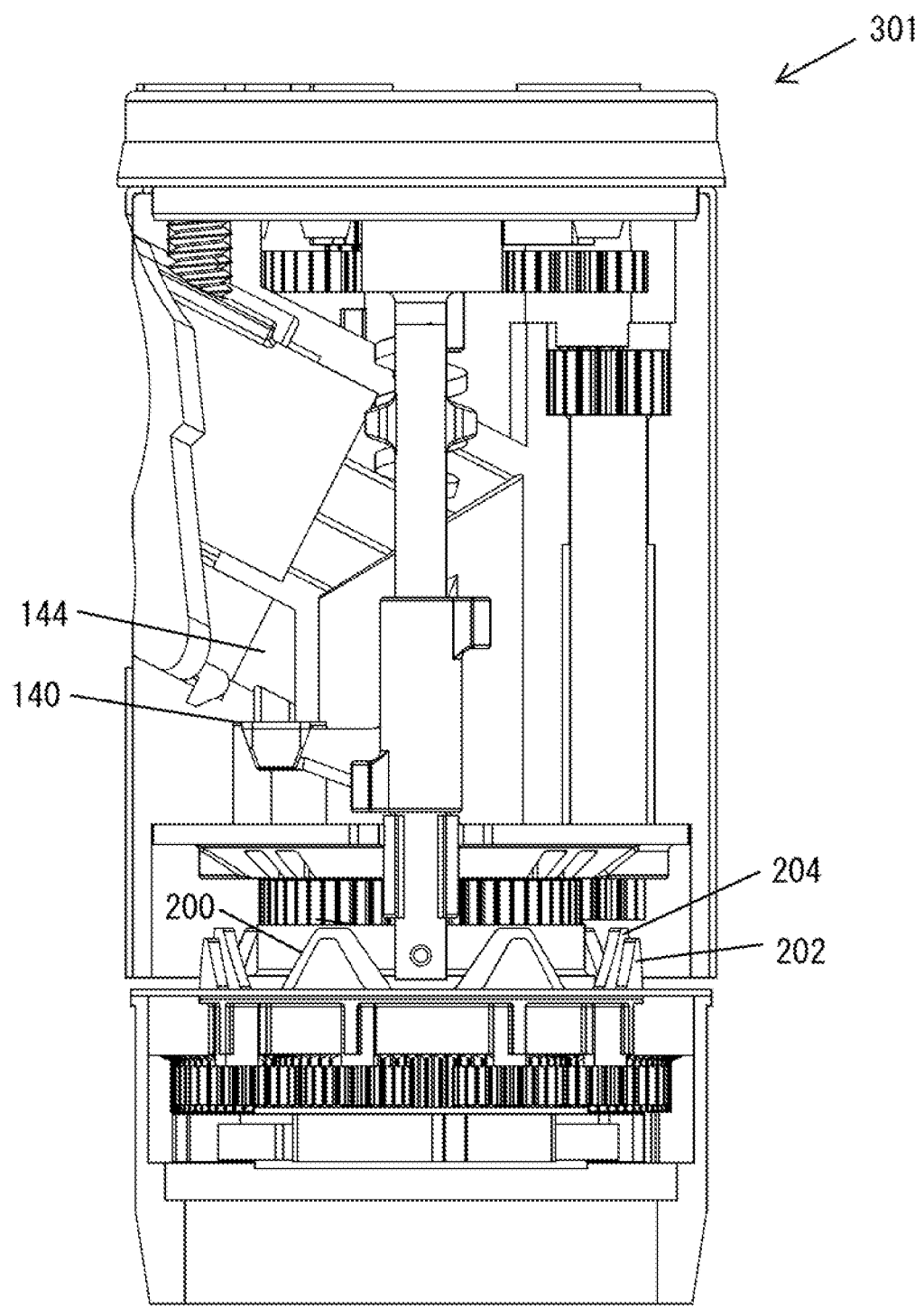
FIG. 20A is an enlarged front elevation cutaway view of the nozzle turret assembly and the diverter valve of the first alternate embodiment with a multi-surface cam that causes the diverter valve to direct water to the high flow rate port of the nozzle with the arc set to approximately two hundred degrees.
Figure 20B:
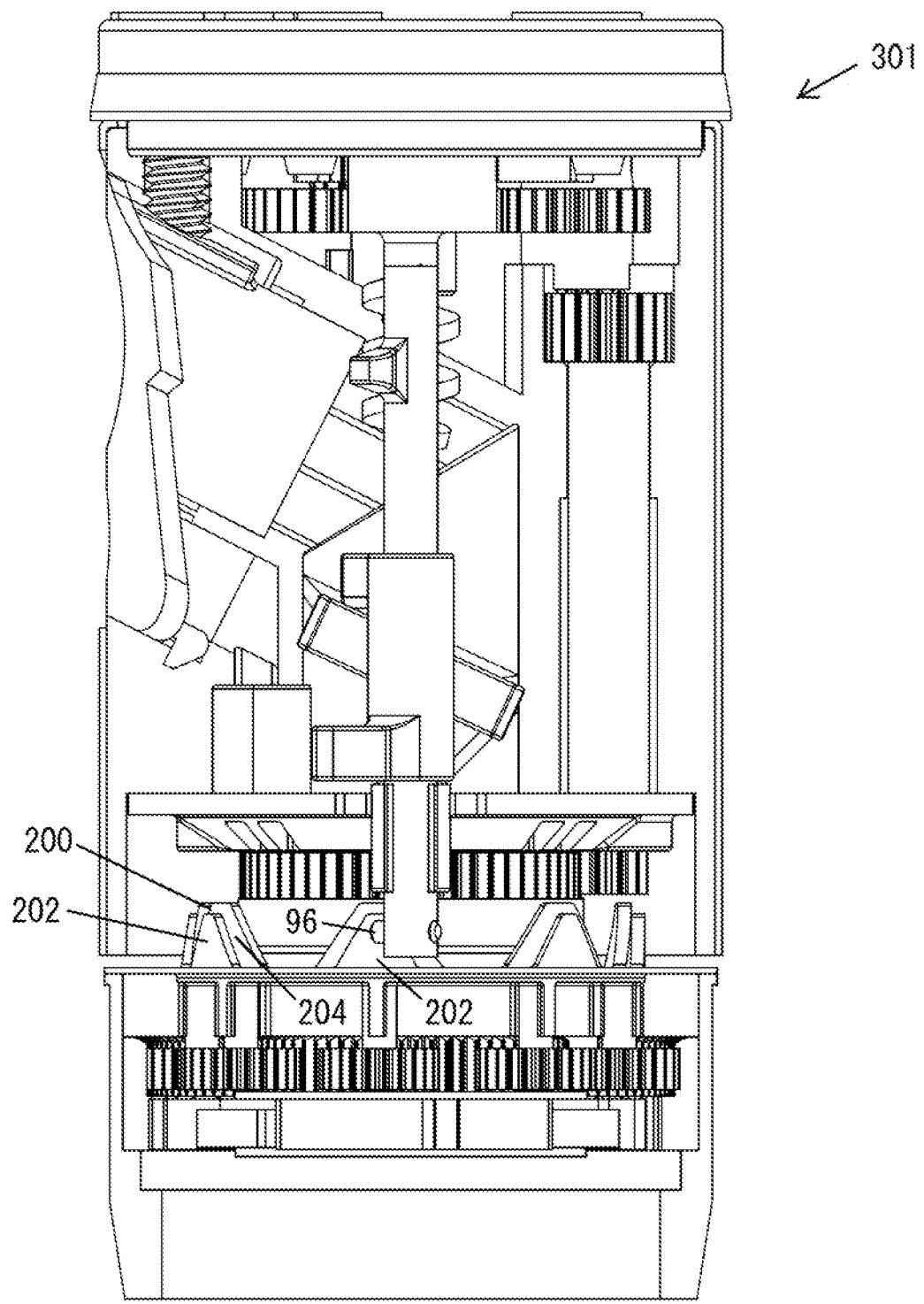
FIG. 20 B is a view similar to FIG. 20A with the cam slightly rotated.
Figure 20C:
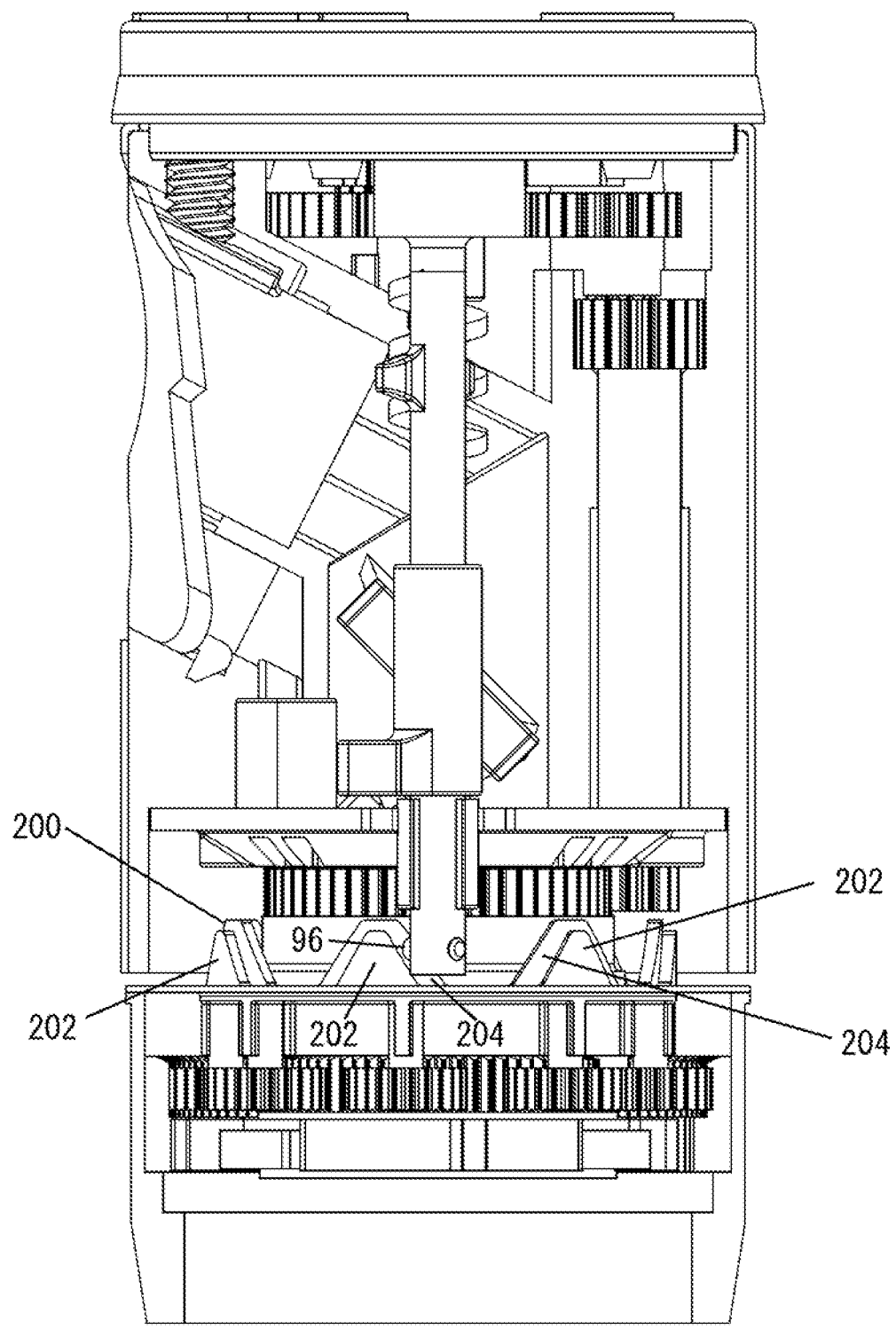
Figure 21:
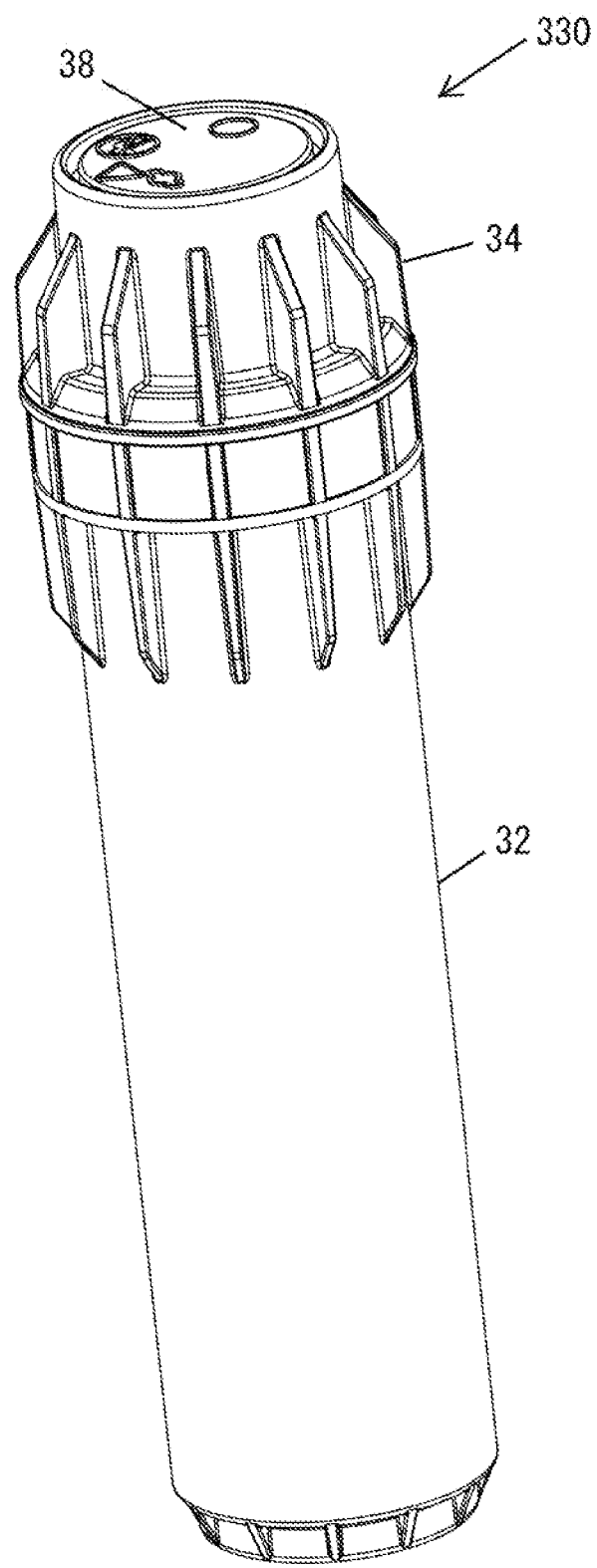
FIG. 21 is an isometric view of an assembled sprinkler representing a second alternate embodiment of the present disclosure.

FIGS. 19 and 20A-20C illustrate a first alternate embodiment 30' of the sprinkler that causes both the high flow rate port 56a and the low flow rate port 56b to be open at the same time. In this embodiment, each of a plurality of cams 200 has two cam surfaces formed by two overlapping vertical triangles. A shorter outermost surface 202 causes the high flow rate port 56a to be completely blocked and water to flow through the low flow rate port 56b as seen in FIG. 20B. When the cam follower 96 is in contact with an innermost taller surface 204, the diverter valve member 88 is positioned to cause water to flow through both the low flow rate port 56b and the high flow rate port 56a at the same time (FIGS. 19 and 20C). When the cam follower 96 is not contacting either surface of the cam 200, all of the water can flow through the high flow rate port 56a as illustrated in FIG. 20A. This feature may be important when the low flow rate port 56b sends water to a different radius for the sprinkler than the high flow rate port 56a. For example, the low flow rate port 56b may distribute water over and area of zero to twenty-five feet in radius, while the high flow rate port 56a may distribute water out to forty feet. Depending on how the flow rate ports 56a and 56b are designed to distribute the water within those radii, it may be advantages for both ports to be open at the same time to match the precipitation rates for the sprinkler 30' and also provide an even distribution of water through the full radius of coverage. The matched precipitation setting chart with both ports open (FIG. 48) illustrates the matched precipitation capabilities of this configuration. In this chart, the combined open time of the high flow rate port 56a and the low flow rate port 56b exceeds the arc setting for the sprinkler 30' indicating that both ports are intermittently open for defined periods of time. This relationship may change as the arc settings of the sprinkler 30' increase or decrease.

Thus it will be understood by those skilled in the art that the rotor-type sprinkler 30 has a drive assembly that couples the nozzle 56 and the gear train reduction 62 that is configured to allow the user to select between a full-circle mode of operation and an oscillating mode of operation. In addition, the sprinkler 30 includes a diverter valve including the diverter valve member 88, and a ratcheting sun gear assembly 105, that intermittently diverts the stream of water ejected from the nozzle 56 through a high flow nozzle port 56a and a low flow nozzle port 56b. In a part circle setting, the stream of water is diverted during both clockwise and counter-clockwise rotation of the nozzle 56. The ratcheting sun gear assembly 105 is configured so that the timing of the re-positioning of the diverter valve member 88 varies between each successive clockwise and counter-clockwise cycle of rotation of the nozzle 56 to ensure a substantially uniform water distribution over a pre-selected arc pattern of coverage. The ratcheting sun gear assembly 105 rotates in the same direction as the nozzle 56 during clockwise rotation, although it rotates at a substantially different speed. When the nozzle 56 of the sprinkler 30 reverses its direction of rotation to a counter-clockwise direction, the ratcheting sun gear assembly 105 is held in location and inhibited from moving and therefore the diverter valve member 88 changes positions more rapidly. Furthermore, the cam plate 104 is now in a different position relative to where it started the first pass, so the diverter valve member 88 shifts position in different areas on the next clockwise rotation of the nozzle 56. This is because the cam plate 104 did not rotate in the counter-clockwise direction, so the cam plate 104 resumes operation where it left off from the first clockwise pass. This will ensure a substantially uniform water distribution after a multiple number of shifting cycles during part circle operation. In a three hundred and sixty degree full circle setting, the ratio of the gears causes the valve shifting pattern to change with each rotation of the nozzle turret 54 to ensure a substantially uniform water distribution after a multiple number of revolutions. Furthermore, as the arc setting of the sprinkler 30 is changed, the relative position of the cam follower 96 to the sloped surfaces of cam 98 is also proportionately changed. This varies the dwell time so that the cam 98 moves the diverter valve member 88 from a position causing flow through the high flow rate port 56a and the low flow rate port 56b so that substantially the same amount of water is distributed to any given area in the same irrigation cycle regardless of the arc setting of the sprinkler 30.

The exact shifting pattern between the high flow rate port 56a and the low flow rate port 56b will vary based on the number of cams 98, the degree of slope on the leading and trailing edges of the cam and the gear ratio of the rotating cam assembly 105. Furthermore, the shifting pattern will be affected by the size of the selected arc of coverage. Because the ratcheting sun gear assembly 105 rotates in one direction, the starting point of the shifting pattern in either the clockwise or counter-clockwise direction will vary with each revolution. Based on the arc setting, several passes by the nozzle turret 54 may be required to get even coverage. However after one or more adequate run times of the zone including the sprinkler 30, the entire area will be wetted to a uniform coverage at a matched precipitation rate with other sprinklers on the same zone, regardless of the arc setting of each of the sprinklers 30. When the sprinkler 30 stops running, the diverter valve member 88 does not change, so it starts where it left off the next time the valve supplying water to the sprinkler 30 is turned ON, ensuring even coverage over time.

Figure 22:
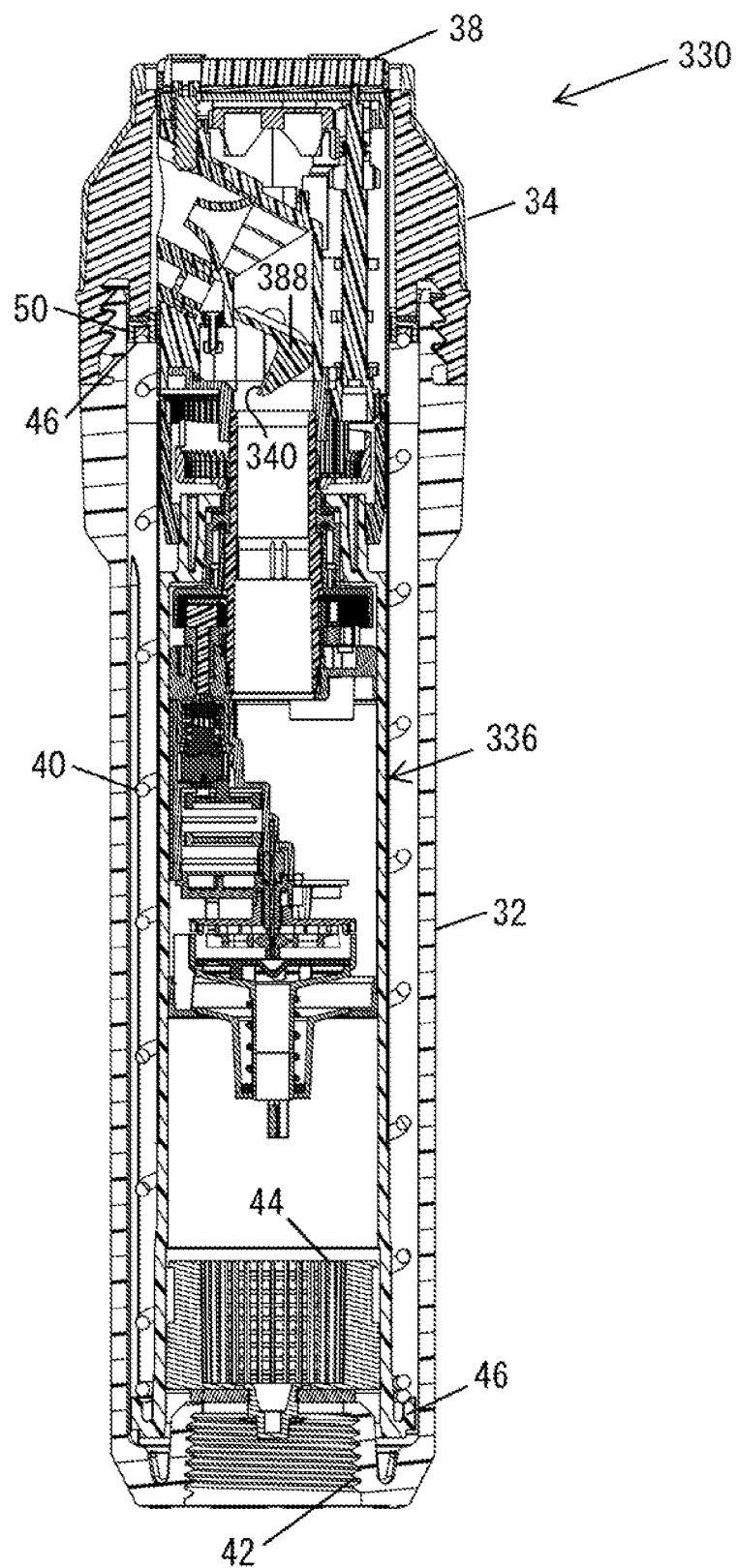
FIG. 22 is a vertical cross-sectional view of the sprinkler of FIG. 21.
Figure 23:
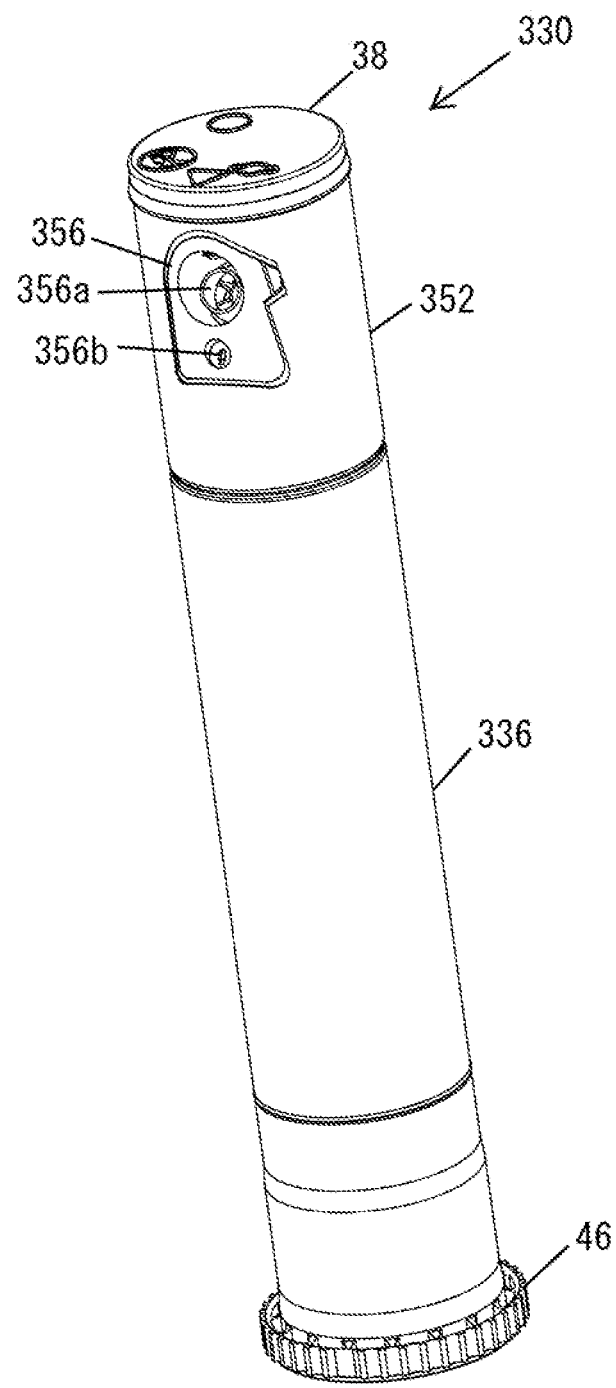
FIG. 23 is an isometric view of the telescoping riser of the sprinkler of FIG. 21.
Figure 24:
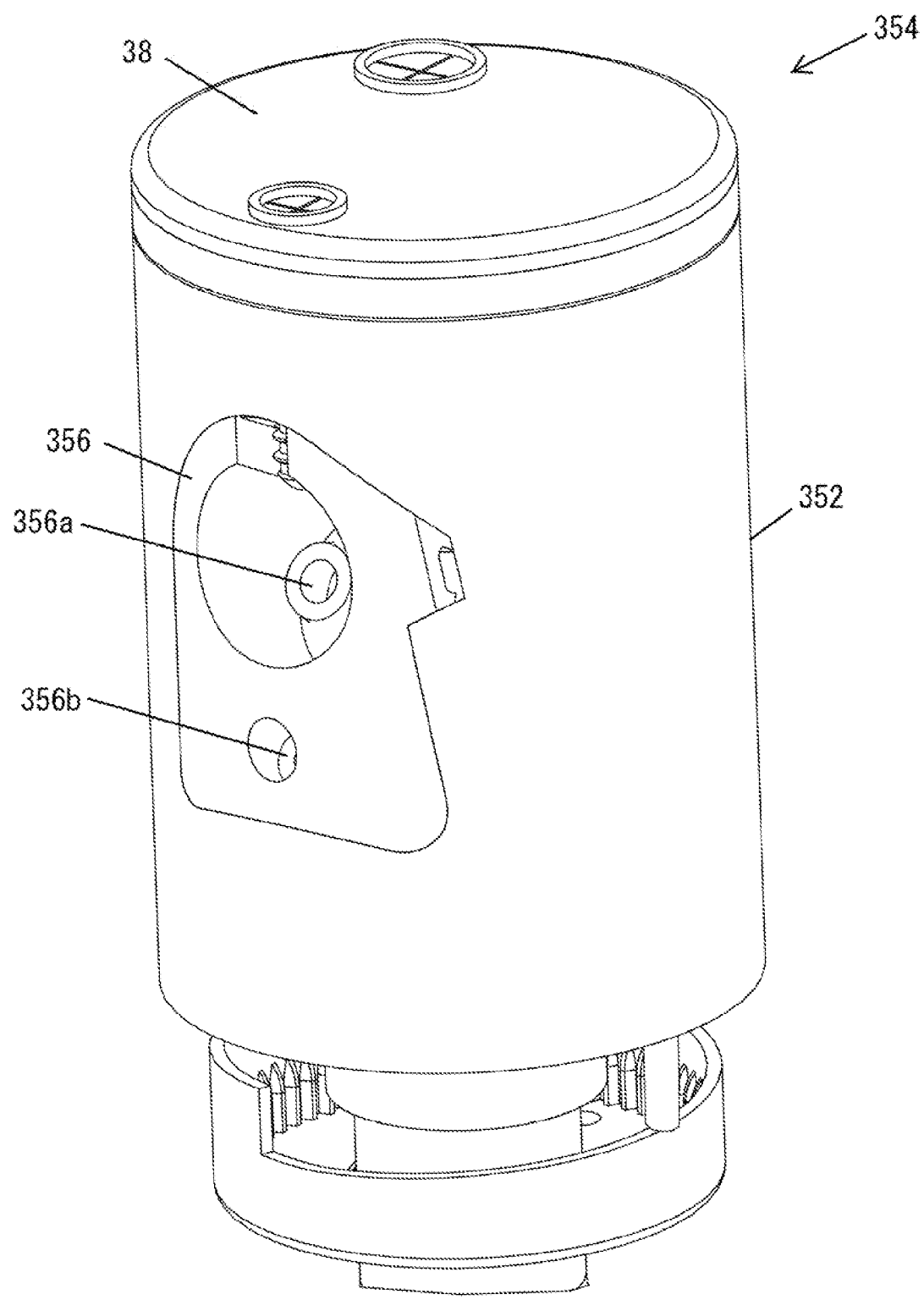
FIG. 24 is a greatly enlarged isometric view of the nozzle turret assembly of the sprinkler of FIG. 21.
Figure 25:
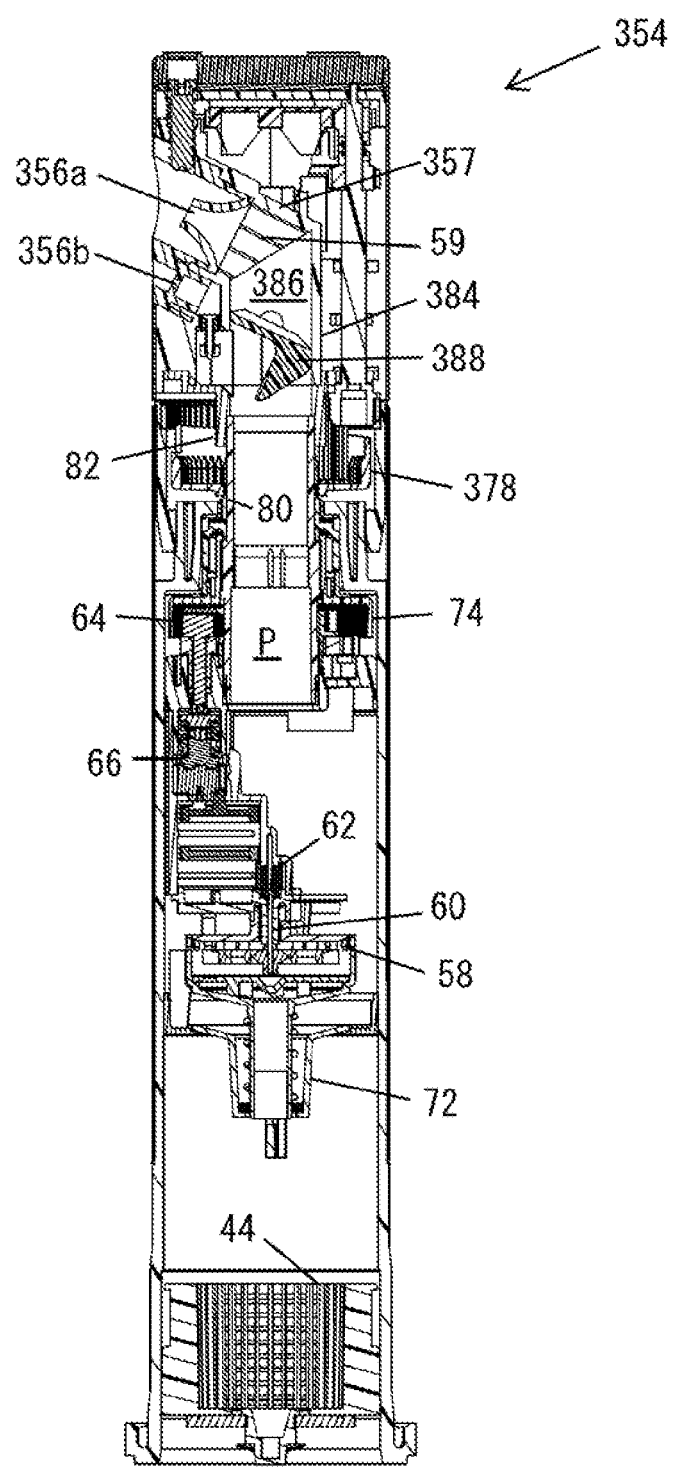
FIG. 25 is a vertical cross-sectional view of the riser of FIG. 23 illustrating its internal components including its arc adjusting mechanism.

FIGS. 21-46 illustrate the construction of an irrigation sprinkler 330 representing a second alternate embodiment of the present disclosure. With the exception of the construction of its nozzle turret, all of the components of the sprinkler 330 are the same as those of the embodiment illustrated in FIGS. 1-19. The sprinkler 330 is also designed to conserve water in the irrigation of turf and landscaping while maintaining the health of the vegetation by providing an equal or matched precipitation rate to a given area at any arc setting. Like the sprinkler 30, the sprinkler 330 is fabricated out of injection molded plastic parts, metal shafts, steel springs and seals made of a suitable elastomeric material. The sprinkler 330 includes a cylindrical outer case 32 and an end cap 34 which is threaded onto the cylindrical outer case 32 to contain a telescoping tubular riser 336 (FIG. 22). An elastomeric cover 38 is mounted to the top of the tubular riser 336 contained within the outer case 32.

The tubular riser 336 is telescopically extensible from the outer case 32 by water pressure and normally held in a lowered retracted position by a surrounding coil spring 40. The riser 336 is mounted co-axially within the case 32 and the riser 336 reciprocates vertically along its central longitudinal axis. The case 32 has a female threaded inlet 42 at is lower end for screwing over a male threaded fitting (not illustrated) connected to a subterranean pipe (not illustrated) which is in turn connected to a source of pressurized water such as a solenoid-actuated valve (not illustrated). A cylindrical screen 44 filters out debris from the water source that could otherwise render the sprinkler 330 inoperative.

The end cap 34 has a ring-shaped female threaded configuration so that it can be screwed over a male threaded upper end of the case 32. The lower end of the coil spring 40 seats in an upwardly opening annular groove formed in a lower shoulder 46 of the riser 36. The upper end of the coil spring 40 seats in a downwardly opening annular groove in a rigid retainer ring 48 held in place by the end cap 34. The riser 336 can telescope upwardly and downwardly through the end cap 34 to an extended position (not illustrated) when water pressure is applied at the inlet 42. This compresses the coil spring 40. When the water pressure is turned OFF the force of the compressed coil spring 40 pushes the riser 336 back to its retracted position illustrated in FIG. 22. An elastomeric wiper seal 50 is positioned between the riser 36, the retainer ring 48 and the case 32.

A cylindrical stainless steel turret cover 352 (FIG. 23) forms the exterior of a nozzle turret 354 (FIG. 24) that is rotatably mounted at an upper end of the riser 36. A nozzle 356 is removably mounted through an aperture in the cylindrical cover 352 into the nozzle turret 354. The nozzle 356 includes a high flow rate port 356a and a low flow rate port 356b. The high flow rate port 356a is larger in cross-sectional area than the low flow rate port 356b such that the former will emit a higher volume of water than the low flow rate port 356b.

A turbine 58 (FIG. 25) is mounted inside the riser 336 for rotation about a vertical axis by water entering the lower end of the riser 336. The turbine 58 is mounted to the lower end of an input shaft 60 of a staggered gear train reduction 62 mounted inside the riser 336. An arc-adjustable reversing mechanism 64 is mounted in the riser 336 and couples to a slip clutch 66 which transmits the drive force from the output of the gear train reduction 62 to drive a nozzle turret 354. The reversing mechanism 64 is one form of a gear driven coupling mechanism that optionally allows the arc adjusting shaft 370 (FIG. 27) to adjust the mode of operation of the sprinkler 330 from the top-side thereof. The reversing mechanism 64 can be adjusted to rotate the nozzle turret 354 and the nozzle 356 contained therein back and forth between selected arc limits to provide an oscillating sprinkler. The reversing mechanism 64 can also be adjusted to rotate the nozzle turret 354 in a continuous unidirectional manner. Other forms of gear driven couplings can be used to rotate the nozzle turret 354 and nozzle 356 solely in an oscillating manner. Other forms of the gear driven coupling can be used to rotate the nozzle turret 54 and nozzle 56 solely in a continuous unidirectional manner. A spring-biased stator 72 (FIG. 25) is mounted in the lower end of the riser 336 beneath the turbine 58 for controlling the RPM of the turbine 58.

The reversing mechanism 64 is preferably of the type disclosed in the aforementioned U.S. Pat. No. 7,287,711. See also U.S. Pat. No. 7,861,948 granted Jan. 4, 2011 to John D. Crooks, having the same title, and also assigned to Hunter Industries, Inc., the entire disclosure of which is hereby incorporated by reference. The arc adjusting sleeve 74 is rotationally coupled for adjustment to an arc adjusting gear 376 which is rotated by an arc adjusting shaft 370. The arc adjusting shaft 370 is rotated when an operator inserts an appropriate tool in the top of the arc adjusting shaft 370 to make a radial arc adjustment, or setting, to the limits of oscillating motion of the of the nozzle turret 354.

A vertically extending cylindrical bull gear stem 80 (FIG. 25) is rotationally coupled in a concentric fashion with the reversing mechanism 64 and provides a hollow tubular drive shaft that couples the nozzle turret 354 via a bull gear coupling 82. The upper end of the bull gear stem 80 is securely bonded to the bull gear coupling 82 which in turn is securely bonded in a cylindrical sleeve 384 of the nozzle turret 354. The nozzle turret 354 and the nozzle 356 inserted therein are thus supported for rotation relative to the riser 336 and the case 32 by the bull gear stem 80. The upper end of the bull gear stem 80 terminates closely adjacent to the lower segment of a dog-legged tubular structure 386 (FIG. 25) formed in the nozzle turret 354. The lower segment of the tubular structure 386 is cylindrical and centered axially in the nozzle turret 354. The nozzle 356 is inserted into the upper inclined, radially extending segment 357 of the tubular structure 386 downstream from stream straighteners 59. The interior of the bull gear stem 80 provides a relatively large central flow passage P that conveys water to the nozzle 356. A diverter valve member 388 is pivotally mounted in the lower segment of the tubular structure 386 within the passage P to redirect the flow of water from the high flow nozzle port 356a to the low flow nozzle port 356b.

Figure 34:
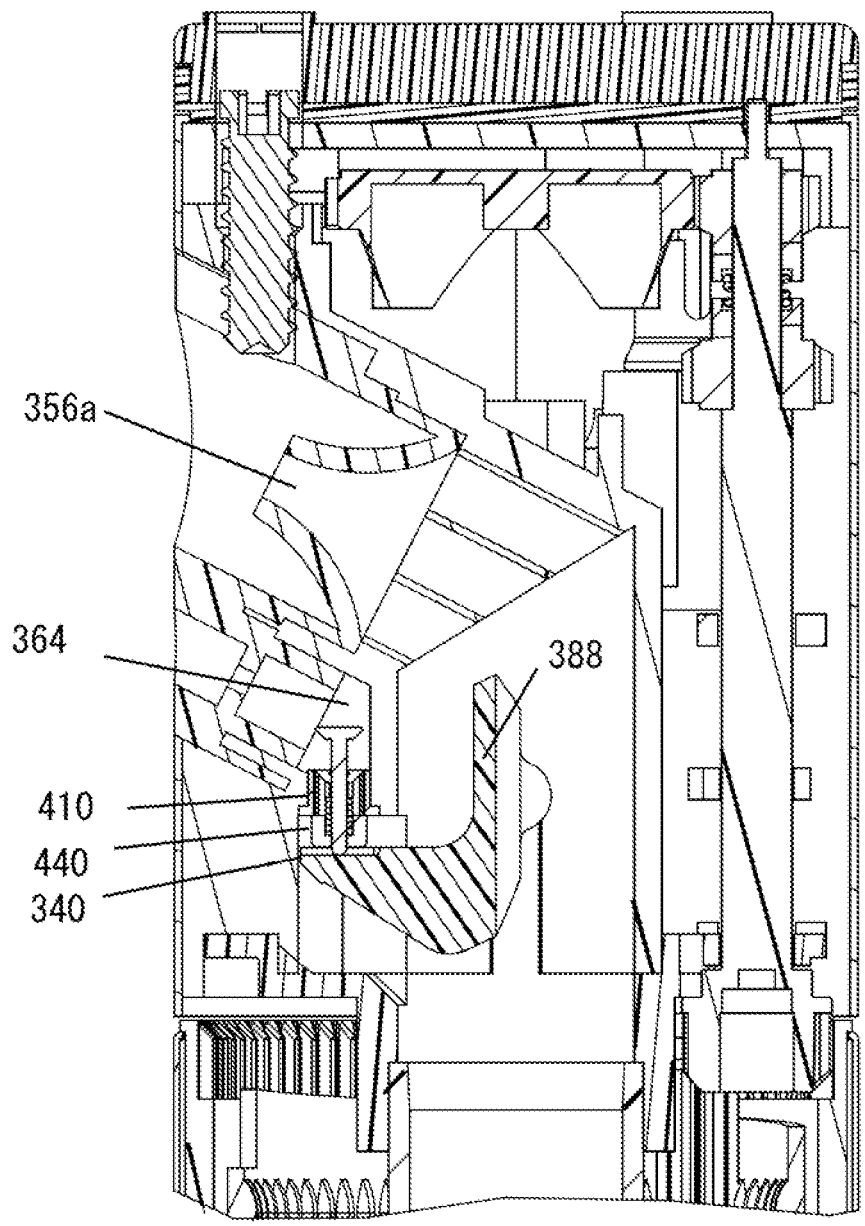
FIG. 34 is a view similar to FIG. 32 illustrating the diverter valve member of the diverter valve in slightly different position.
Figure 35:
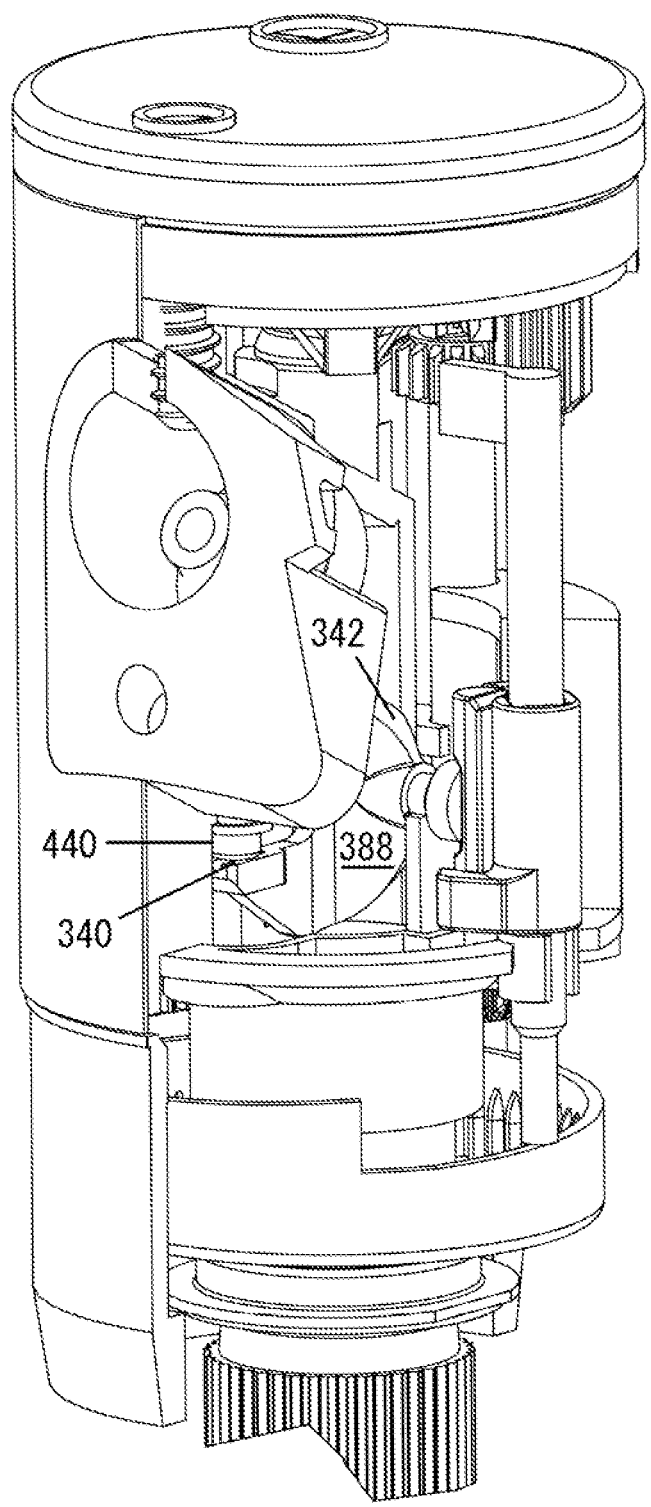
FIG. 35 is an enlarged external cut away view of the cam, cam arm, and diverter valve of the sprinkler of FIG. 21 with the diverter valve member in the same position as illustrated in FIG. 24.

FIGS. 32-44 illustrate details of a diverter valve that intermittently moves the diverter valve member 388 in the nozzle turret 354 to direct water from port P to either the high flow rate port 356a or the low flow rate port 356b of the nozzle 356. The diverter valve member 388 is pivotally mounted in slots in the cylindrical sleeve 384 and retained in position by valve support arms 383a and 383b (FIG. 27) which extend upward from a bull gear coupling 382. The diverter valve member 388 includes an integrally formed low flow rate port shut-off member 340 (FIG. 32) and a high flow rate port shut-off surface 342 (FIG. 35). The high flow rate port shut-off surface 342 is a peripheral surface of an elliptical portion of the diverter valve member 388 that can engage the surfaces of the lower segment of the dog-legged tubular structure 386 to seal off flow to the high flow rate port 356a. A valve return torsion arm 452 (FIG. 27) includes a shaft 453 which is attached in a fixed manner to the diverter valve member 388. An O-ring 456 is mounted in an O-ring cap 454 and surrounds the shaft 453 to prevent pressurized water leakage around the shaft 453. A valve return coil spring 450 urges the diverter valve member 388 to a normal position that causes water to flow through the high flow rate port 356a and keep a valve input arm 346 (FIG. 36) in constant contact with an upper cam arm 347 or a lower cam arm 349 of a cam arm coupling 348. The valve input arm 346 includes a horizontal shaft 345 (FIG. 27) which is attached in a fixed manner to the diverter valve member 388. An O-ring 456 is mounted in an O-ring cap 454 and surrounds the shaft 345 to prevent pressurized water leakage around the shaft 345.

Figure 26A:
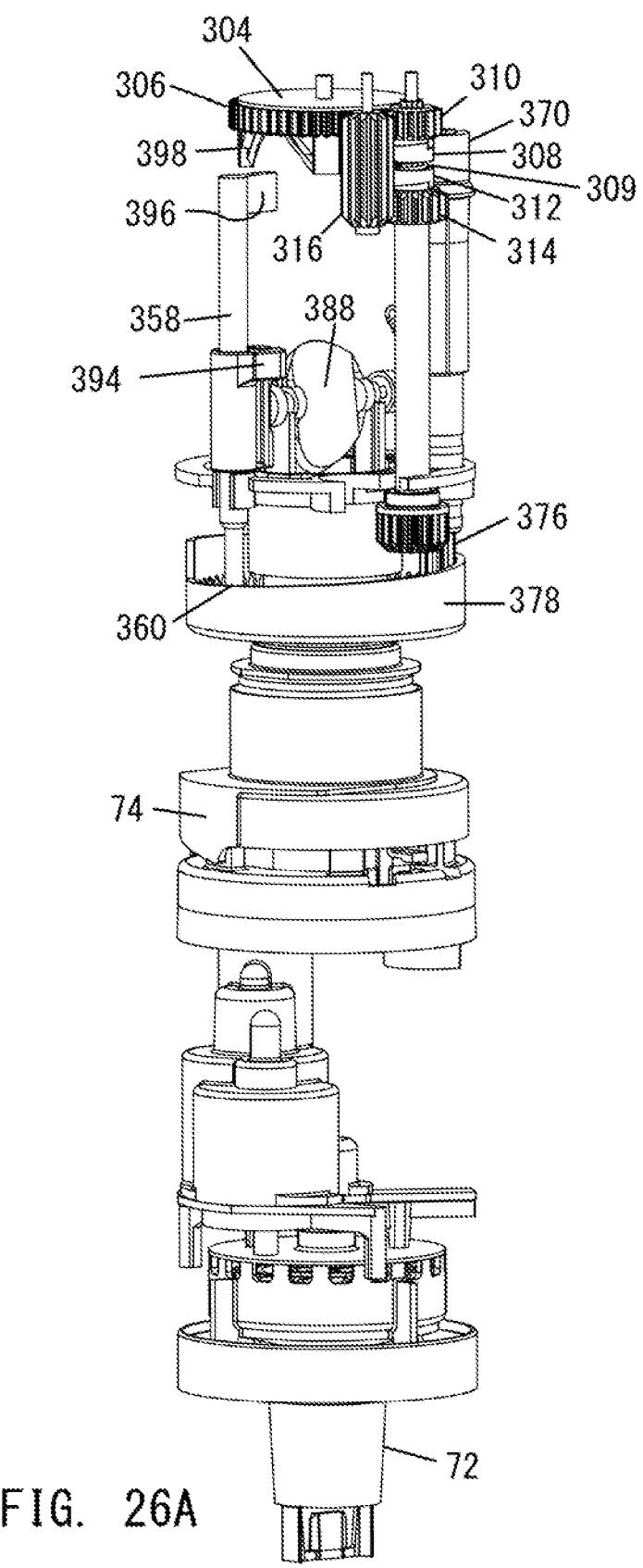
FIG. 26A is an enlarged side elevation view of the cam drive and gear drive of the sprinkler of FIG. 21.
Figure 26B:
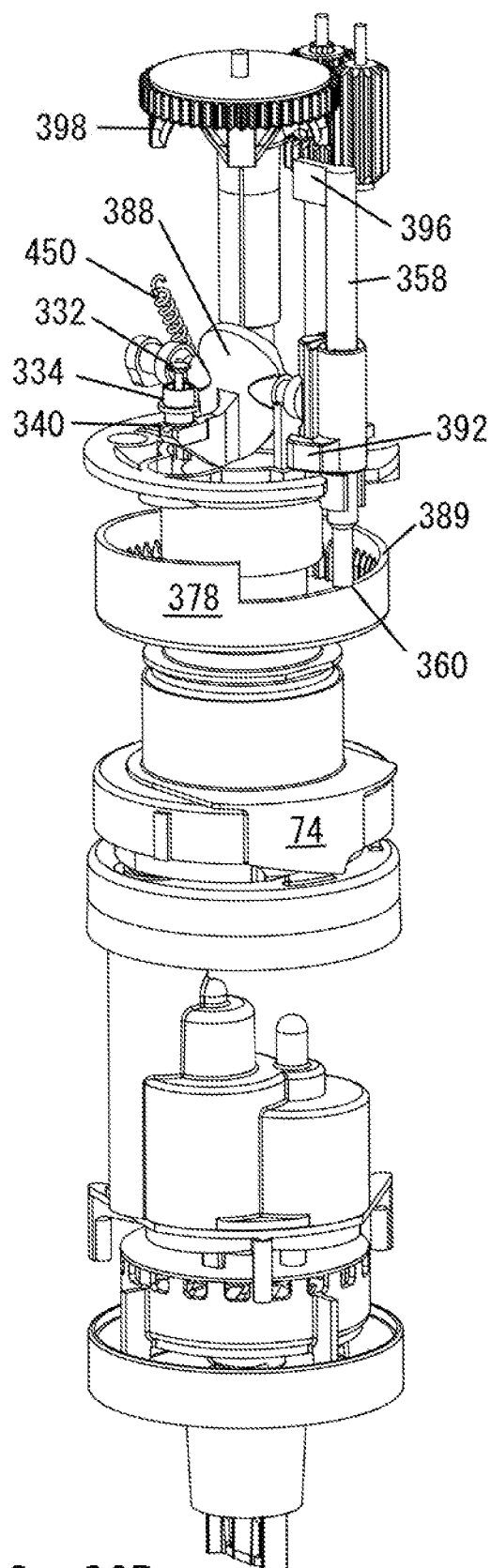
FIG. 26B is a view similar to FIG. 26A but slightly rotated to reveal additional details of the cam drive and gear drive.

A cam follower 396 (FIG. 46) protrudes from the upper end of a vertically extending cam drive arm 358. The drive arm 358 passes through a splined bore of a cam arm coupling 348 (FIG. 27) such that it can move axially in relationship to the cam arm coupling 348, but it is rotationally coupled with splines 362. Therefore, any rotational movement of the cam drive arm 358 causes the cam arm coupling 348 to rotate relative to a plurality of circumferentially spaced cams 398 (FIG. 26A). As the nozzle turret 354 rotates, a cam plate 304 that supports the cams 398 rotates relative to the nozzle turret 354 in a constant direction of rotation. As the cams 398 engage a cam follower 396, the cams 398 cause the cam follower 396, cam drive arm 358, and cam arm coupling 348 to rotate. This rotational movement causes the upper cam arm 347 to rotate the valve input arm 346 and rotate the diverter valve member 388 to various positions. The diverter valve member 388 can rotate from a position that shuts off flow to the high flow rate port 356a and allows water to pass through a low flow rate port valve 410 (FIG. 34) to a chamber 364 (FIG. 41) that communicates with the low flow rate port 356b. The diverter valve member 388 can rotate to a position in which there is no contact with the cam follower 396. In this configuration the valve return coil spring 450 causes the diverter valve member 388 to return to its home position allowing water to once again flow into the tubular structure 386, past the stream straighteners 59 and through the high flow rate port 356a. In this configuration, the low flow shut-off member 340 (FIG. 32) of the diverter valve member 388 prevents flow of water to the low flow rate port 356b by pressing on a valve stem 416 (FIG. 33A) to cause the low flow port valve 410 to provide a substantially water tight seal.

Figure 30A:
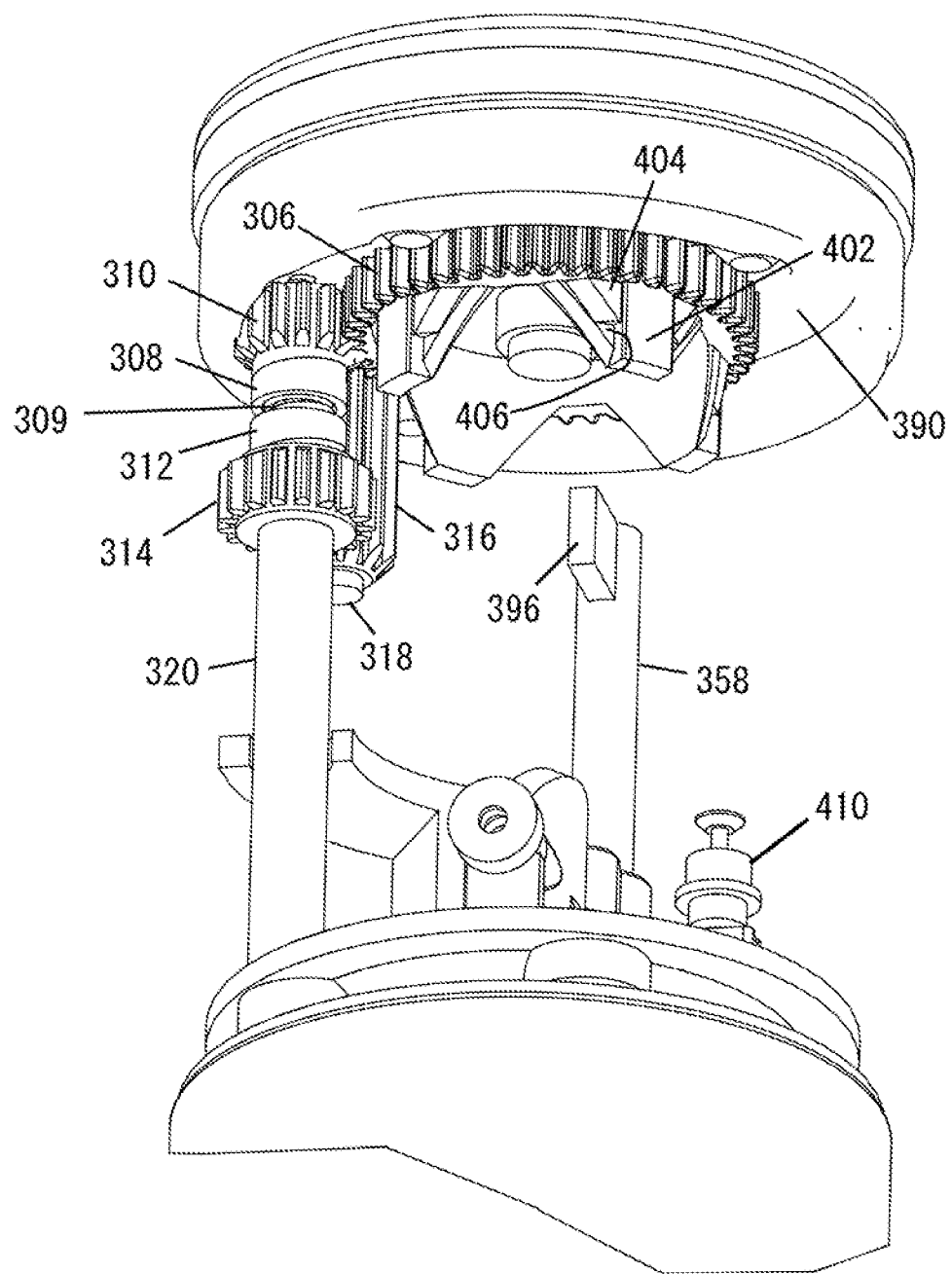
FIG. 30A is an enlarged isometric view of the assembled dual clutch gear assembly components of the sprinkler of FIG. 21 as viewed from the bottom.
Figure 32:
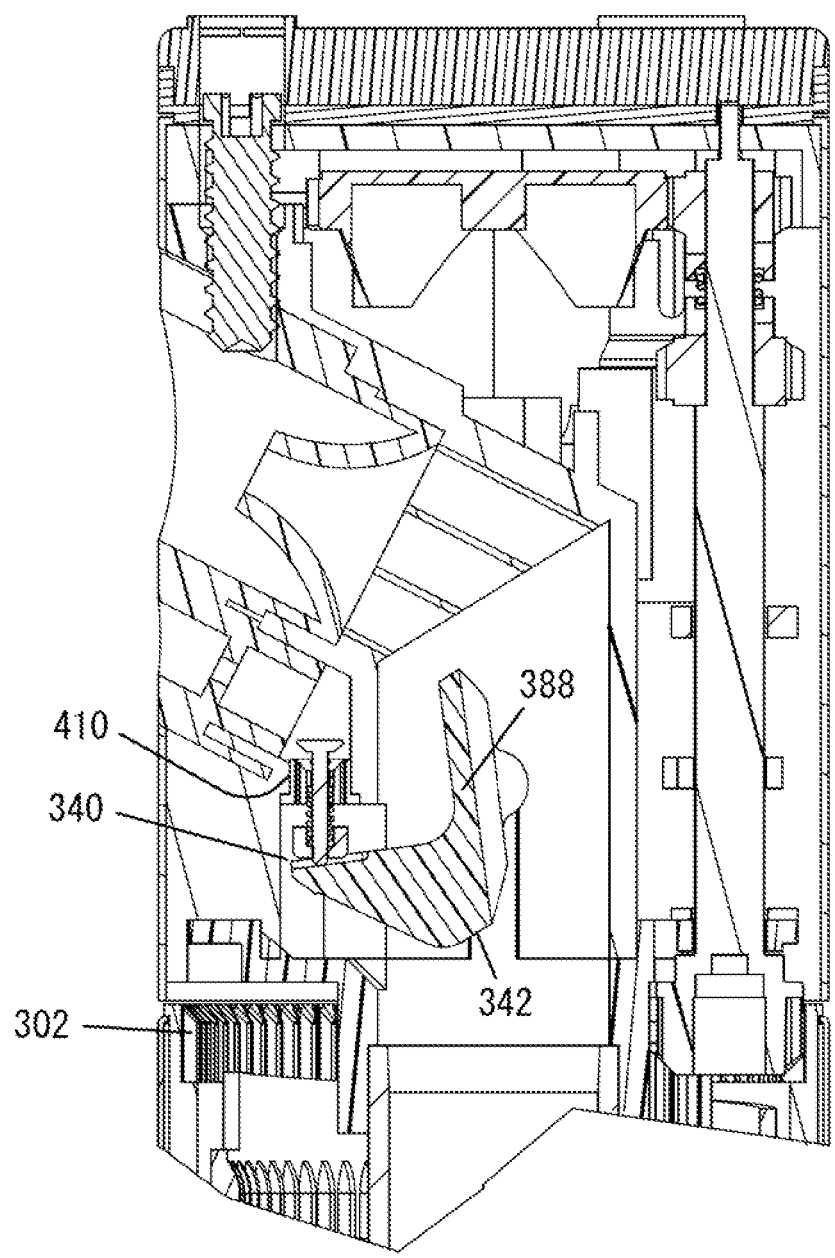
FIG. 32 is an enlarged fragmentary vertical cross-sectional view of the turret assembly of FIG. 24 illustrating its internal components including its diverter valve in a state that allows full flow through both nozzle ports.
Figure 38:
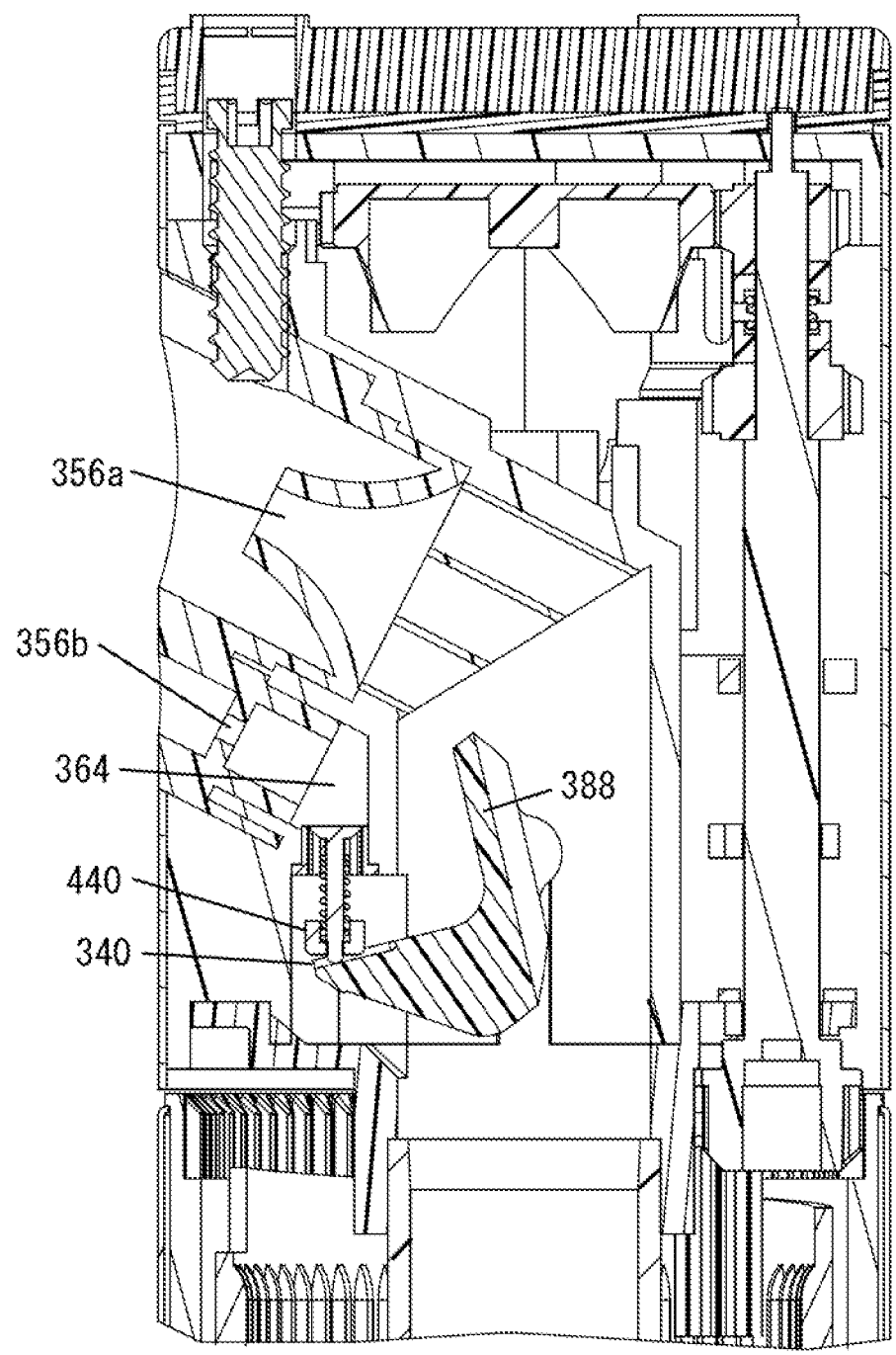
FIG. 38 is a view similar to FIG. 34 illustrating internal components including the diverter valve member positioned to allow full flow through the high flow rate port of the nozzle and restricted flow through the low flow rate port of the nozzle.
Figure 41:
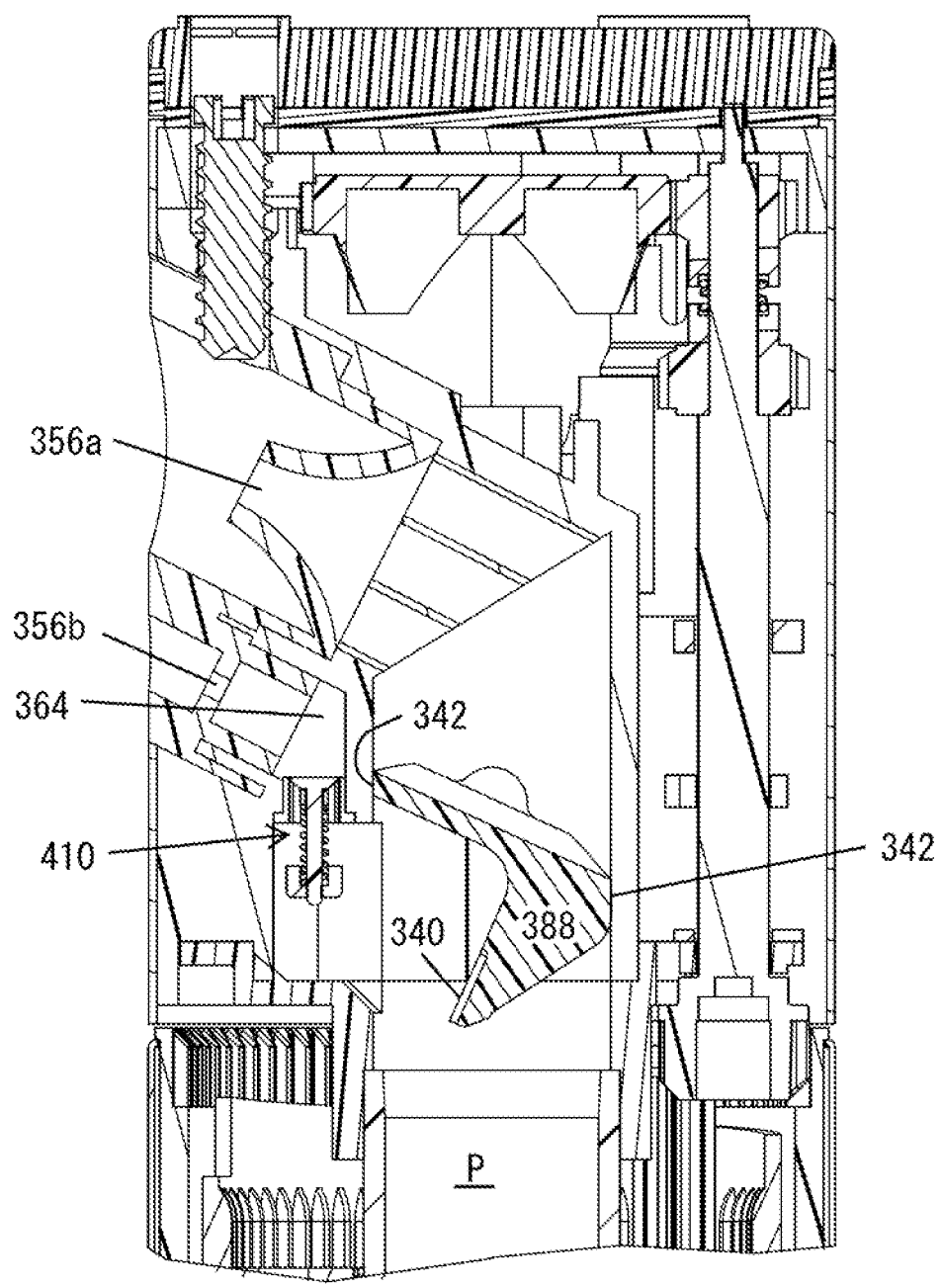
FIG. 41 is a view similar to FIG. 34 illustrating internal components including the diverter valve member positioned to inhibit flow through the high flow rate port of the nozzle and restricted flow through the low flow rate port of the nozzle.

The cams 398 (FIG. 39) have different cam surfaces to position the diverter valve member 388 in different orientations. An outer cam surface 402 (FIG. 30A) is the outermost cam surface and causes the high flow rate port 356a to be completely blocked and water to flow through the low flow rate port 356b as illustrated in FIG. 41. The cams 398 also include a mid-cam surface 404 (FIG. 30A). When the cam follower 396 engages the mid-cam 404 surface, the diverter valve member 388 is positioned to cause a limited flow of water to flow through the low flow rate port 356b and a full flow of water through the high flow rate port 356a as illustrated in FIG. 38. The cams 398 also include an inner cam surface 406 (FIG. 30A). When the cam follower 396 engages the inner cam surface 406, the diverter valve member 388 is positioned to allow maximum water flow through both the low flow rate port 356b and the high flow rate port 356a at the same time (FIG. 32). Alternatively, the cams may only have one surface as disclosed in the first embodiment, or two cam surfaces as disclosed in the first alternate embodiment described earlier. When the cam follower 396 is not contacting any of the surfaces of the cam 398, all of the water can flow through the high flow rate port 356a as illustrated in FIG. 34. This feature can be important when the low flow rate port 356b sends water to a different radius relative to the sprinkler 330 than the high flow rate port 356a. Depending on how the flow rate ports 356a and 356b are designed to distribute the water, it may be an advantage for both ports 356a and 356b to be open at the same time to match the precipitation rates for the sprinkler 330 and also provide an even distribution of water through the full radius of coverage. Additionally, there may be an advantage in having partial flow through the low flow port 356b whether the high flow port 356a is open or closed.

Figure 33A:
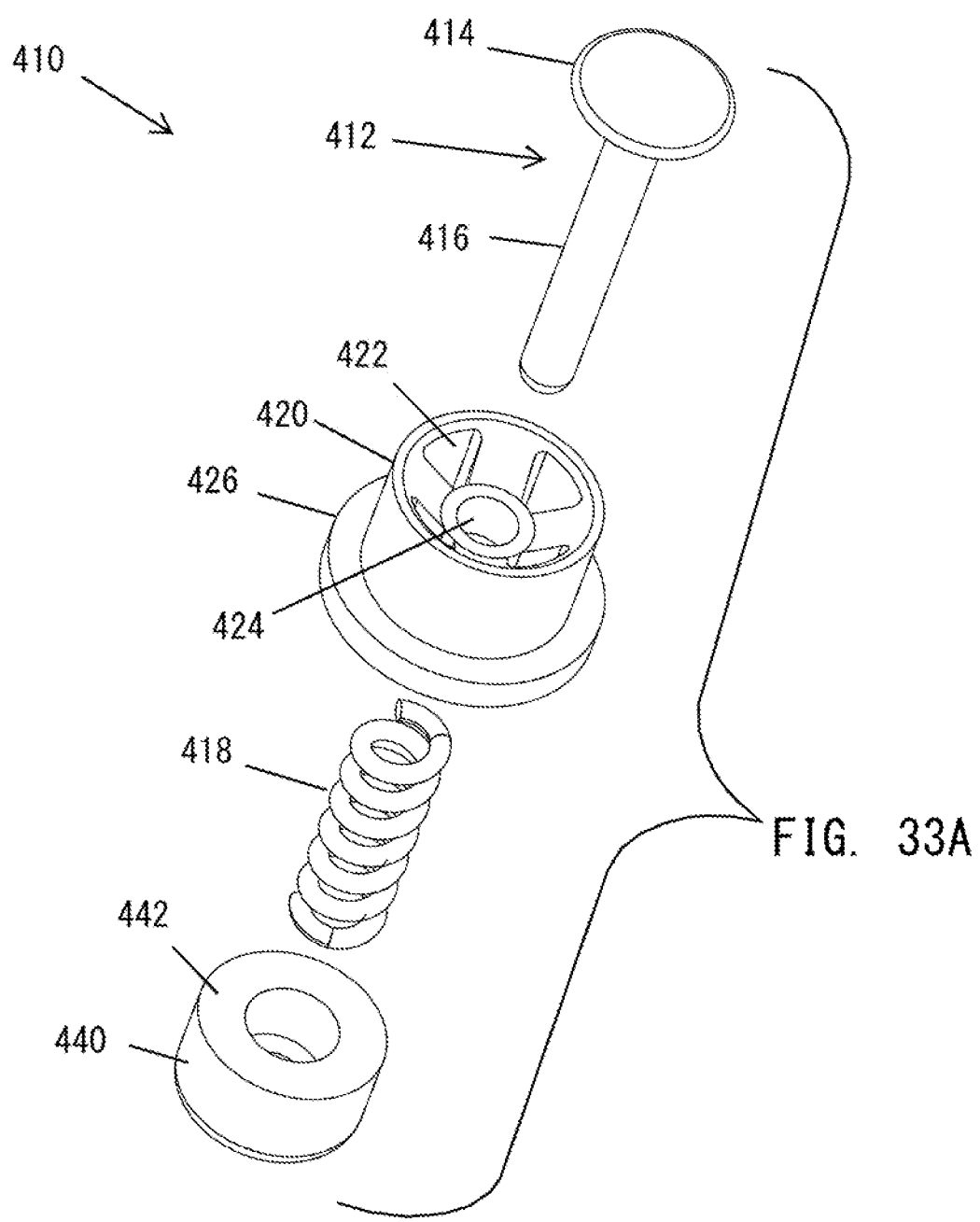
FIG. 33A is an enlarged exploded view of the low flow port valve mechanism of the sprinkler of FIG. 21 that controls flow of water to the low flow rate port of the nozzle.
Figure 33B:
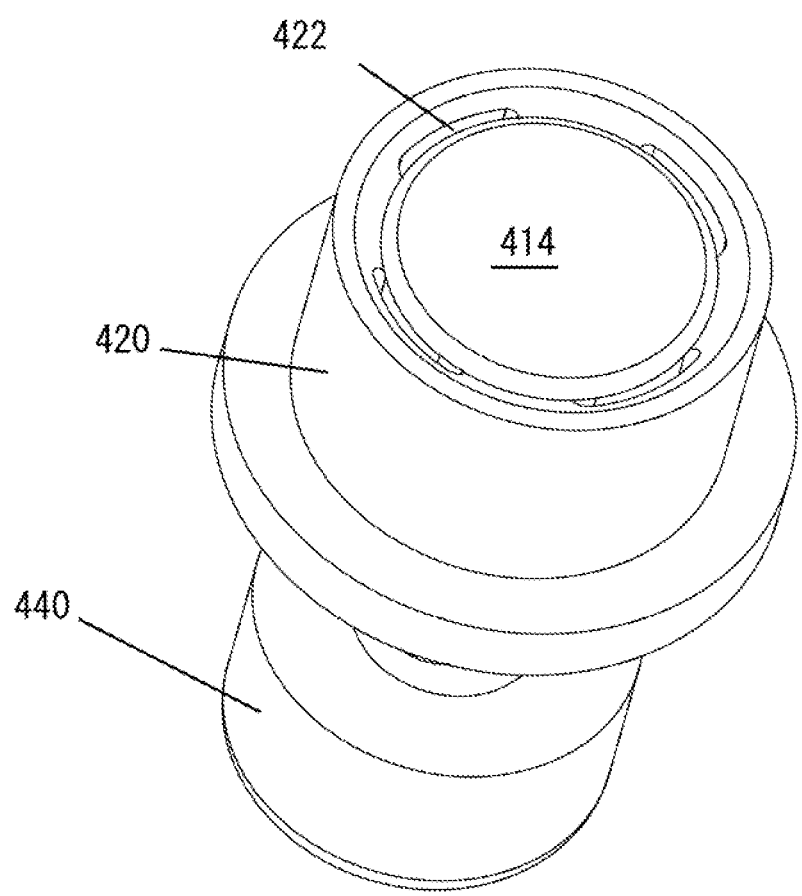
FIG. 33B is an enlarged isometric view taken from the top of the assembled low flow port valve of FIG. 33A.
Figure 33C:
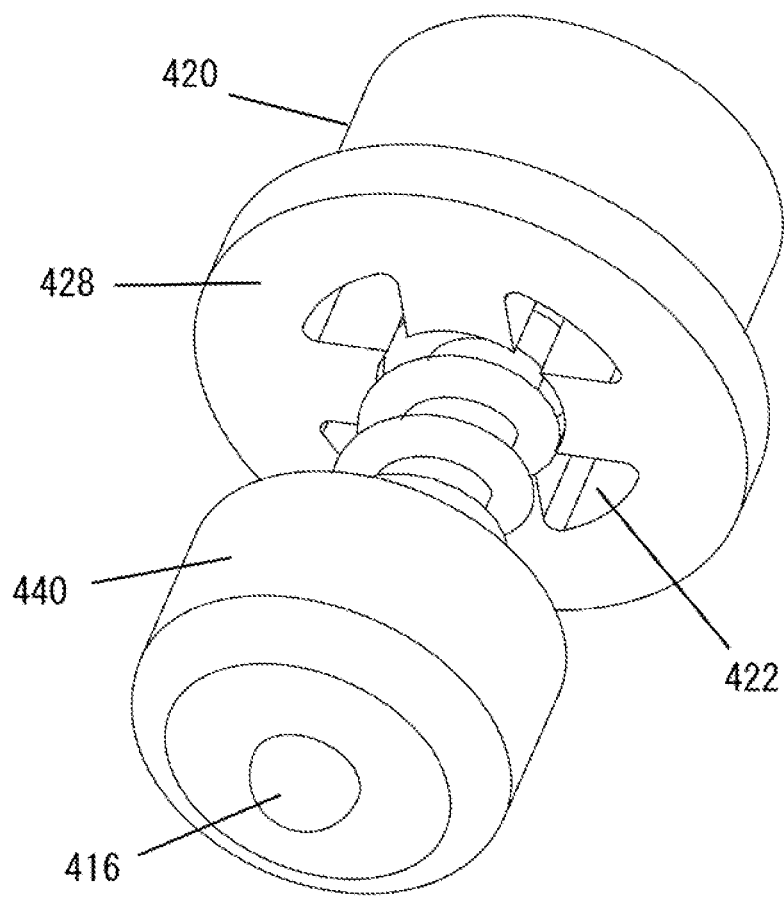
FIG. 33C is an enlarged isometric view taken from the bottom of the assembled low flow port valve of 33A.

FIGS. 33A-33C illustrate details of the construction of the low flow port valve 410 of the sprinkler 330. The low flow port valve 410 allows water to flow at different rates, or shut off completely. The low flow port valve 410 can be actuated by the shut-off member 340 of the diverter valve member 388 as illustrated in FIG. 32. The low flow port valve 410 includes a valve body 420 with a plurality of circumferentially spaced ports 422 through which water can flow. The valve stem 416 of a valve element 412 is received in a bore 424 formed in the center of the valve body 420 and allows a disc-shaped valve member 414 on one end of the valve stem 416 to slide between extended and retracted positions. A coil spring 418 surrounds the valve stem 416 and is positioned between the valve body 420 and a retainer 440 to bias the valve member 414 to a retracted position. As best seen in FIG. 33B, when the valve element 412 is retracted into the valve body 420, the valve member 414 does not completely block the flow of water through the ports 422. A portion of each of the ports 422 extends radially beyond the valve member 414 to allow an amount of water to flow through the valve body 420 when the valve element 412 is in its fully retracted position. FIG. 33C illustrates the lower surface 428 of the valve body 420. The flow ports 422 are clearly exposed to allow water flow through the same. The valve retainer 440 is securely attached to the lower segment of the valve stem 416. When the diverter valve member 388 causes the retainer 440 to contact the lower surface 428 of the valve body 420, an upper surface 442 (FIG. 33A) of the retainer 440 seals against the lower surface 428 to provide a substantially water right seal that shuts off water flow to the low flow port 356b. When the valve element 412 is fully extended out of the valve body 420, the valve retainer 440 prevents water flow. When the valve element 412 is fully retracted into the valve body 420, a restricted flow of water is allowed through the ports 422 past the valve member 414. When the valve element 412 is in an intermediate position as best seen in FIG. 32, the low flow port valve 410 allows a maximum amount of water to flow though the same as all of the flow ports 422 are open for maximum water flow.

Figure 39:
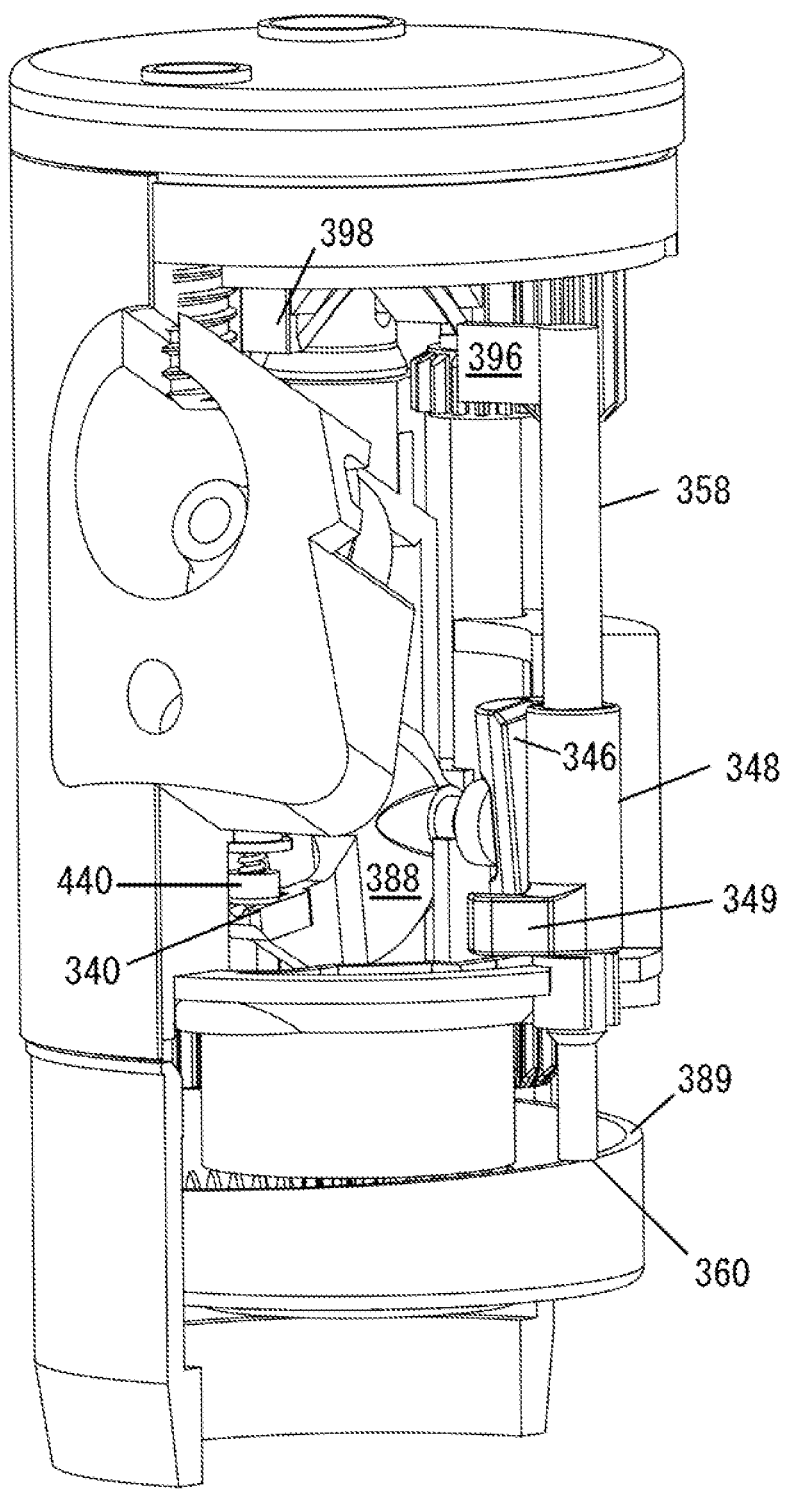
FIG. 39 is an enlarged external cut away view illustrating the cam, cam arm, and diverter valve with the diverter valve member in the same position as illustrated in FIG. 38.
Figure 40:
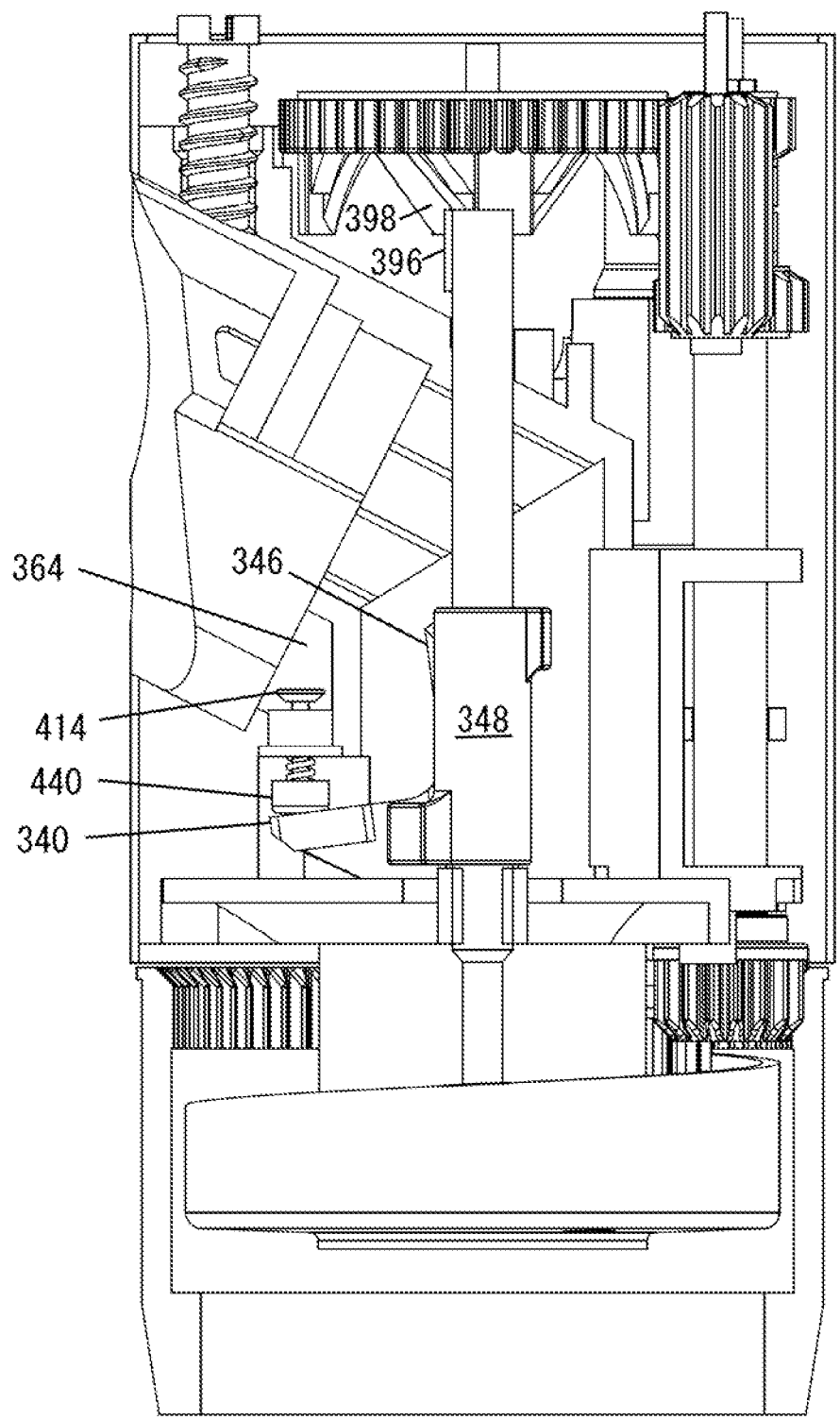
FIG. 40 is a view similar to FIG. 39 with the outer housing removed and illustrating the cam, cam arm, and diverter valve with the diverter valve member in the same position as illustrated in FIG. 38.

FIGS. 32 and 34-44, illustrate the various positions of the diverter valve member 388 and the different states of the low flow port valve 410. FIG. 32 illustrates the diverter valve member 388 in a position that allows full flow to the high flow rate nozzle port 356a and maximum flow to the low flow rate nozzle port 356b. In this state, the low flow port valve element 412 is raised above the upper surface of the valve body 420 and the retainer 440 is positioned to allow flow through the flow ports 422 of the low flow valve 410. FIG. 40 illustrates the cam drive shaft 358 rotated slightly as the cam follower 396 is rotated by the cam 398 of the cam plate 304. In this view, the cam arm coupling 348 has rotated slightly and the upper cam arm 347 has rotated the diverter valve input arm 346 to cause the diverter valve member 388 to move into the position illustrated in FIG. 32.

Figure 36:
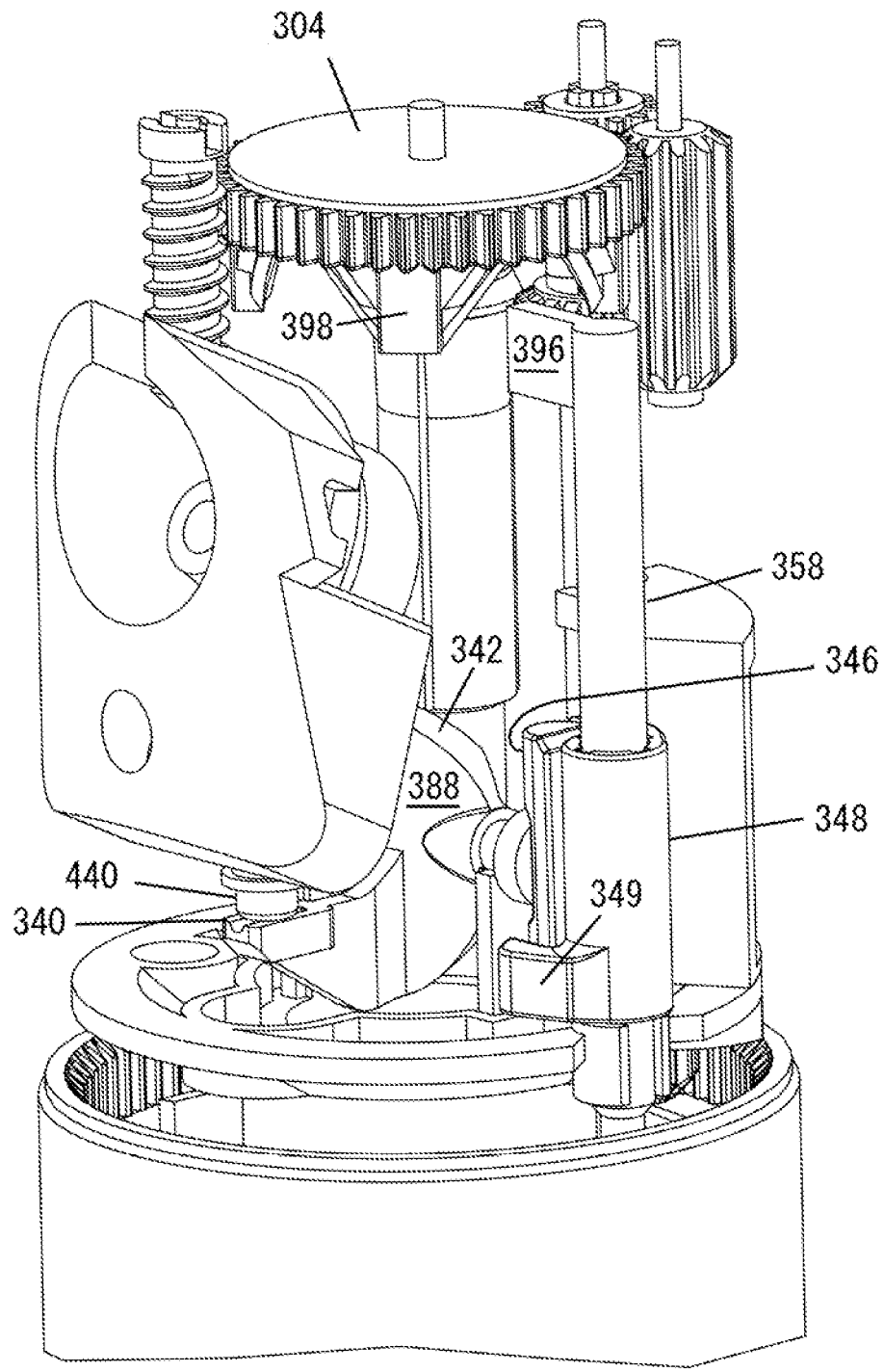
FIG. 36 is a view similar to FIG. 35 with the outer housing removed to reveal the cam, cam arm, and diverter valve with the diverter valve member in the same position as illustrated in FIG. 24.
Figure 37:
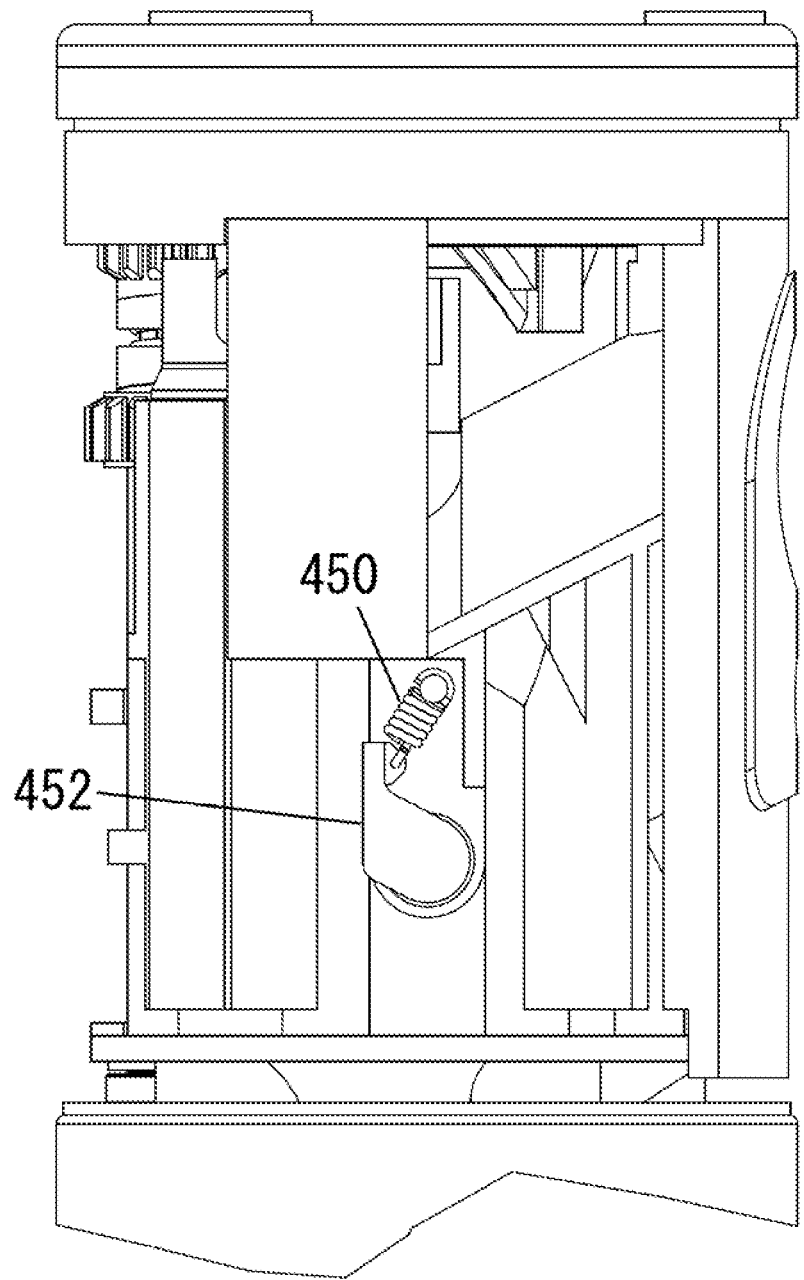
FIG. 37 is an enlarged side elevation view from the opposite side of the nozzle turret of FIG. 25 illustrating the position of the spring return arm.

FIG. 34 illustrates the diverter valve member 388 in a position that allows full flow to the high flow nozzle port 356a and no flow to the low flow nozzle port 356b. The low flow port valve element 412 is raised to its fullest travel above the valve body 420 and the retainer 440 is positioned to inhibit water flow through the flow ports 422 of the low flow valve 410. FIG. 35 illustrates the cam drive shaft 358 in its home position as the cam follower 396 is not contacting the cam 398 of the cam plate 304. In this view, the cam coupler 348 is positioned such that the upper cam arm 347 is holding the diverter valve input arm 346 in a near vertical orientation to cause the diverter valve member 388 to be positioned as illustrated in FIG. 34. FIG. 36 illustrates the same orientation as FIG. 35, except that the outer components of the nozzle turret 354 are removed to expose the cam plate 304 and its associated gear drive when the diverter valve member 388 is in the position illustrated in FIG. 34. When the diverter valve member 388 is in this position, the valve return spring 450 is retracted as seen in FIG. 37.

FIG. 38 illustrates the diverter valve member 388 in a position that allows full flow to the high flow rate nozzle port 356a and a restricted flow to the low flow rate nozzle port 356b. In this state the low flow port valve element 412 is lowered to its fullest travel below the valve body 420 and the valve member 414 is positioned to restrict water flow through the flow ports 422 of the low flow valve 410. FIG. 39 illustrates the cam drive shaft 358 in its relative position as the cam follower 396 is contacting a first surface of cam 398 of cam plate 304. In this view, the cam coupler 348 is positioned such that the upper cam arm 347 is holding the diverter valve input arm 346 in a rotated orientation to cause the diverter valve member 388 to be positioned as illustrated in FIG. 38. FIG. 40 illustrates the components in the same orientation as FIG. 35, except that the view in FIG. 40 is slightly rotated. In addition, in FIG. 40 the outer components of the nozzle turret 354 have been removed to expose the relative positions of the cam plate 304 and its associated gear drive when the diverter valve member 388 is in the position illustrated in FIG. 38.

Figure 42:
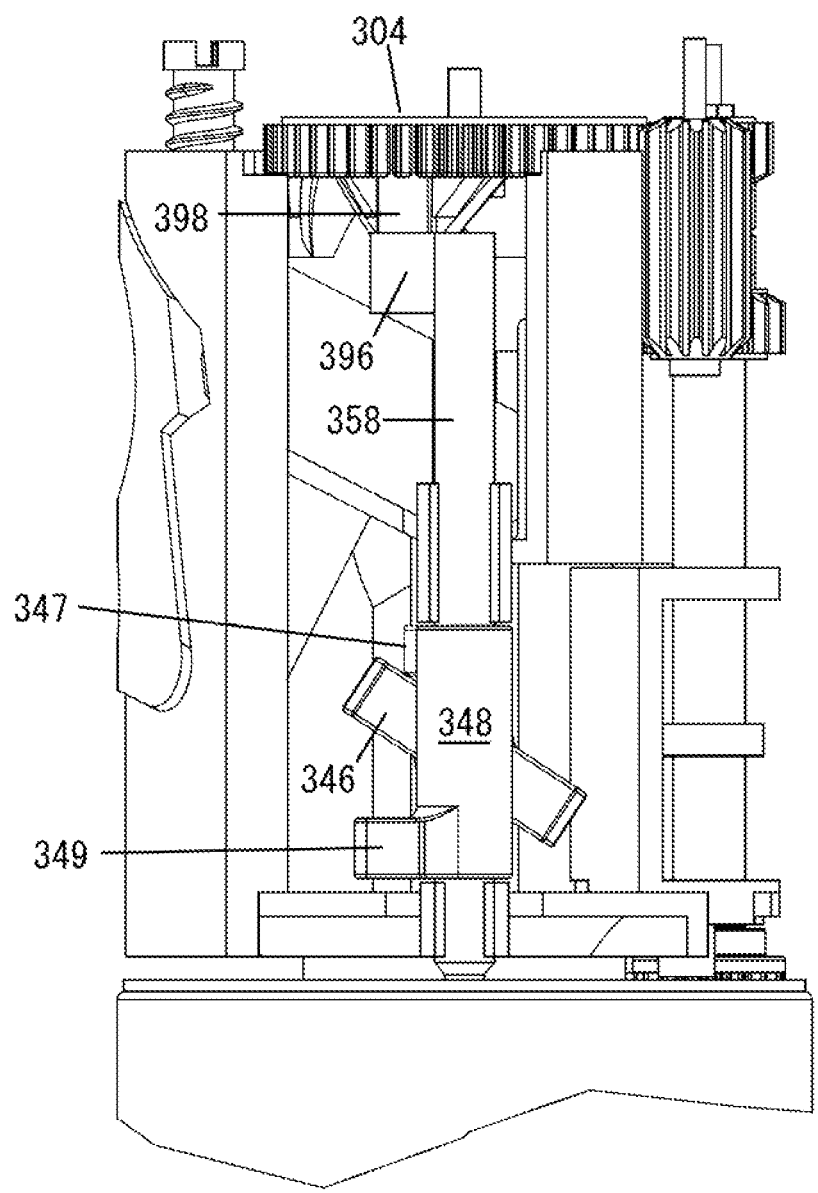
FIG. 42 is an enlarged side elevation view of the cam, cam arm, and diverter valve with the diverter valve member in the same position as illustrated in FIG. 41.
Figure 43:
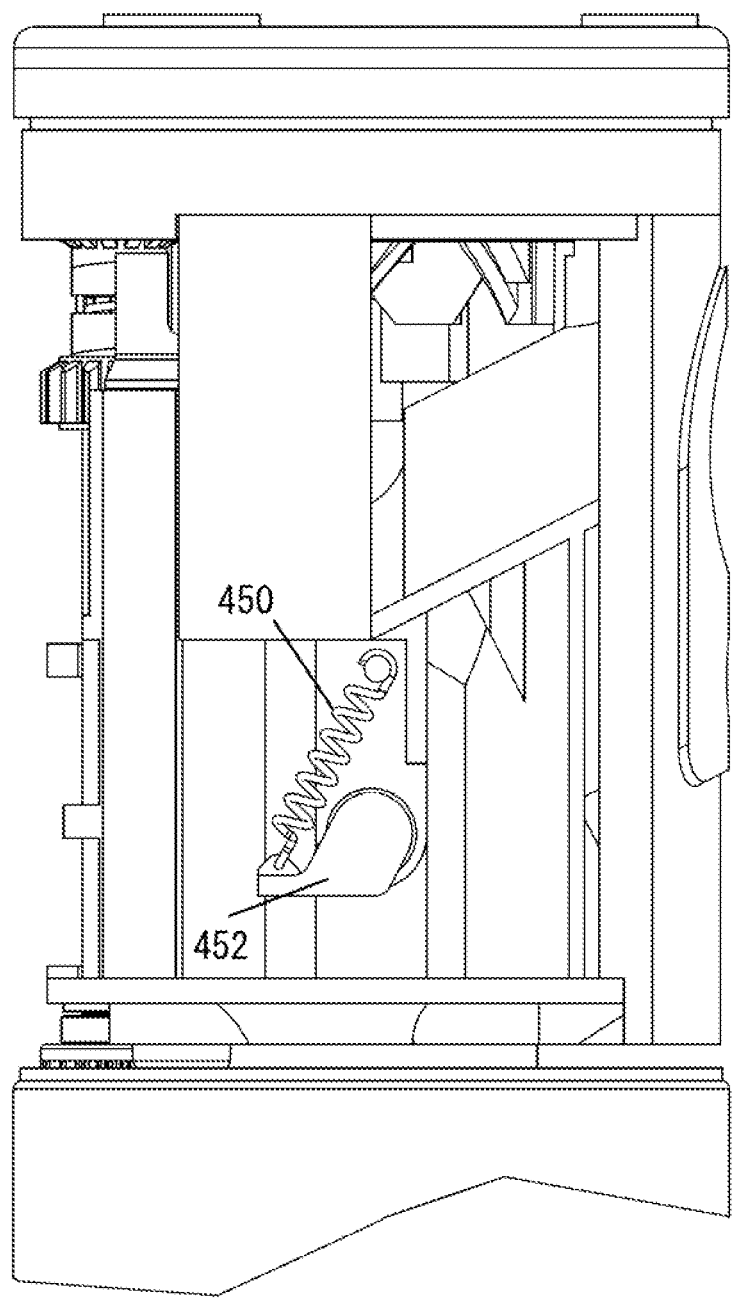
FIG. 43 is an enlarged side elevation view from the opposite side of the nozzle turret of FIG. 42 illustrating the position of the spring return arm.
Figure 44:
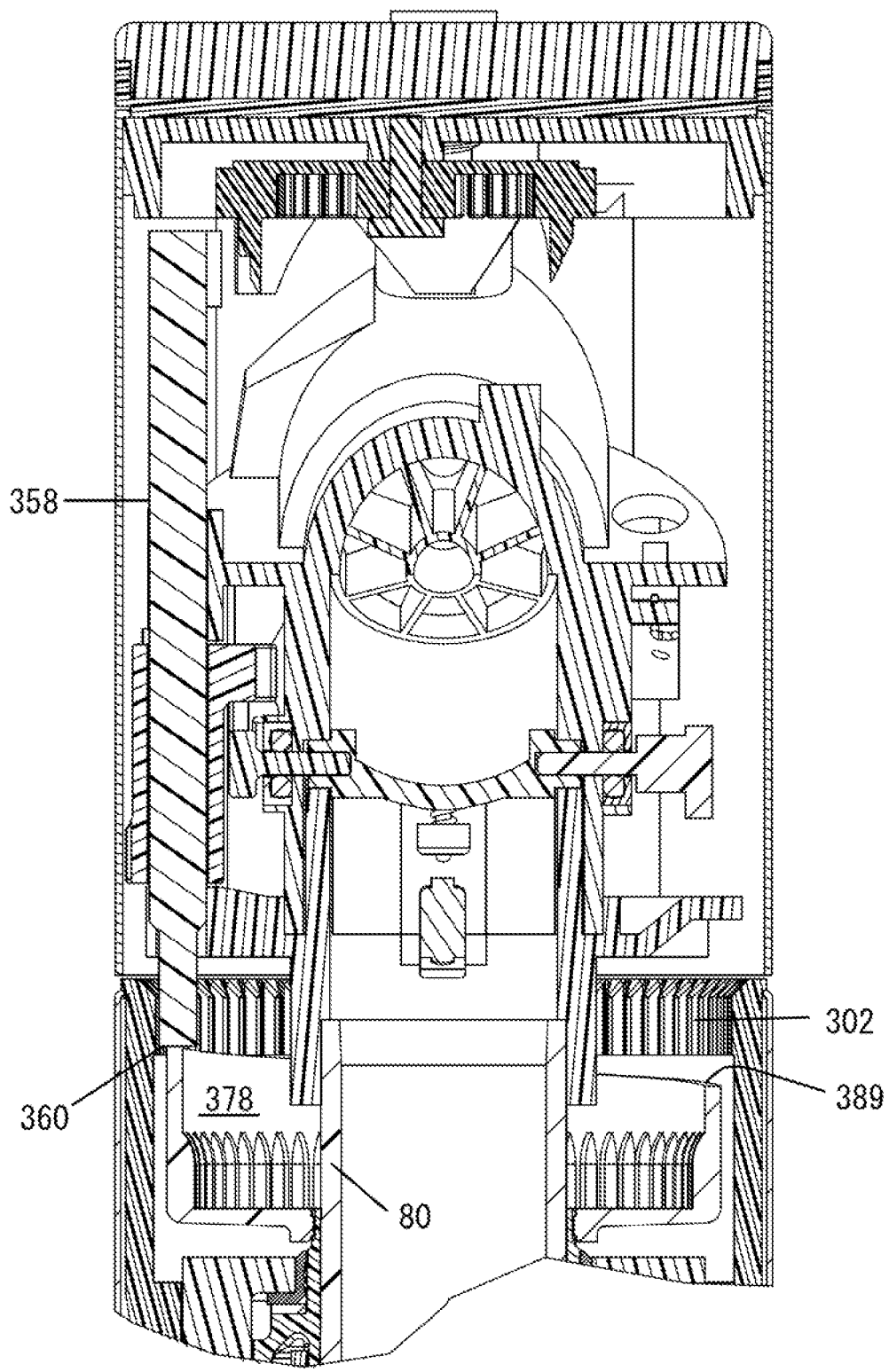
FIG. 44 is an enlarged fragmentary vertical sectional view of the nozzle turret of the sprinkler of FIG. 21 illustrating further details of its construction.

FIG. 41 illustrates the diverter valve member 388 in a position that inhibits flow to the high flow rate nozzle port 356a and allows a restricted flow to the low flow rate nozzle port 356b. In this state the low flow port valve element 412 is lowered to its fullest travel below the valve body 420 and the valve head 414 is positioned to restrict water flow through the flow ports 422 of the low flow valve 410. FIG. 42 is a view of the cam drive shaft 358 in its relative position as the cam follower 396 is contacting a first surface of a cam 398 of the cam plate 304. In FIG. 42 the outer components of the nozzle turret 354 have been removed to expose the relative positions of the cam plate 304 and its associated gear drive when the diverter valve member 388 is in the position illustrated in FIG. 41. In this view, the cam coupler 348 is positioned such that the upper cam arm 347 is holding the diverter valve input arm 346 in a fully rotated orientation to cause the diverter valve member 388 to be positioned as illustrated in FIG. 41. When the diverter valve member 388 is in this position, the valve return spring 450 is greatly extended as illustrated in FIG. 43.

FIGS. 28-31 illustrate details of a rotating cam assembly that reciprocates the diverter valve member 388. The rotating cam assembly includes a dual clutch drive assembly. An internal ring gear 302 is positioned on the inside of the non-rotating riser 36. A clutch drive shaft 320 is rotatably snapped into a drive shaft holder 372. The drive shaft holder 372 is rigidly attached to a nozzle turret base 355. A clutch drive shaft gear 328 is formed on the bottom end of the clutch drive shaft 320. When the nozzle turret 354 rotates, the clutch drive shaft gear 328 meshes with the non-rotating internal ring gear 302 so that the clutch drive shaft 320 rotates relative to the rotation of the nozzle turret 354. If the sprinkler 330 is set for continuous three hundred and sixty degree rotation, the clutch drive shaft 320 will rotate in one direction. If the sprinkler 330 is set for a partial arc coverage where it oscillates between arc limits in a clockwise and a counter-clockwise fashion, the clutch drive shaft 320 will also rotate in a counter-clockwise and a clockwise fashion. A plurality of spline teeth 322 are formed on the upper portion of the clutch drive shaft 320 above a bearing surface 324. A first drive gear 314 is positioned to rotate freely on the bearing surface 324 and is held in a longitudinal position by a flat step 326 on the clutch drive shaft 320. A first clutch member 312 includes internal splines which fit over the splines 322 so the clutch member 312 is continuously driven by the rotation of the clutch drive shaft 320. A clutch tension coil spring 309 is positioned between the first clutch member 312 and a second clutch member 308. The second clutch member 308 also meshes with the splines 322 to rotate in unison with the clutch drive shaft 320. A second drive gear 310 includes a smooth bore that is placed over the splines 322. The outer surfaces of the splines 322 serve as a bearing support surface for the second drive gear 310 to rotate freely about the clutch driveshaft 320. The entire clutch assembly is sandwiched between the step 326 of the clutch drive shaft 320 and an upper bearing plate 390 (FIG. 30A) such that the spring 309 provides equal pressure to each of the clutch members 308 and 312 so they have constant contact with the first and second drive gears 314 and 310.

Figure 27:
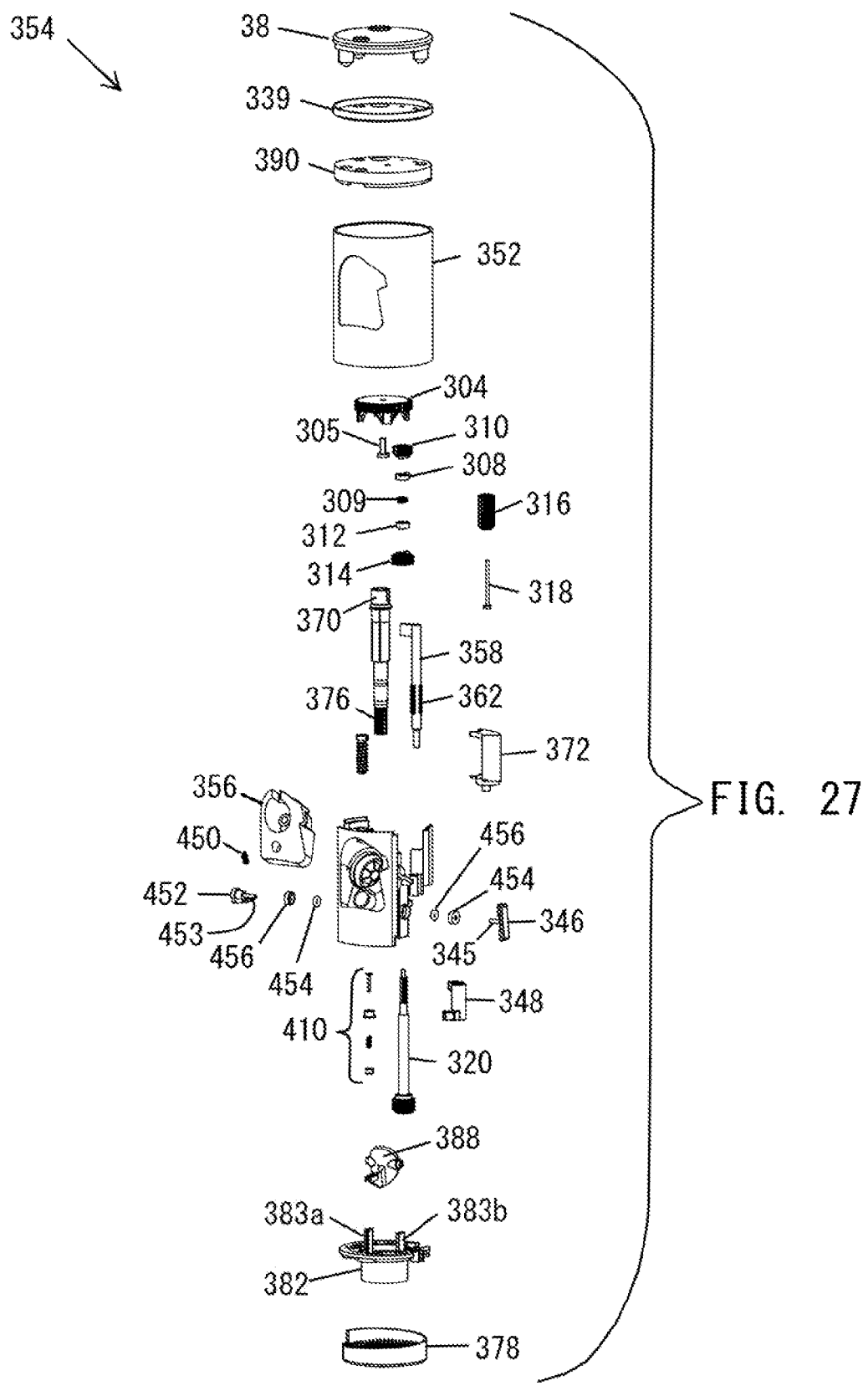
FIG. 27 is an exploded view of the nozzle turret assembly of FIG. 24 illustrating its dual clutch gear assembly.
Figure 28:
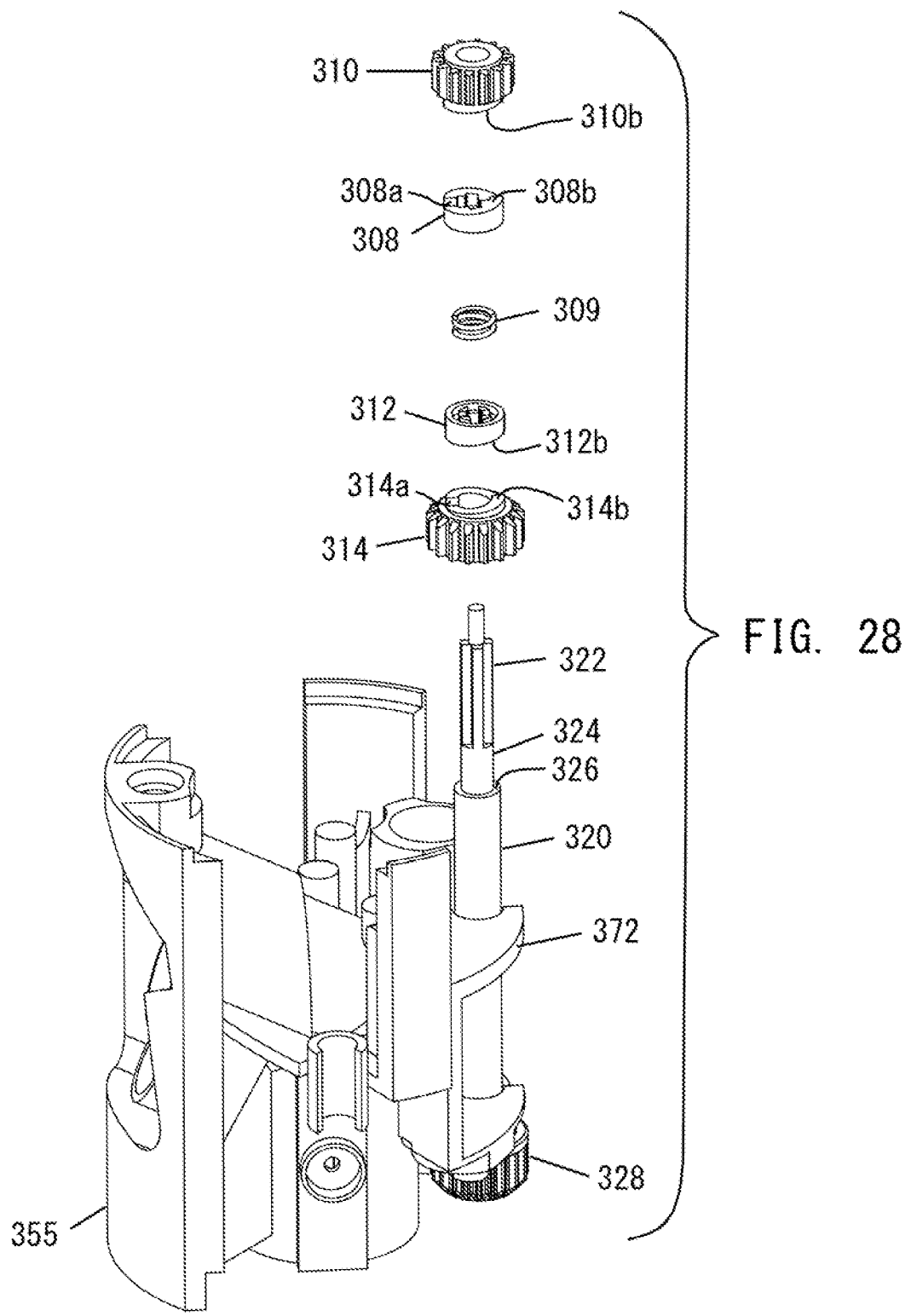
FIG. 28 is an enlarged fragmentary exploded view of the dual clutch gear assembly that controls the diverter valve in the sprinkler of FIG. 21.
Figure 29:
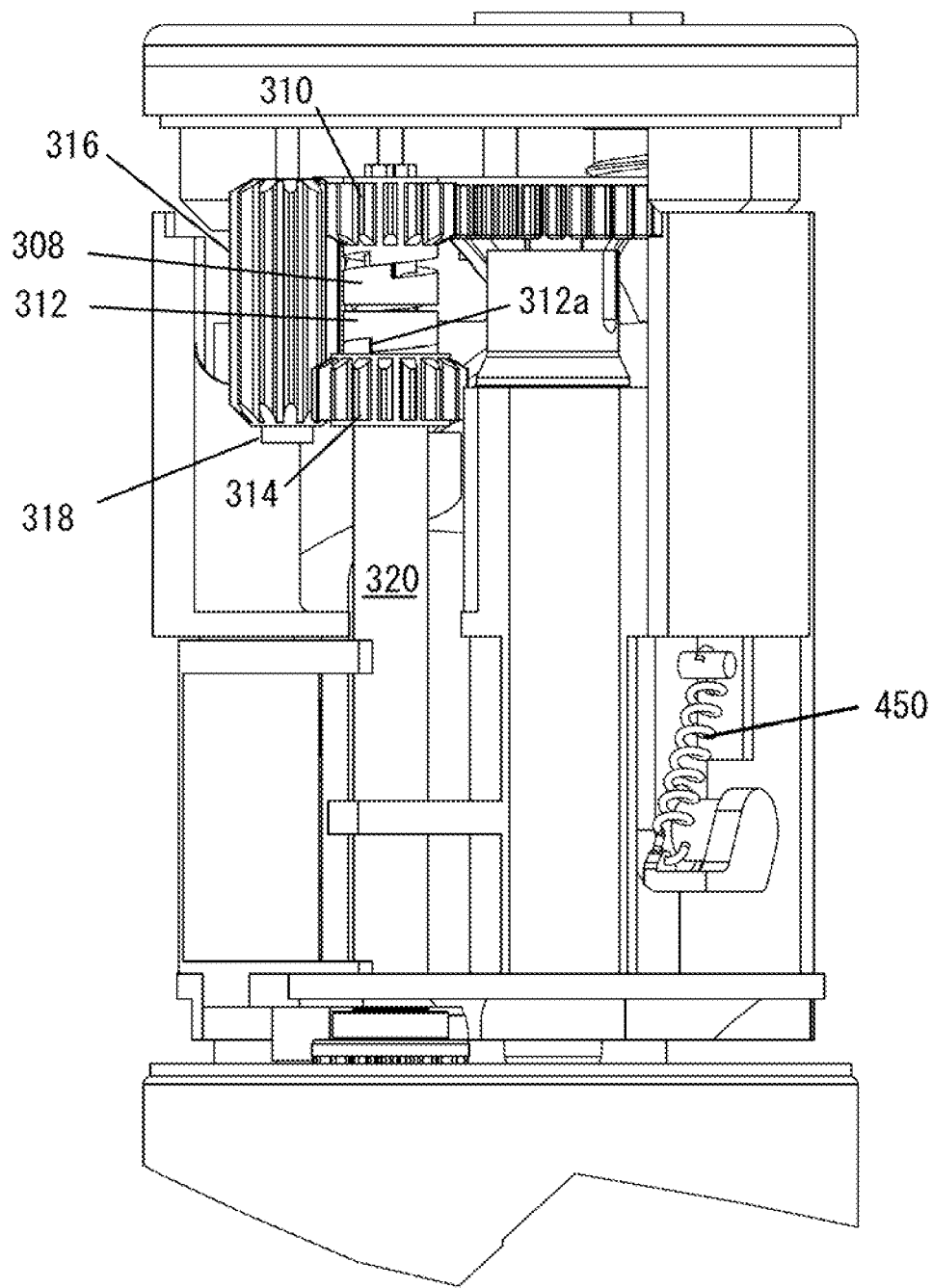
FIG. 29 is a partially broken away side elevation view of the dual clutch gear assembly (positioned for rotation in a first direction) that controls the diverter valve in the sprinkler of FIG. 21.

FIG. 29 illustrates the clutch and drive gear operation when the turret 354 is rotating in a counter-clockwise direction (viewed from above). As the turret 354 rotates in a counter-clockwise direction, the gear 328 on the clutch drive shaft 320 forces it to rotate in a clockwise direction. In this direction, the helix 312b (FIG. 28) and the steps 312a (FIG. 29) on the clutch member 312 align with the helix 314b and the steps 314a on the drive gear 314 to positively rotate the first drive gear 314 with the clutch drive shaft 320. The first drive gear 314 drives the spline gear 316 which rotates about a center bearing shaft 318 (FIG. 27). The spline gear 316 meshes with the ring gear 306 to drive the cam plate 304 in a clockwise direction. In this direction of rotation, the drive gear 310 is being driven by the ring gear 306 in the opposite direction relative to the direction of rotation of the clutch drive shaft 320. The helix 310b on the bottom of the drive gear 310 and the helix 308a on the top of the clutch member 308 slip past each other to allow the drive gear 310 to spin freely in the opposite direction relative to the direction of rotation of the clutch member 308.

Figure 30B:
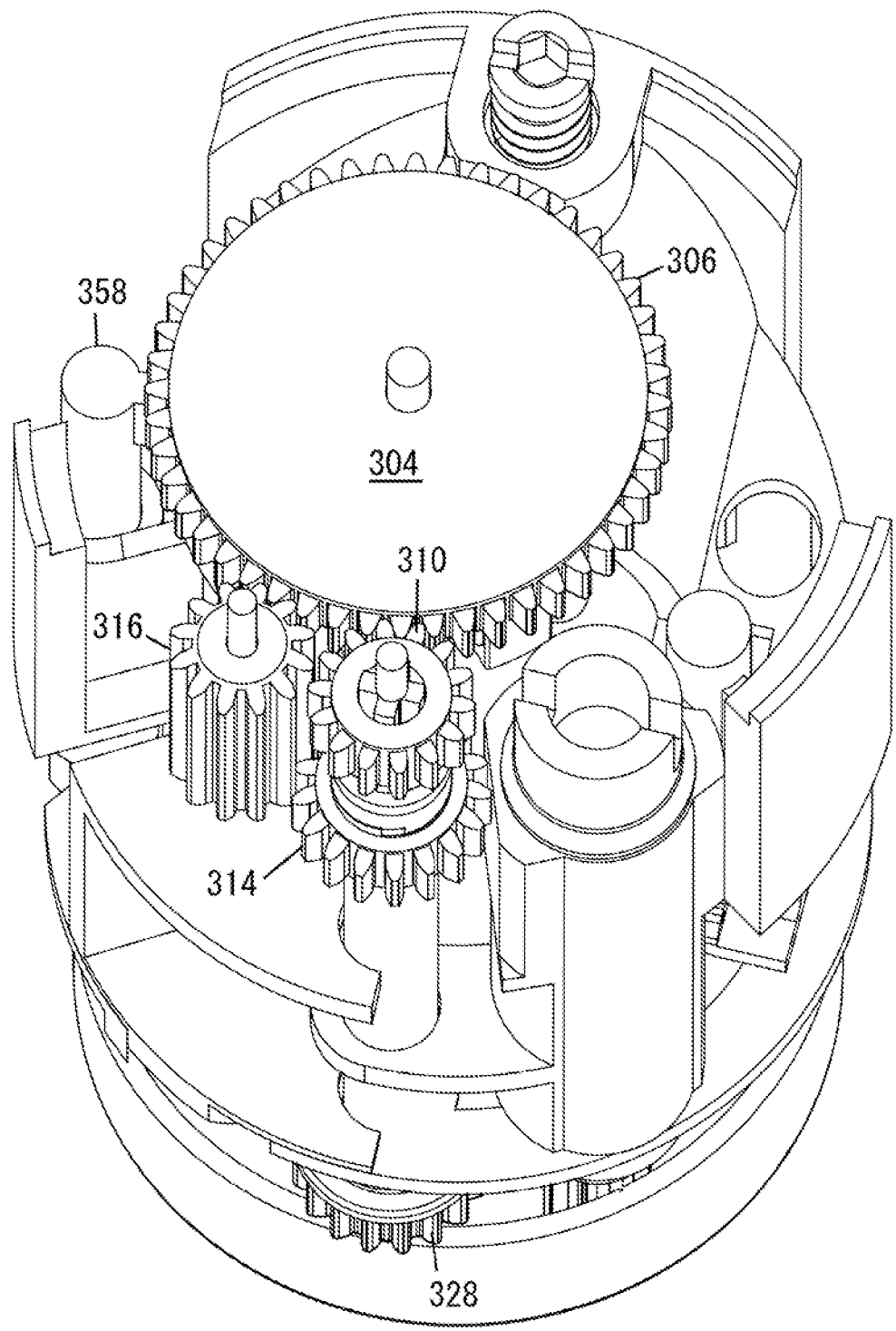
FIG. 30B is an enlarged isometric view similar to FIG. 30A except viewed from the top.
Figure 30C:
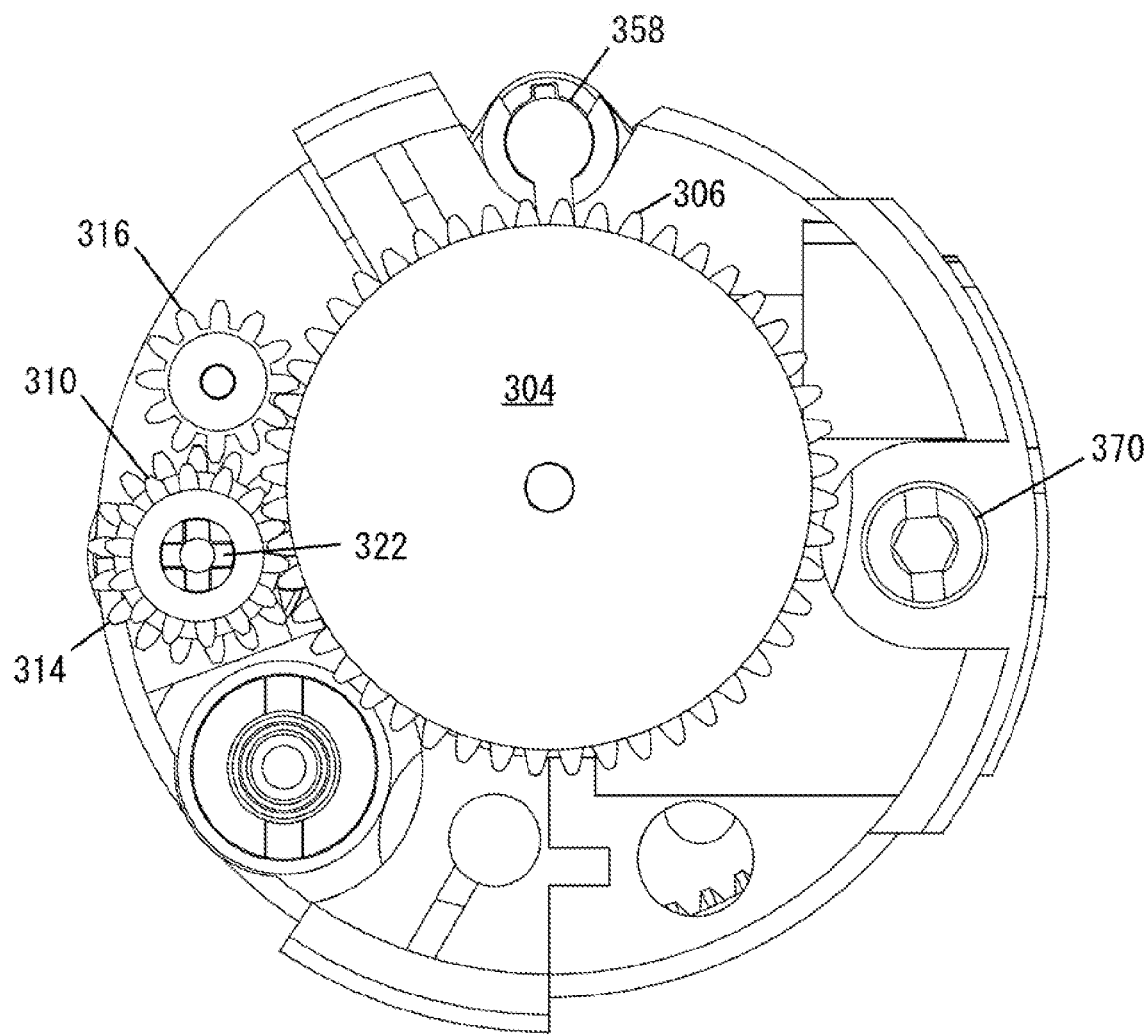
FIG. 30C is an enlarged top plan view of the assembled dual clutch gear assembly components of FIG. 30B.
Figure 31:
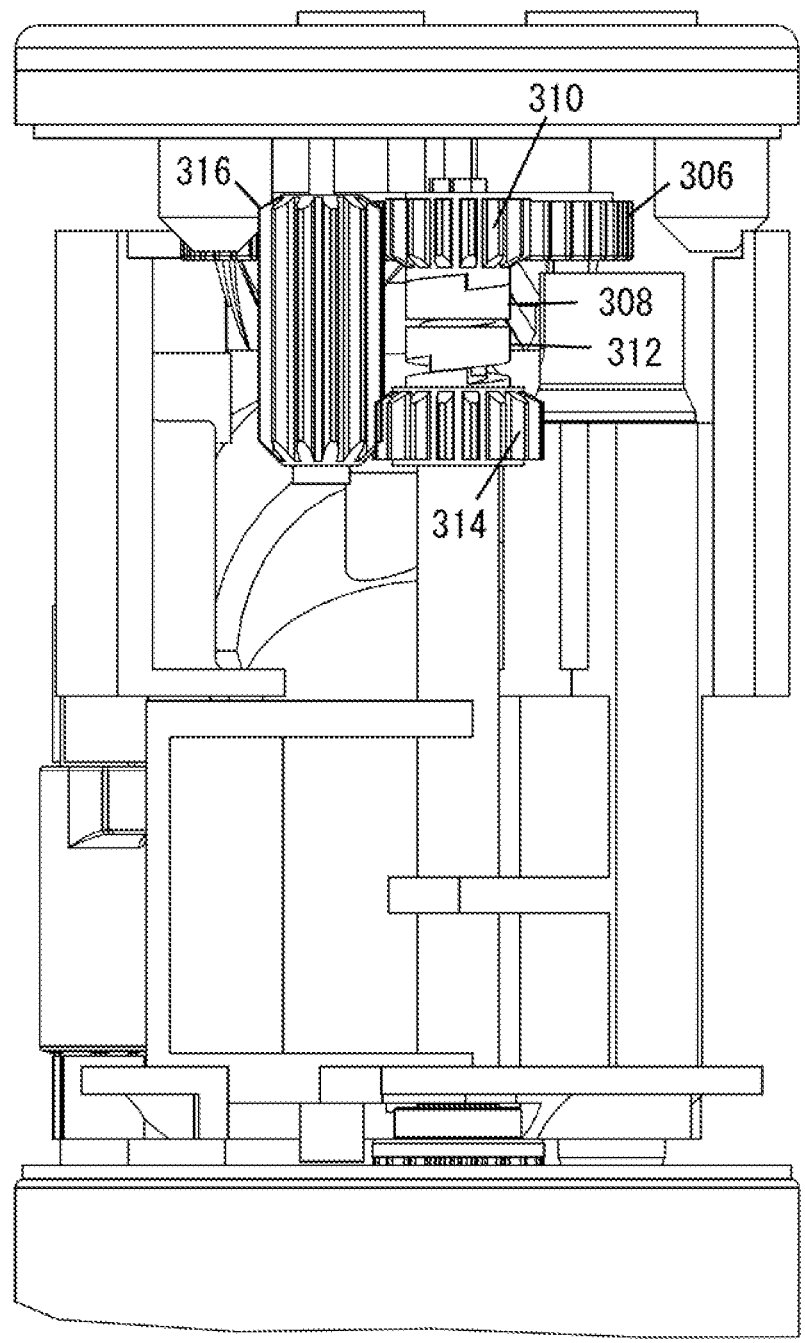
FIG. 31 is a partially broken away enlarged side elevation view of the dual clutch gear assembly (positioned for rotation in a second direction) that controls the diverter valve in the sprinkler of FIG. 21.

FIG. 31 illustrates the clutch and drive gear operation when the turret 354 is rotating in a clockwise (viewed from above). As the turret 354 rotates clockwise, the gear 328 on the clutch drive shaft 320 forces it to rotate in a counter-clockwise direction. In this direction, the helix 308b and the steps 308a on clutch member 308 align with the helix 310b and the steps 310a on the drive gear 310 to positively rotate the drive gear 310 with the clutch drive shaft 320. The drive gear 310 drives the ring gear 306 to drive the cam plate 304 in a clockwise direction. In this direction of rotation, the first drive gear 314 is being driven by the ring gear 306 via the small spline gear 318 in the opposite direction relative to the direction of rotation of the clutch drive shaft 320. The helix 314b on the top of the drive gear 314 and the helix 312b on the bottom of the clutch member 312 slip past each other to allow the drive gear 314 to spin freely in the opposite direction relative to the direction of rotation of the clutch member 308. As best seen in FIGS. 30B and 30C, the drive gear 314 is slightly larger than the spline gear 310 to allow the spline gear 316 to be positioned away from spline gear 310 to permit the spline gear 310 and the spline gear 316 to rotate without contacting one another. This allows the spline gear 310 and the drive gear 314 to rotate in opposite directions.

Figure 45:
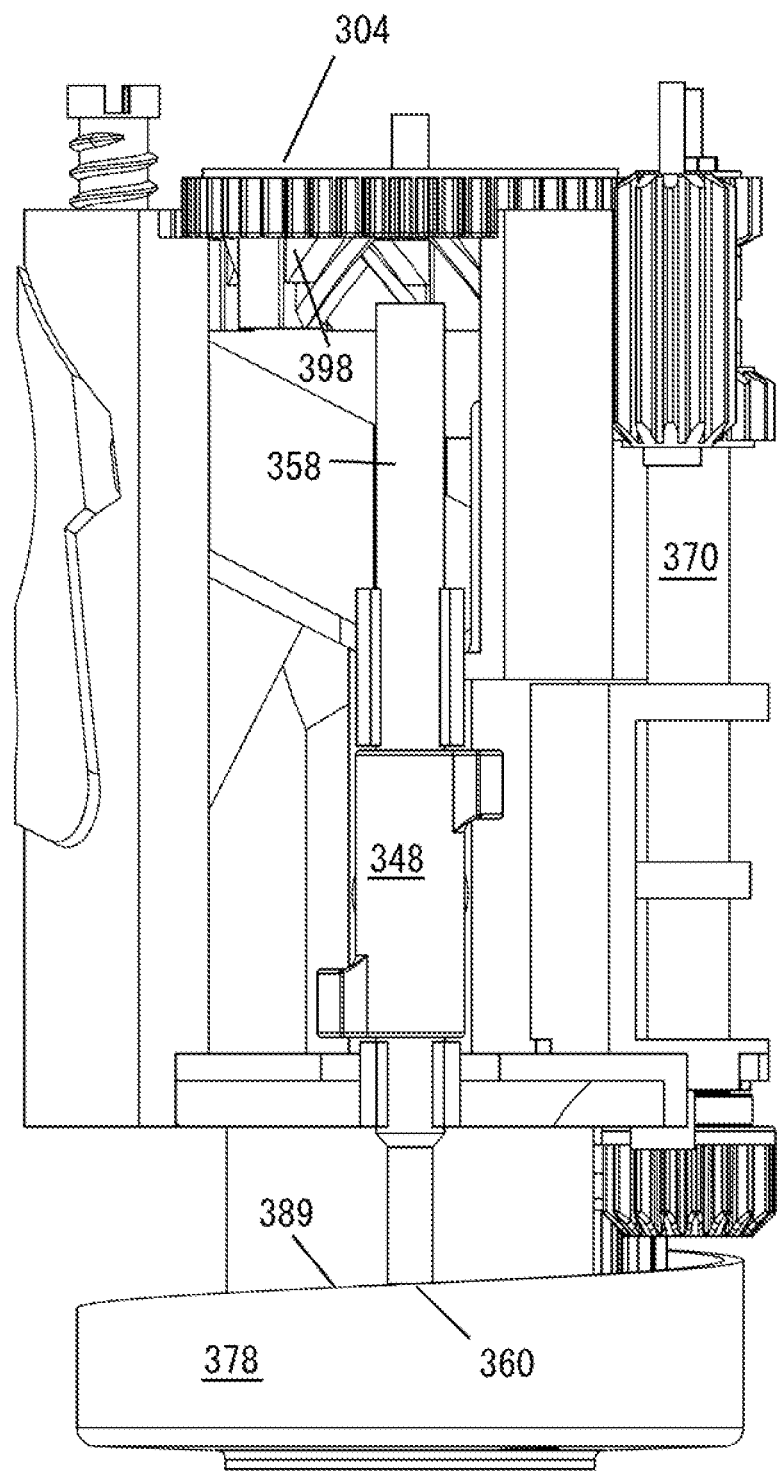
FIG. 45 is a view of the nozzle turret of FIG. 25 with the outer housing removed and illustrating the position of the helix lifting surface and the cam arm with the sprinkler adjusted to approximately two hundred degrees of oscillation.
Figure 46:
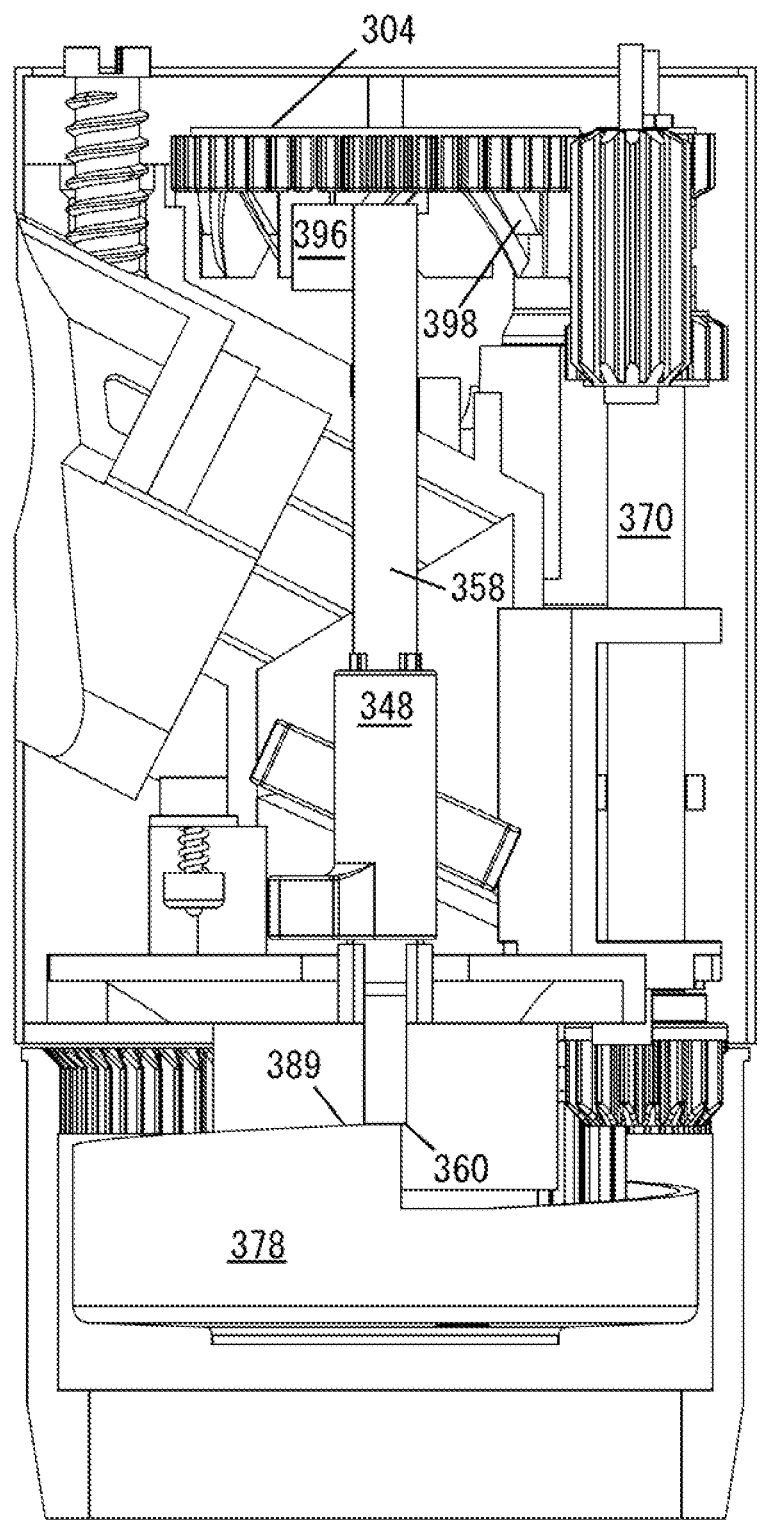
FIG. 46 is a view similar to FIG. 45 illustrating the position of the helix lifting surface and the cam arm with the sprinkler adjusted to approximately three hundred and sixty degrees of rotation.

FIGS. 45 and 46 illustrate a geared coupling from the arc adjusting shaft 370 to a vertical positioning helix 389. The arc adjusting shaft 370 includes the arc adjusting gear 376 that rotates and drives an arc adjusting extension ring 378 at a reduced speed. The vertical positioning helix 389 is formed as circular inclined upper edge of the arc adjusting extension ring 378. When the arc adjusting gear 376 is rotated by an operator to change the arc of the sprinkler, the vertical positioning helix 389 rotates in coordination with the arc adjusting sleeve 74. A bottom end surface 360 of the cam arm 358 rests on the positioning helix 389 and moves up or down as the helix 389 rotates. When the sprinkler 330 is adjusted to water approximately a two hundred degree arc, the vertical position of the cam arm 358 and the cam follower 396 (FIG. 46) are in a lowered position illustrated in FIG. 45. In this position, the sprinkler 330 is configured so that the cam follower 396 is in a centered position relative to the cams 398 and the low flow rate port 356b and high flow rate port 356a will be open for similar durations. When the sprinkler 330 is adjusted to water a ninety degree arc, the vertical position of the cam arm 358 and the cam follower 396 are in a lowered position (not illustrated). In this position, the sprinkler 330 is configured so that the cam follower 396 is in a lower position relative to the cams 398 and the low flow rate port 356b will be open for longer periods of time than the high flow rate port 356a. When the sprinkler 330 is set to irrigate an area of approximately three hundred and sixty degrees, the vertical position of the cam arm 358 and the cam follower 396 are raised to the positions illustrated in FIG. 46. The sprinkler 330 is then configured so the cam follower 396 is in a higher position relative to the sloped cams 398 and the high flow rate port 356a will be open for longer periods of time than the low flow rate port 356b. Arc positions that are higher or lower than those illustrated will move the position of the cam follower 396 relative to the sloped cams 398 to vary the differences of the duration of the open time of the low flow rate port 356b and the higher flow rate port 356a.

The matched precipitation setting chart of FIG. 47 illustrates the relative changes in open time between the high flow rate port 356a and the low flow rate port 356b to achieve matched precipitation at various degrees of arc settings of the sprinkler 330. When the sprinkler 330 is set to cover three hundred and sixty degrees of coverage, it will distribute four times as much water as when the sprinkler 330 is set to cover only ninety degree arc of coverage. The vertical position of the cam follower 396 relative to the sloped surfaces of the cams 398 cooperate to accomplish this result. It is possible that at a lowest arc setting of the sprinkler 330, e.g. approximately fifty degrees, the high flow rate port 356a may never open, and at a full three hundred and sixty degrees of coverage, the high flow rate port 356a may be open ninety-four percent of the time, or more, and the low flow part 356b may only be open momentarily, or not at all.

Thus it will be understood by those skilled in the art that the rotor-type sprinkler 330 has a drive assembly that couples the nozzle 356 and the gear train reduction 62 that is configured to allow the user to select between a full-circle mode of operation and an oscillating mode of operation. In addition, the sprinkler 330 includes a diverter valve including the diverter valve member 388 and a dual clutch drive assembly that intermittently diverts the stream of water ejected from the nozzle 356 through a high flow rate nozzle port 356a and a low flow rate nozzle port 356b. In a part circle setting, the water is diverted during both clockwise and counter-clockwise rotation of the nozzle turret 354. The dual clutch drive is configured so that the timing of the movement of the diverter valve member 388 varies between each successive clockwise and counter-clockwise cycle of rotation of the nozzle turret 354 to ensure a substantially uniform water distribution over a pre-selected arc pattern of coverage. The cam plate 403 always rotates in the same direction relative to the nozzle turret 354 regardless of the direction of rotation of the nozzle turret 354. Furthermore, the rotation of speed of the cam plate 304 relative to the nozzle turret 354 is such that the relative position of when the cams 398 contact the cam follower 396 changes with each rotation of the nozzle turret 354 to ensure a substantially uniform water distribution after a multiple number of revolutions. Furthermore, as the arc setting of the sprinkler 330 is changed, the relative position of the cam follower 396 to the sloped surfaces of cam 398 is proportionately changed to vary the dwell time that the cam 398 moves the diverter valve member 388. The position of the diverter valve member 388 is changed from a position causing flow through the high flow rate nozzle port 356a and the low flow rate nozzle port 356b in a manner that ensures that substantially the same amount of water is distributed to any given area in the same irrigation cycle regardless of the arc setting of the sprinkler.

The exact shifting pattern between the high flow rate port 356a and the low flow rate port 356b will vary based on the number of cams, the degree of slope on the leading and trailing edges of the cams and the gear ratio of the rotating cam plate 304. Because the cam plate 304 rotates at a speed that is different than the speed of rotation of the nozzle turret 354, several rotational passes of the nozzle 356 may be required to obtain even coverage, however after one or more adequate run times of the zone including the sprinkler 330, the entire area will be wetted to a substantially uniform coverage at a matched precipitation rate with other sprinklers on the same zone, regardless of the arc setting of each of the sprinklers 330. When the sprinkler 330 stops running, the position of the diverter valve member 388 does not change, so it starts where it left off the next time the valve supplying water to the sprinkler 330 is turned ON, insuring even coverage over time.

Figure 49:
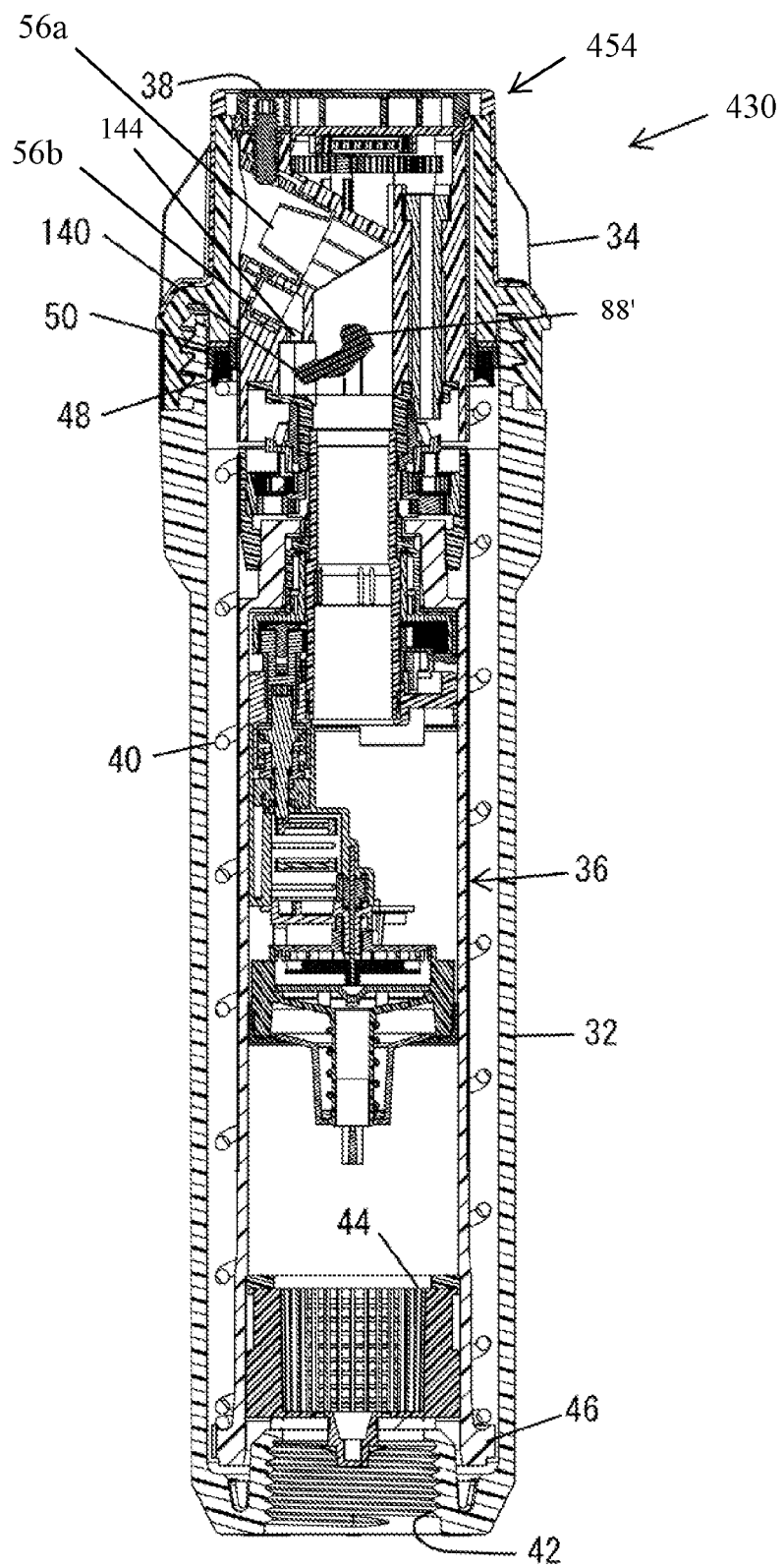
FIG. 49 is a vertical cross-section view of an embodiment of a sprinkler.
Figure 50:
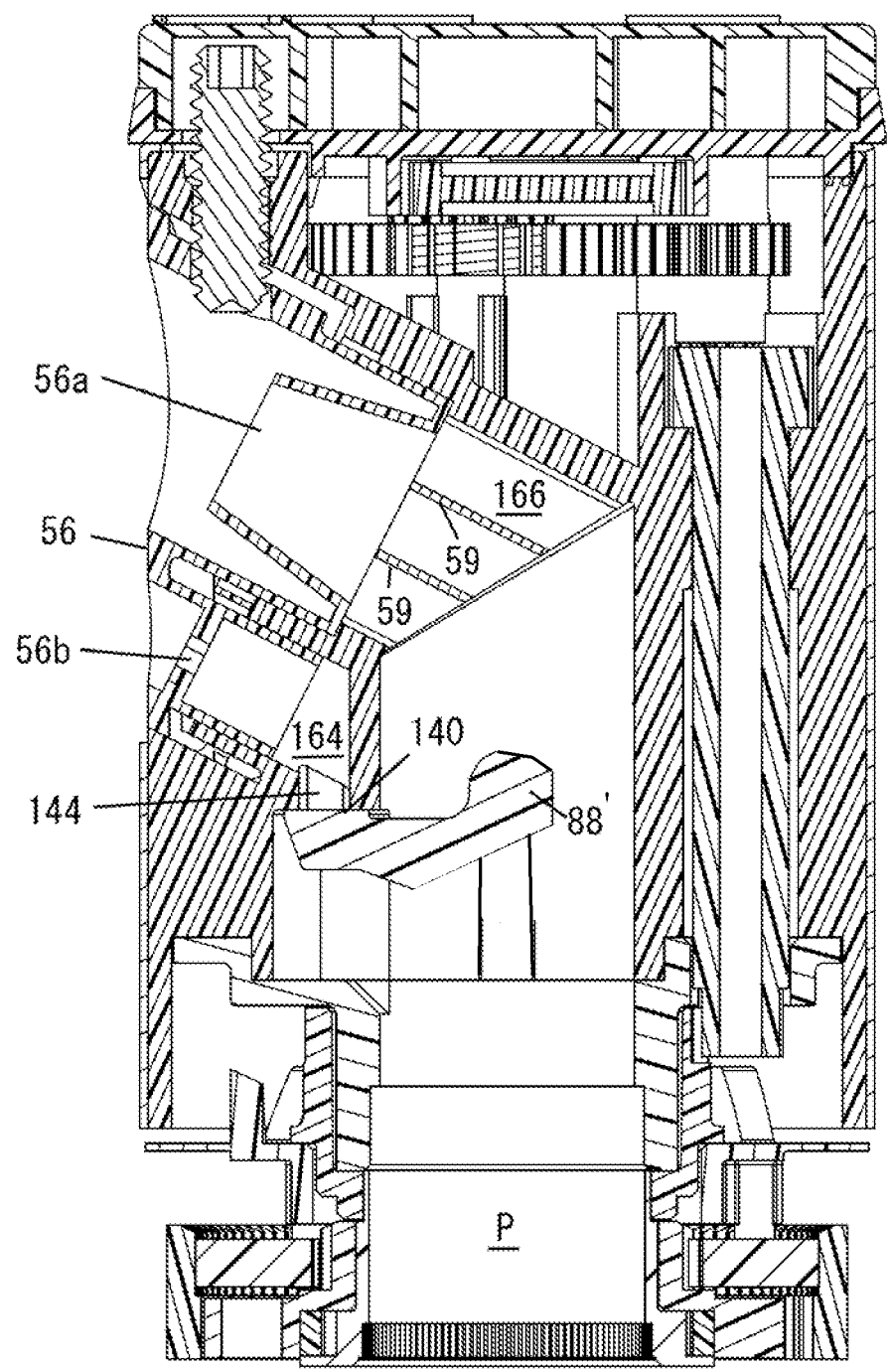
FIG. 50 is a partial vertical cross-section view of the sprinkler of FIG. 49 illustrating the diverter valve in a state that blocks water to the secondary port of the nozzle.
Figure 51:
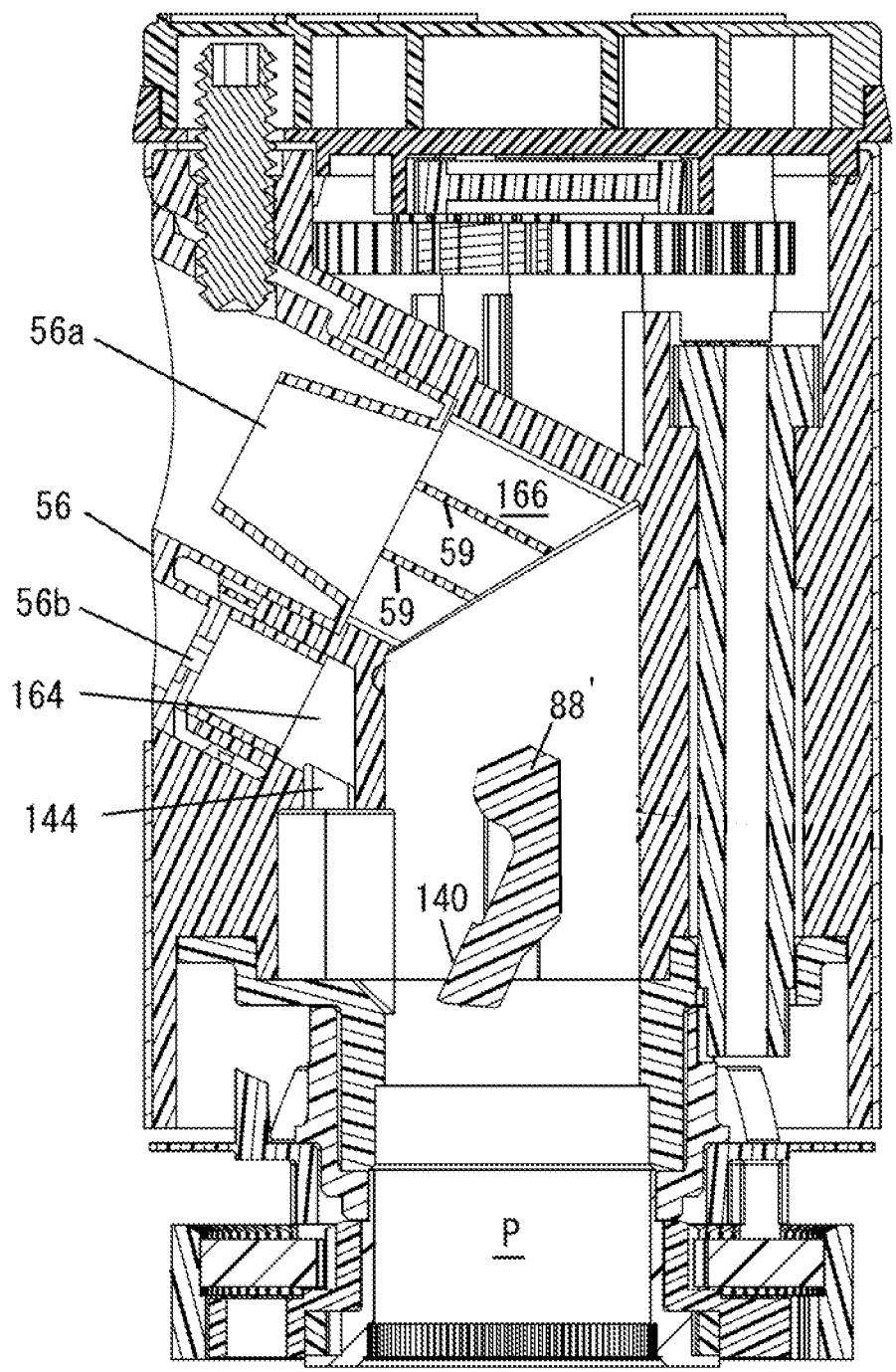
FIG. 51 is a partial vertical cross-section view of the sprinkler of FIG. 49 illustrating the diverter valve in a state that permits water to the secondary port of the nozzle.

FIGS. 49-51 illustrate an embodiment of a sprinkler 430 that can have components or portions that are the same as or similar to the components or portions of the aforementioned sprinklers 30, 30' and 330. Some numerical references correspond to components in FIG. 49 that are the same as or similar in structure and/or function to those previously described for the sprinklers 30, 30', and 330. It is to be understand that the components can be the same in function or similar in function to previously-described components. It should be understood that the illustrated sprinkler includes each of the features designated by the numbers used herein. However, as emphasized repeatedly herein, these features need not be present in all embodiments.

As illustrated in FIG. 49, an irrigation sprinkler 430 can have a diverter valve member 88' mounted in the riser 36 (e.g., in a nozzle turret or other portion of the riser 36). The diverter valve member 88' can selectively open and close the passage 144 leading to the secondary (e.g., low-flow) port 56b. At the same time, according to some embodiments, the sprinkler 430 can permit water to flow to the primary port 56a independent of the position of the diverter valve member 88'. Thus, the irrigation sprinkler 430 can have a port that is always on during irrigation and a port that is selectively controlled between various positions. For example, the diverter valve member 88' can be configured to transition between a first position (see, e.g., FIG. 50) wherein a shut-off member 140 of the diverter valve member 88' blocks the passage 144 and a second position (see, e.g., FIG. 51) wherein the shut-off member 140 permits water flow through the passage 144. In some embodiments, the diverter valve 88' can operate in a third position, wherein the shut-off member 140 only partially closes or occludes the passage 144. The illustrated diverter valve member 88' permits water flow through the primary port 56a in the first position, in the second position, and/or in the third position. For example, the diverter valve 88' can be sized and shaped to avoid blocking water flow through the primary port 56a in each of its operational positions.

As illustrated in FIG. 49, the irrigation sprinkler 430 can include a riser 36 having an inlet end and an outlet end. A nozzle turret 454 can be connected to an outlet end of the riser 36. In some embodiments, the nozzle turret 454 is rotatably connected to the outlet end of the riser 36. A primary port 56a can be positioned in the nozzle turret 454 and/or in the riser 36. In some embodiments, a secondary port is positioned in the nozzle turret 454 and/or in the riser 36.

The sprinkler 430 can include a diverter valve member 88'. The diverter valve member 88' can transition between a first valve position and a second valve position. In some embodiments, the diverter valve member 88' blocks water flow to the secondary port 56b when the diverter valve member 88' is in the first valve position. In some embodiments, the diverter valve member 88' permits water flow to the secondary port 56b when the diverter valve member 88' is in the second valve position. In some embodiments, the diverter valve member 88' permits water flow to the primary port 56a in both the first valve position and in the second valve position.

As shown herein, the diverter valve member can provide multiple control configurations. For example, as explained in further detail above with respect to FIGS. 19, 32 and 49, the diverter valve member can be set to a position to permit water flow through both the primary ports 56a, 356a and the secondary ports 56b, 356b at the same time. In some embodiments, as explained with respect to FIGS. 16A, 34 and 50, the diverter valve member can be set to a position to block water flow through the secondary ports 56b, 356b while permitting water flow through the primary ports 56a, 356a. The diverter valve member according to some embodiments can also be set to a position to block water flow through the primary ports 56a, 356a while permitting water flow through the secondary ports 56b, 356b. In addition, the diverter valve member can also provide variable control of water through the primary and/or secondary ports.

In addition to a novel sprinkler, we have also provided a novel method of irrigating turf or landscaping. The method includes the steps of providing a sprinkler with a nozzle that ejects a stream of water and rotating the nozzle while the nozzle is ejecting the stream of water in successive alternating cycles in clockwise and counter-clockwise directions between pre-set arc limits. The method further includes the step of intermittently emitting the stream of water between a high flow rate port and a low flow rate port of the nozzle in order to maintain a predetermined precipitation rate to any give area regardless of the arc setting of the sprinkler. Our method improves the uniformity of the water distribution of sprinklers set at different arc of coverage settings. A refinement of the aforementioned method involves the additional step of varying the timing of shifting between the nozzle ports between each successive clockwise and counter-clockwise cycle of rotation of the nozzle to further ensure a substantially uniform water distribution over a pre-selected arc pattern of coverage.

Those skilled in the art of designing sprinklers for use in residential and commercial irrigation systems will appreciate the significant advance represented by the present disclosure, as exemplified by the disclosed embodiments. We have provided a rotor-type sprinkler that varies the flow of water ejected from its nozzle in response to changes in the arc setting in a manner that achieves the beneficial result of substantially uniform precipitation over the area being irrigated by the sprinkler. The disclosed sprinklers can allow a plurality of such sprinklers to be installed in an irrigation site to be set to different arcs of coverage while still achieving the beneficial result of substantially uniform precipitation. The disclosed sprinklers can make it possible to avoid the complicated task of installing different flow rate nozzles in the different rotor-type sprinklers in an attempt to match precipitation rates over different arcs. The disclosed sprinklers can also makes it possible to avoid the complicated task of trying to achieve uniform precipitation by electronically actuating all sprinklers set to the same arc setting in the same zone, and scheduling different zones with different run times and/or different cycles. In addition, we have provided a rotor-type sprinkler that will maintain matched precipitation rates whether set to oscillate over an arc of a pre-determined size, or set to rotate continuously through three hundred and sixty degrees.

We have also provided another novel method of irrigating turf or landscaping that includes the steps of providing a sprinkler that is capable of operating in either an oscillating part circle function, or in a three hundred and sixty degree continuous uni-directional manner, while the nozzle is ejecting the stream of water. The method further includes the step of intermittently shifting the stream of water to a high flow rate port and a low flow rate port of the nozzle while the nozzle is being rotated in the continuous uni-directional manner. A timing of the shifting function is varied between each successive full cycle of rotation of the nozzle to ensure a substantially uniform water distribution over the circular area of coverage.

While we have disclosed multiple embodiments of a rotor-type sprinkler with selectable oscillation mode and full circle mode and with a diverter valve that operates in both modes, and novel methods of sprinkler irrigation utilizing low flow and high flow nozzle ports, it will be understood by any person skilled in the art based on the disclosure set forth herein that our invention can be modified in both arrangement and detail. For example the illustrated embodiments can be manufactured in shrub versions that do not include the outer case 32, end cap 34 and spring 40. The sprinklers may be manufactured as a part circle only or a full circle only. The rotating cam assembly could be driven by different methods. A ratcheting ring gear could be used instead of a ratcheting sun gear. A ratcheting cam ring on a ring gear could also be used. The ratcheting mechanism could be held against relative movement in either the clockwise or counterclockwise direction. The cam could be driven in one direction only with a reversing gear assembly or a clutch. The high flow rate port and the low flow rate port may deliver water at the same rate, or at different rates. The low flow rate port, or high flow rate port could each include more than one aperture for the distribution of water. The shapes of the ports can be varied to accomplish the desired water distribution and flow rates. Either the high flow rate port or the low flow rate port, or both, can be molded directly in the nozzle housing. The ports can be separate and not part of the same nozzle insert. The sprinkler need not use a diverter valve, but could include other forms of valve mechanisms which automatically vary the flow of water through a single nozzle port in order to maintain substantially uniform precipitation over the irrigated area regardless of the size of the arc of oscillation that is selected. Therefore the protection afforded our invention should only be limited in accordance with the following claims.

We claim:

1. An irrigation sprinkler, comprising:
   a riser;
   a rotatable nozzle turret connected to an upper end of the riser, the nozzle turret comprising:
      a first port in the nozzle turret capable of emitting a first stream of water from the sprinkler; and
      a second port capable of emitting a second stream of water from the sprinkler;
   a diverter valve capable of intermittently shifting between a first valve position and a second valve position, wherein the diverter valve restricts water flow to the second port when in the first valve position, and wherein the diverter valve permits water flow to the second port when in the second valve position;
   a gear train reduction mounted in the riser and capable of rotating the nozzle turret; and
   a turbine coupled to an input shaft of the gear train reduction and rotatable by water flowing through the riser.

2. The sprinkler of claim 1 wherein the diverter valve intermittently restricts and permits water flow to the second port when the nozzle turret is rotated in a clockwise direction and when the nozzle turret is rotated in a counter-clockwise direction.

3. The sprinkler of claim 1 further comprising a drive assembly coupling the nozzle turret and the gear train reduction, the drive assembly configured to allow a user to select between a full-circle mode of operation and an oscillating mode of operation.

4. The sprinkler of claim 1 wherein both the first port and the second port can be open at the same time.

5. The sprinkler of claim 1 wherein the first port is positioned above the second port.

6. The sprinkler of claim 1 wherein the first port emits water at a first volumetric flow rate when the diverter valve is in the first valve position, and wherein the second port emits water at a second volumetric flow rate when the diverter valve is in the second valve position.

7. The sprinkler of claim 6 wherein the first volumetric flow rate is higher than the second volumetric flow rate.

8. The sprinkler of claim 1 wherein the diverter valve directs water to the first port when the diverter valve is in the first position.

9. An irrigation sprinkler, comprising:
   a riser;
   a nozzle mounted at the top of the riser and having:
      a high flow rate port that emits a stream of water from the sprinkler; and
      a low flow rate port that each emits a stream of water from the sprinkler;
   a diverter valve that can intermittently shift the stream of water between the high flow rate port to the low flow rate port as the nozzle rotates;
   a gear train reduction mounted in the riser; and
   a turbine coupled to an input shaft of the gear train reduction and rotatable by water flowing through the riser.

10. The sprinkler of claim 9, further comprising a drive assembly coupling the nozzle and the gear train reduction and configured to allow a user to select an arc pattern of coverage in which the nozzle rotates in successive cycles in a clockwise direction and a counter-clockwise direction between a pair of pre-set arc limits.

11. The sprinkler of claim 8 wherein the diverter valve is configured to operate during both the clockwise direction and counter-clockwise directions of rotation of the nozzle.

12. The sprinkler of claim 9 wherein both the high flow rate port and the low flow rate port can be open at the same time.

13. The sprinkler of claim 9 wherein the diverter valve includes a plurality of cams and a cam drive gear assembly.

14. A method of irrigating turf or landscaping, comprising the steps of:
   providing a sprinkler having:
      a riser;
      a rotatable nozzle turret connected to an upper end of the riser, the nozzle turret having a first port and a second port;
      a gear train reduction mounted in the riser and capable of rotating the nozzle turret; and a turbine coupled to an input shaft of the gear train reduction and capable of rotating the nozzle turret;

setting a diverter valve to a first valve position wherein the diverter valve directs water to the first port;

rotating the nozzle turret; and shifting the diverter valve to a second valve position wherein the diverter valve directs water to the second port.

15. The method of claim 14, further comprising intermittently shifting the diverter valve between the first valve position and the second valve position as the nozzle turret rotates.

16. The method of claim 14, further comprising emitting water from the first port at a first volumetric flow rate.

17. The method of claim 16, further comprising emitting water from the second port at a second volumetric flow rate that is lower than the first volumetric flow rate.

18. The method of claim 14, further comprising emitting water from both the first port and the second port at the same time.

19. The method of claim 14, further comprising setting the sprinkler to an oscillating mode of operation wherein the nozzle turret rotates in both a clockwise direction and a counterclockwise direction between two arc limits.

20. The method of claim 14, further comprising setting the sprinkler to a full circle mode wherein the nozzle turret rotates in only a clockwise direction or only in a counterclockwise direction.

21. An irrigation sprinkler, comprising:

a riser having:

a first outlet port capable of emitting a first stream of water from the riser;

a second outlet port capable of emitting a second stream of water from the riser; and a diverter valve capable of intermittently shifting between a first valve position and a second valve position, wherein the diverter valve restricts water flow to the second port when in the first valve position, and wherein the diverter valve permits water flow to the second port when in the second valve position.

\* \* \* \* \*